United States Patent
Prabhakar et al.

(10) Patent No.: US 12,487,802 B2
(45) Date of Patent: *Dec. 2, 2025

(54) CONFIGURATION FILE GENERATION FOR FRACTURABLE DATA PATH IN A COARSE-GRAINED RECONFIGURABLE PROCESSOR

(71) Applicant: SambaNova Systems, Inc., Palo Alto, CA (US)

(72) Inventors: Raghu Prabhakar, San Jose, CA (US); David Brian Jackson, Dana Point, CA (US); Scott Burson, Palo Alto, CA (US)

(73) Assignee: SambaNova Systems, Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/583,845

(22) Filed: Feb. 21, 2024

(65) Prior Publication Data

US 2024/0192935 A1 Jun. 13, 2024

Related U.S. Application Data

(63) Continuation of application No. 18/099,214, filed on Jan. 19, 2023, now Pat. No. 11,928,445.

(Continued)

(51) Int. Cl.
*G06F 8/41* (2018.01)
*G06F 9/30* (2018.01)
(Continued)

(52) U.S. Cl.
CPC ............ *G06F 8/441* (2013.01); *G06F 9/3001* (2013.01); *G06F 9/44505* (2013.01); *G06F 15/80* (2013.01)

(58) Field of Classification Search
CPC .... G06F 8/441; G06F 9/3001; G06F 9/44505; G06F 15/80
(Continued)

(56) References Cited

U.S. PATENT DOCUMENTS

| | | | |
|---|---|---|---|
| 6,112,017 A * | 8/2000 | Wise | .................. G06F 12/0607 711/E12.003 |
| 6,282,627 B1 | 8/2001 | Wong et al. | |

(Continued)

FOREIGN PATENT DOCUMENTS

WO 2010142987 A1 12/2010

OTHER PUBLICATIONS

Adriaansen et al., Code generation for reconfigurable explicit datapath architectures with LLVM, 2016, IEEE, pp. 30-37. (Year: 2016).

(Continued)

*Primary Examiner* — Ted T. Vo
(74) *Attorney, Agent, or Firm* — Flagship Patents; Sikander M. Khan

(57) ABSTRACT

A compiler generates a configuration file to configure a fracturable data path in a coarse-grained reconfigurable processor. The configuration file, when loaded into the reconfigurable processor enables a fracturable data path in a configurable unit of the reconfigurable processor to produce multiple independent address sequences by analyzing two address calculations to determine the number of pipeline stages for each calculation. The configuration file includes first and second configuration data for distinct sets of computational stages within the pipelined computation stages, allowing the processor to generate a first address sequence using N pipeline stages and a second address sequence using M pipeline stages, where N and M are positive integers.

20 Claims, 19 Drawing Sheets

Related U.S. Application Data

(60) Provisional application No. 63/301,465, filed on Jan. 20, 2022.

(51) Int. Cl.
*G06F 9/445* (2018.01)
*G06F 15/80* (2006.01)

(58) Field of Classification Search
USPC .................................................. 717/149–157
See application file for complete search history.

(56) References Cited

U.S. PATENT DOCUMENTS

| | | | |
|---|---|---|---|
| 10,467,183 B2 | 11/2019 | Fleming et al. | |
| 11,086,816 B2 | 8/2021 | Fleming et al. | |
| 11,609,769 B2 | 3/2023 | Shah et al. | |
| 11,928,445 B2* | 3/2024 | Prabhakar | G06F 9/3897 |
| 2002/0032558 A1* | 3/2002 | Strong | G06F 9/323 |
| | | | 712/E9.046 |
| 2019/0205244 A1 | 7/2019 | Smith | |
| 2023/0002296 A1 | 1/2023 | Prabhakar | |

OTHER PUBLICATIONS

Koeplinger et al., Spatial: A Language and Compiler for Application Accelerators, PLDI '18, Jun. 18-22, 2018, Association for Computng Machinery, 16 pages.

Lopes et al., Coarse-Grained Reconfigurable Computing with the Versat Architecture, 2021, Electronics, 23 pages. (Year: 2021).

M. Emani et al., Accelerating Scientific Applications With Sambanova Reconfigurable Dataflow Architecture, in Computing in Science & Engineering, vol. 23, No. 2, pp. 114-119, Mar. 26, 2021, [doi: 10.1109/MCSE.2021.3057203].

Podobas et al., A Survey on Coarse-Grained Reconfigurable Architectures From a Performance Perspective, IEEEAccess, vol. 2020. 3012084, Jul. 27, 2020, 25 pages.

Prabhakar et al., Plasticine: A Reconfigurable Architecture for Parallel Patterns, ISCA, Jun. 24-28, 2017, 14 pages.

Saluja, Register File Organization for Coarse-Grained Reconfigurable Architectures: Compiler-Microarchitecture Perspective, 2014, Master Thesis, Arizona State University, 38 pages. (Year: 2014).

U.S. Appl. No. 18/099,214—Notice of Allowance, dated Nov. 8, 2023, 7 pages.

Wan et al., A Coarse-Grained Reconfigurable Architecture with Compilation for High Performance, 2012, International Journal ofReconfigurable Computing, 17 pages. (Year: 2012).

* cited by examiner 1300, 1310

User Program Statements

```
Linear = torch.nn.linear(K,N)
Relu – torch.nn.relu
Softmax = torch.nn.Softmax(dim=3)
X1 = torch.randn(N, C, M, K)
X2 =%1.to("RDP")
X3 = Linear(X2)
X4 = Relu(X3)
X5 = Softmax(X4)
X6 = X5.to("CPU")
```

1350

User Program Computation Graph

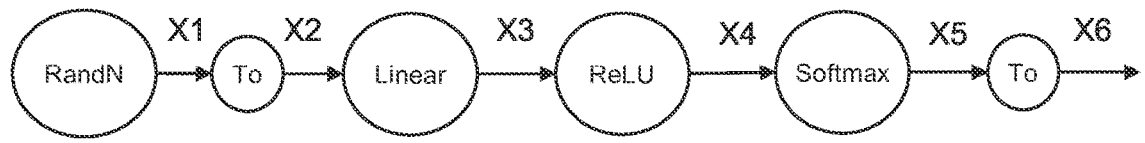

| Air/Tensor Statements | Tensor Size | |
|---|---|---|
| %1 = air.Input(name: "In0"): | NxCxMxK bf16 | |
| %2 = air.Linear(%1): | NxCxMxN bf16 | |
| %3 = air.ReLU(%2): | NxCxMxN bf16 | |
| %4 = air.Exp(%3): | NxCxMxN bf16 | Softmax Lowering |
| %5 = air.Sum(%4, dim: 3): | NxCxMx1 bf16 | |
| %6 = air.Div(%4, %5): | NxCxMxN bf16 | |
| %7 = air.Output(%6) | | |

1450

Air/Tensor Computation Graph

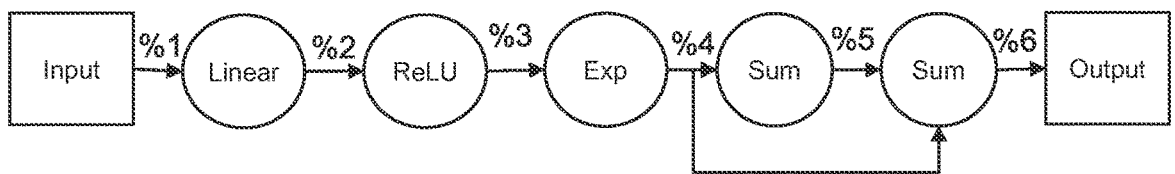

| Template Dataflow Statements | Tensor Size |
|---|---|
| %1 = tlir.Region(name: "In0"): | NxCxMxK bf16 |
| %2 = tlir.Region(name: "Weight"): | KxN bf16 |
| %3 = tlir.Region(name: "Bias"): | 1xN bf16 |
| %4 = tlir.Region(name: "Out0"): | NxCxMxN bf16 |
| %5 = tlir.Load(%2) | |
| %6 = tlir.Load(%3) | |
| %7 = tlir.MetaPipeline(iters: N) { | |
|   %8 = tlir.Load(%1, dim: 1): | CxMxK bf16 |
|   %9 = tlir.Buffer(%5, depth: 2): | CxMxK bf16 |
|   %10 = tlir.MetaPipeline(iters: C) { | |
|     %11 = tlir.ReadSlice(%9, dim: 1): | MxK bf16 |
|     %12 = tlir.Linear(%5, %11): | MxN bf16 |
|     %13 = tlir.Buffer(%12, depth: 2): | MxN bf16 |
|     %14 = tlir.AddBias(%13, %6): | MxN bf16 |
|     %15 = air.ReLU(%14): | MxN bf16 |
|     %16 = air.Exp(%15): | MxN bf16 |
|     %17 = tlir.Buffer(%16, depth: 2): | MxN bf16 |
|     %18 = tlir.Sum(%17, dim: 1): | Mx1 bf16 |
|     %19 = tlir.Div(%17, %18): | MxN bf16 |
|     %20 = tlir.Store(%4, %19) | |
|   } | |
| } | |

1510 — 1520

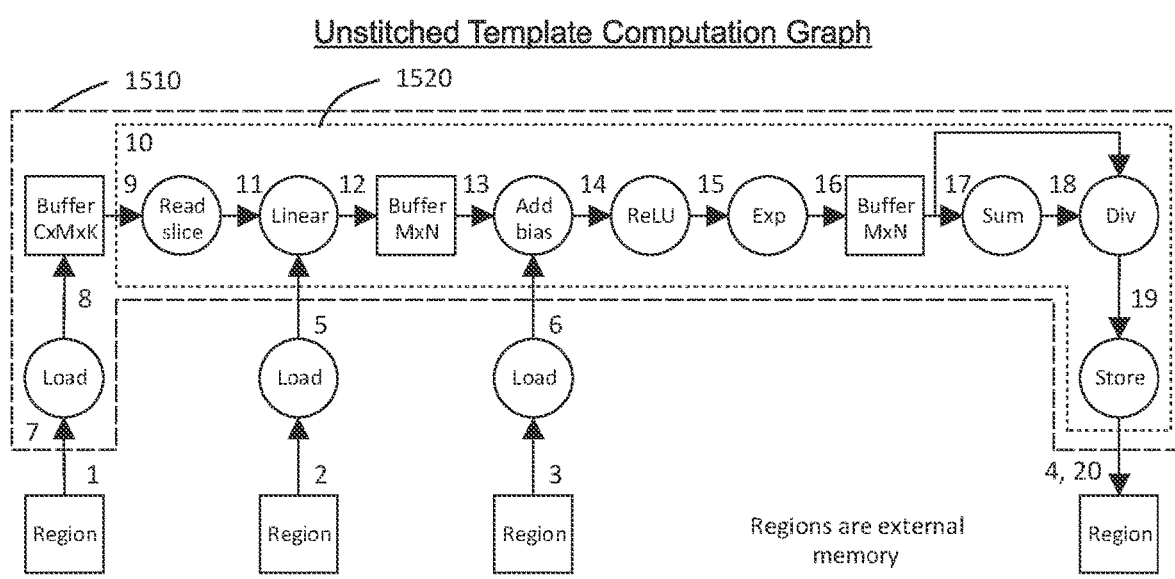

Unstitched Template Computation Graph

FIG. 15

1700
Logical Computation Graph
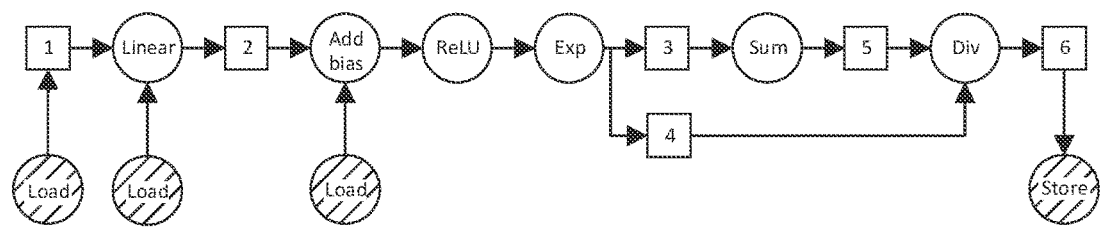
1750
Physical Layout
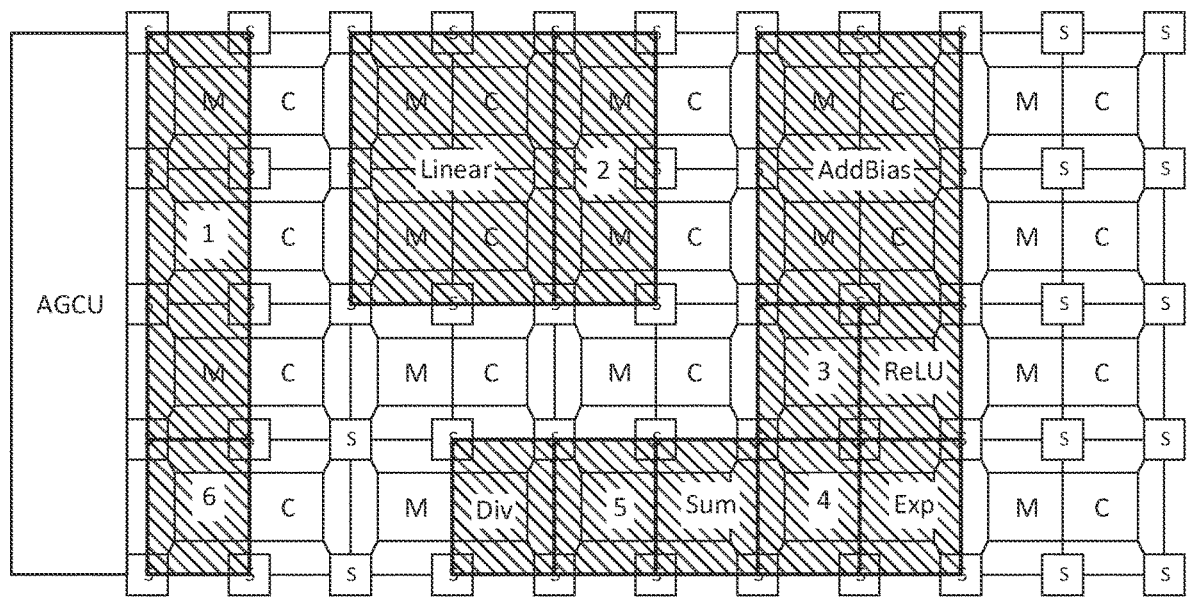
FIG. 17

CONFIGURATION FILE GENERATION FOR FRACTURABLE DATA PATH IN A COARSE-GRAINED RECONFIGURABLE PROCESSOR

CROSS-REFERENCE TO RELATED APPLICATIONS

This application is a continuation of U.S. patent application Ser. No. 18/099,214, entitled, "Compiler for a Fracturable Data Path in a Reconfigurable Data Processor," filed on Jan. 19, 2023, which itself claims the benefit of U.S. Patent Application No. 63/301,465, entitled "Fracturable Data Path," filed on Jan. 20, 2022. Both of the aforementioned applications are hereby incorporated by reference for all purposes.

RELATED APPLICATION(S) AND OTHER DOCUMENT(S)

This application is related to the following commonly owned applications:
- U.S. patent application Ser. No. 18/099,218, entitled "FRACTURABLE DATAPATH IN A RECONFIGURABLE DATA PROCESSOR" filed on 19 Jan. 2023.
- U.S. Provisional Patent Application No. 63/400,403, entitled, "Context Switching In A Programmable Memory Unit In A Reconfigurable Data Processor," filed on 24 Aug. 2022

This application is related to the following published documents:
- Prabhakar et al., "Plasticine: A Reconfigurable Architecture for Parallel Patterns," ISCA '17, Jun. 24-28, 2017, Toronto, ON, Canada; and
- Koplinger et al., "Spatial: A Language and Compiler for Application Accelerators," Proceedings of the 39th ACM SIGPLAN Conference on Programming Language Design and Implementation (PLDI), Proceedings of the 43rd International Symposium on Computer Architecture, 2018.

The related application(s) and other documents listed above are hereby incorporated by reference in their entirety herein for any and all purposes.

TECHNICAL FIELD

The technology disclosed relates to fracturing a physical arithmetic logic unit (ALU) pipeline into multiple pipeline segments for generating addresses for multiple access threads.

BACKGROUND

The subject matter discussed in this section should not be assumed to be prior art merely as a result of its mention in this section. Similarly, a problem mentioned in this section or associated with the subject matter provided as background should not be assumed to have been previously recognized in the prior art. The subject matter in this section merely represents different approaches, which in and of themselves can also correspond to implementations of the claimed technology.

Coarse grain reconfigurable architectures (CGRAs) exhibit far superior performance over conventional architectures, such as field programmable gate arrays (FPGAs) as they provide the capability to execute applications as nested dataflow pipelines. Maximizing the utilization of compute units in the CGRA to perform useful computations is critical to harness the benefits of a CGRA. A challenge to increasing compute unit (e.g., arithmetic logic unit (ALU)) utilization is to provide input data to the compute units at high enough bandwidth to sustain high compute throughput. CGRAs typically have memories organized in a distributed grid on-chip. Providing data at high throughput to compute units thus involves generating memory addresses at high throughput for arbitrary memory access patterns. Furthermore, pipelined dataflow execution involves stages of computation separated by buffers (like double buffers) that simultaneously accept data from a stage while producing and providing data to the next stage. Consequently, the programmable memory units in the CGRA must be capable of sustaining high throughput address generation with multiple concurrent "access threads" of read and write accesses.

BRIEF DESCRIPTION OF THE DRAWINGS

The technology will be described with reference to the drawings, in which:

FIG. 13 shows an example implementation of an example user program in a first stage of a compiler stack.

FIG. 14 shows the user program in an example second stage of the compiler stack.

FIG. 15 shows the user program in an example third stage of the compiler stack.

FIG. 17 shows the logical computation graph and an example physical layout of the user program.

Figure 1:
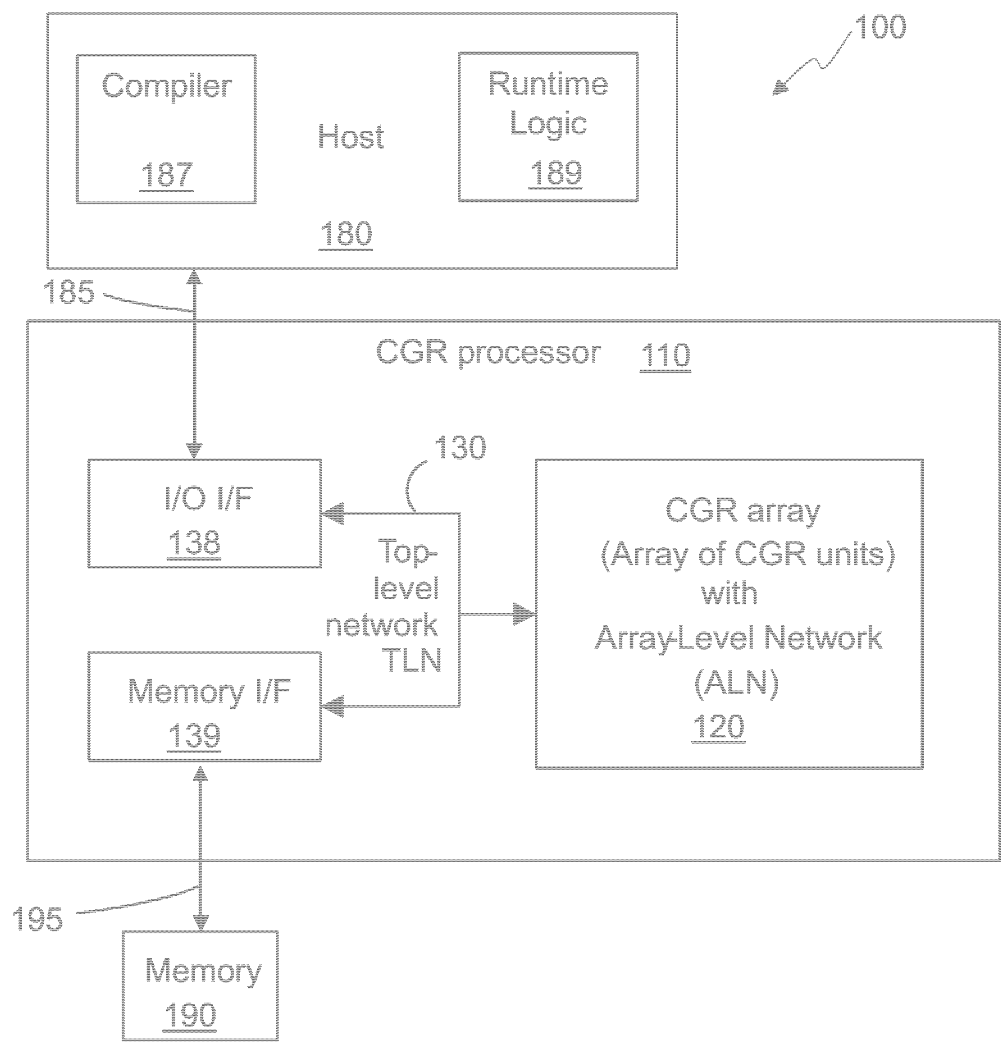
FIG. 1 illustrates an example system including an integrated circuit (IC), a host, and a memory.

In the figures, like reference numbers may indicate functionally similar elements. The systems and methods illustrated in the Figures, and described in the Detailed Description below, may be arranged and designed in a wide variety of different implementations. Neither the Figures nor the Detailed Description are intended to limit the scope of the claims. Instead, they merely represent examples of different implementations of the disclosed technology.

DETAILED DESCRIPTION

Traditional compilers translate human-readable computer source code into machine code that can be executed on a Von Neumann computer architecture. In this architecture, a processor serially executes instructions in one or more threads of software code. The architecture is static and the compiler does not determine how execution of the instructions is pipelined, or which processor or memory takes care of which thread. Thread execution is asynchronous, and safe exchange of data between parallel threads is not supported.

High-level programs for machine learning (ML) and artificial intelligence (AI) may require massively parallel computations, where many parallel and interdependent threads (metapipelines) exchange data. Such programs are ill-suited for execution on Von Neumann computers. They require architectures that are optimized for parallel processing, such as coarse-grained reconfigurable architectures (CGRAs) or graphic processing units (GPUs). The ascent of ML, AI, and massively parallel architectures places new requirements on compilers, including how computation graphs, and in particular dataflow graphs, are pipelined, which operations are assigned to which compute units, how data is routed between various compute units and memory, and how synchronization is controlled particularly when a dataflow graph includes one or more nested loops, whose execution time varies dependent on the data being processed.

Memory address generation in hardware can be performed by arithmetic logic units (ALUs) implementing an access pattern described in a program. For high throughput memory accesses, the ALUs should be capable of producing one or more addresses per access thread per cycle for a given access pattern, although for accesses to slower memory structures such as off-chip memories, this requirement can be relaxed. As the access patterns can be arbitrary in either case, fixing a specific number of ALUs per access thread can be suboptimal and inflexible.

The technology disclosed provides a hardware architecture and mechanism that can allocate ALUs in a single physical ALU pipeline to multiple concurrent access threads. In one embodiment, the ALUs are organized as a linear pipeline with pipeline registers in between the ALUs for storing and forwarding intermediate and/or final results. The ALUs in the physical ALU pipeline can be programmatically partitioned (e.g., fractured) into several "pipeline segments," where one pipeline segment can be a contiguous sequence of ALU stages allocated to one access thread. For example, the physical ALU pipeline can include 12 ALUs (e.g., 12 ALU stages, including ALU0-ALU11), where the 12 ALUs can be partitioned into different segments having a varying number of ALUs. Further, for example, 3 ALUs of the physical ALU pipeline of the 12 ALUs can be partitioned by software into a first pipeline segment for a first access thread and the remaining 9 ALUs of the physical ALU pipeline of 12 ALUs can be partitioned by software into a second pipeline segment for a second access thread. Note that this is only an example and there can be higher or lower number of ALU stages in the contiguous sequence of ALU stages allocated to the access threads and/or different numbers of concurrent access threads. The fractioning of the physical ALU pipeline (data path) in software allows for more efficient use of an entire physical ALU pipeline, such that more ALUs of each physical ALU pipeline can be utilized. This allows one physical ALU pipeline to generate memory addressed for multiple access threads, as opposed to just a single access thread.

The length of a pipeline segment is determined by the memory access pattern. This can be done by software, such as an allocator that is implemented by a compiler. The allocator can provide an expression that dictates the number of ALUs required to perform certain operations and the pipeline can be configured accordingly. This can be based on the capabilities of the ALUs. Each pipeline segment can operate independently from other pipeline segments, even when they are from the same physical ALU pipeline. Specifically, each pipeline segment obtains its input operands from a programmer-defined set of iterators or external values and is controlled and stalled independently from the other pipeline segments. The technology disclosed includes a hardware mechanism that provides the capability to begin and end a pipeline segment at any arbitrary ALU in the physical ALU pipeline. The beginning and ending of each pipeline segment can be defined by a loaded configuration file that is defined based on the memory access pattern and the capabilities/limitations of the ALUs in the physical ALU pipeline.

In another embodiment of the technology disclosed, where memory addresses to a slower memory, such as off-chip memory, are being generated, the physical ALU pipeline can be managed dynamically in a time-shared manner. A hardware mechanism to manage and schedule concurrent threads dynamically on an ALU pipeline can implement hardware to select from a list of "ready" access threads every clock cycle and schedule one thread onto the ALU pipeline. ALUs in different stages of the same physical ALU pipeline can execute operations from different access threads. In an embodiment of the technology disclosed, a truly multi-threaded implementation can be provided where multiple threads are simultaneously active and each thread dynamically arbitrates for access to its set of pipeline stages as a group relative to other threads. This implementation includes additional scheduling intelligence in hardware, such that the hardware includes a mechanism that can schedule one or more threads from a pool of ready threads, as and when each thread's resource requirements (ALUs, ports for read/write, etc.) are satisfied. Each stage can be bound to a given context at any given time by virtue of the configuration file and only one context can be active at a time for each stage. A context-switch operation can occur to reconfigure the pipeline. This can allow multiple threads to be active simultaneously and the threads can arbitrate for access to their set of ALU stages in response to an incoming for that thread to generate an address (e.g., thread-dynamic). This thread-dynamic implementation can reconfigure the pipeline on a cycle-by-cycle basis.

In at least one implementation, a CGR memory unit includes a fracturable data path pipeline. While a traditional pipelined data path is designed to send results from one stage directly into the input of the stage to yield a result at the end of the pipeline, a fracturable data path, as the phrase is used herein and in the claims, refers to a pipelined data path that can be partitioned into multiple sections that can operated concurrently and independently. The different sections can be configured to calculate address streams for different operations that are reading from or writing to memory. Thus, the fracturable data path can generate independent address streams for multiple operations concurrently. The address streams can then be used to access memory of the CGR memory unit. Note that an address stream may include meta data associated with a memory access, such as a predicate of whether or not the particular access should be executed, or another function such as an amount to rotate vector data between lanes before writing or after reading the actual data from memory. Thus, a calculation for the address stream may calculate meta data in addition to, or instead of, an address. The memory can be a multi-ported memory allowing simultaneous independent access to the different banks to allow for multiple concurrent operations, where a multi-ported memory can include a true multi-port memory array, multiple banks of memory that allow access to the different banks of memory simultaneously, time multiplexing access to the memory cells from the access port, or a combination thereof.

The architecture, configurability and dataflow capabilities of an array of CGR units enable increased compute power that supports both parallel and pipelined computation. A CGR processor, which includes one or more CGR arrays (arrays of CGR units), can be programmed to simultaneously execute multiple independent and interdependent dataflow graphs. To enable simultaneous execution, the dataflow graphs may need to be distilled from a high-level program and translated to a configuration file for the CGR processor. A high-level program is source code written in programming languages like Spatial, Python, C++, and C, and may use computation libraries for scientific computing, ML, AI, and the like. The high-level program and referenced libraries can implement computing structures and algorithms of machine learning models like AlexNet, VGG Net, GoogleNet, ResNet, ResNeXt, RCNN, YOLO, SqueezeNet, SegNet, GAN, BERT, ELMo, USE, Transformer, and Transformer-XL.

Translation of high-level programs to executable bit files is performed by a compiler, sec. While traditional compilers sequentially map operations to processor instructions, typically without regard to pipeline utilization and duration (a task usually handled by the hardware), an array of CGR units requires mapping operations to processor instructions in both space (for parallelism) and time (for synchronization of interdependent computation graphs or dataflow graphs). This requirement implies that a compiler for a CGRA must decide which operation of a computation graph or dataflow graph is assigned to which of the CGR units, and how both data and, related to the support of dataflow graphs, control information flows among CGR units, and to and from external hosts and storage.

A compiler can take advantage of the fracturable data path by analyzing multiple address sequences used by the target program to access a common memory and determining how those address sequences can be generated in the data path. The compiler can take knowledge of the capabilities of a stage of the pipeline in the data path, including the operations that can be performed by an ALU in each stage, to determine how many stages of the fracturable data path are needed to be able to calculate a particular address sequence. The compiler can then assign a set of stages of the data path to calculate the particular address sequence. It can then continue on to the next address sequence, determine how many stages of the data path are needed, and assign a second set of stages of the data path calculate that address sequence. This can then be repeated until all of the concurrent address sequences have been assigned to a set of stages, or until no more address sequence calculations can be performed with the unassigned stages of the data path.

The CGR memory unit may have a hardware limit to the number of concurrent accesses it can support, such as 2 reads and 1 write, 2 reads and 2 writes, or 3 accesses that can be either a read or a write. Any number of concurrent address sequences may be supported by the hardware, depending on the implementation. In some cases, the dataflow graph may want to have more concurrent memory accesses than can be supported by the hardware. The compiler may handle such cases in one of several different ways, including time multiplexing groups of accesses, or duplicating the data into multiple CGR memory units and assigning groups of memory accesses to different CGR memory units. The compiler may optimize which address sequences are assigned to a data path for concurrent operation to minimize the number groups or sets of address sequences. For example, if the data path has 6 pipeline stages with up to 3 simultaneous operations with its respective address sequence supported, but the graph uses four address sequences that are assigned 4, 4, 2, and 2 stages, respectively, If the sequences were simply assigned in order, the compiler would assign the first sequence to a first group using 4 stages, the second and third sequences to a second group, using all 6 stages, and the fourth sequence to a third group using only 2 stages. The compiler may optimize the grouping in some implementations, assigning the first and third sequence to one group and the second and fourth sequences to a second group, with each group using all 6 stages of the data path.

Terminology

As used herein, the phrase one of should be interpreted to mean exactly one of the listed items. For example, the phrase "one of A, B, and C" should be interpreted to mean any of: only A, only B, or only C.

As used herein, the phrases at least one of and one or more of should be interpreted to mean one or more items. For example, the phrase "at least one of A, B, and C" or the phrase "at least one of A, B, or C" should be interpreted to mean any combination of A, B, and/or C. The phrase "at least one of A, B, and C" means at least one of A and at least one of B and at least one of C.

Unless otherwise specified, the use of ordinal adjectives first, second, third, etc., to describe an object, merely refers to different instances or classes of the object and does not imply any ranking or sequence.

The terms comprising and consisting have different meanings in this patent document. An apparatus, method, or product "comprising" (or "including") certain features means that it includes those features but does not exclude the presence of other features. On the other hand, if the apparatus, method, or product "consists of" certain features, the presence of any additional features is excluded.

The term coupled is used in an operational sense and is not limited to a direct or an indirect coupling. "Coupled to" is generally used in the sense of directly coupled, whereas "coupled with" is generally used in the sense of directly or indirectly coupled. "Coupled" in an electronic system may refer to a configuration that allows a flow of information, signals, data, or physical quantities such as electrons between two elements coupled to or coupled with each other.

In some cases, the flow may be unidirectional, in other cases the flow may be bidirectional or multidirectional. Coupling may be galvanic (in this context meaning that a direct electrical connection exists), capacitive, inductive, electromagnetic, optical, or through any other process allowed by physics.

The term connected is used to indicate a direct connection, such as electrical, optical, electromagnetical, or mechanical, between the things that are connected, without any intervening things or devices.

The term configured (to perform a task or tasks) is a broad recitation of structure generally meaning "having circuitry that" performs the task or tasks during operation. As such, the described item can be configured to perform the task even when the unit/circuit/component is not currently on or active. In general, the circuitry that forms the structure corresponding to "configured to" may include hardware circuits, and may further be controlled by switches, fuses, bond wires, metal masks, firmware, and/or software. Similarly, various items may be described as performing a task or tasks, for convenience in the description. Such descriptions should be interpreted as including the phrase "configured to." Reciting an item that is configured to perform one or more tasks is expressly intended not to invoke 35 U.S.C. 112, paragraph (f) interpretation for that unit/circuit/component. More generally, the recitation of any element is expressly intended not to invoke 35 U.S.C. $112, paragraph (f) interpretation for that element unless the language "means for" or "step for" is specifically recited.

As used herein, the term based on is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an implementation in which A is determined based solely on B. The phrase "based on" is thus synonymous with the phrase "based at least in part on."

The following terms or acronyms used herein are defined at least in part as follows:

AGCU—address generator (AG) and coalescing unit (CU).

AI—artificial intelligence.

AIR—arithmetic or algebraic intermediate representation.

ALN—array-level network.

Buffer—an intermediate storage of data.

CGR—coarse-grained reconfigurable. A property of, for example, a system, a processor, an architecture (see CGRA), an array, or a unit in an array. This property distinguishes the system, etc., from field-programmable gate arrays (FPGAs), which can implement digital circuits at the gate level and are therefore fine-grained configurable.

CGRA—coarse-grained reconfigurable architecture. A data processor architecture that includes one or more arrays (CGR arrays) of CGR units.

Compiler—a translator that processes statements written in a programming language to machine language instructions for a computer processor. A compiler may include multiple stages to operate in multiple steps. Each stage may create or update an intermediate representation (IR) of the translated statements. Compiler stages are illustrated with reference to FIG. 12. For the purposes of this disclosure, an assembler that generates configuration data for a CGR processor from low-level so-called assembly language code can also be referred to as a compiler.

Computation graph—some algorithms can be represented as computation graphs. As used herein, computation graphs are a type of directed graphs comprising nodes that represent mathematical operations/expressions and edges that indicate dependencies between the operations/expressions. For example, with machine learning (ML) algorithms, input layer nodes assign variables, output layer nodes represent algorithm outcomes, and hidden layer nodes perform operations on the variables. Edges represent data (e.g., scalars, vectors, tensors) flowing between operations. In addition to dependencies, the computation graph reveals which operations and/or expressions can be executed concurrently.

CGR unit—a circuit that can be configured and reconfigured to locally store data (e.g., a memory unit or a PMU), or to execute a programmable function (e.g., a compute unit or a PCU). A CGR unit includes hardwired functionality that performs a limited number of functions used in computation graphs and dataflow graphs. Further examples of CGR units include a CU and an AG, which may be combined in an AGCU. Some implementations include CGR switches, whereas other implementations may include regular switches.

CU—coalescing unit.

Dataflow Graph—a computation graph that includes one or more loops that may be nested, and wherein nodes can send messages to nodes in earlier layers to control the dataflow between the layers.

Datapath—a collection of functional units that perform data processing operations. The functional units may include memory, multiplexers, ALUs, SIMDs, multipliers, registers, buses, etc.

FCMU—fused compute and memory unit—a circuit that includes both a memory unit and a compute unit.

Graph—a collection of nodes connected by edges. Nodes may represent various kinds of items or operations, dependent on the type of graph. Edges may represent relationships, directions, dependencies, etc.

IC—integrated circuit—a monolithically integrated circuit, i.e., a single semiconductor die which may be delivered as a bare die or as a packaged circuit. For the purposes of this document, the term integrated circuit also includes packaged circuits that include multiple semiconductor dies, stacked dies, or multiple-die substrates. Such constructions are now common in the industry, produced by the same supply chains, and for the average user often indistinguishable from monolithic circuits.

A logical CGR array or logical CGR unit—a CGR array or a CGR unit that is physically realizable, but that may not have been assigned to a physical CGR array or to a physical CGR unit on an IC.

Metapipeline—a subgraph of a computation graph that includes a producer operator providing its output as an input to a consumer operator. Metapipelines may be nested, that is, producer operators and consumer operators may include other metapipelines.

ML—machine learning.

Multi-Port Memory—A multi-port memory can include one or more arrays of memory cells that allow for concurrent access to the memory from more than one access port. This can be accomplished in several ways, depending on the implementation, including, but not limited to, a multi-port memory array, multiple banks of memory that allow access to the different banks of memory simultaneously, time multiplexing access to the memory cells from the access port, or a combination thereof.

PCU—pattern compute unit—a compute unit that can be configured to repetitively perform a sequence of operations.

PEF—processor-executable format—a file format suitable for configuring a configurable data processor.

Pipeline—a staggered flow of operations through a chain of pipeline stages. The operations may be executed in parallel and in a time-sliced fashion. Pipelining increases overall instruction throughput. CGR processors may include pipelines at different levels. For example, a compute unit may include a pipeline at the gate level to enable correct timing of gate-level operations in a synchronous logic implementation of the compute unit, and a metapipeline at the graph execution level (typically a sequence of logical operations that are to be repetitively executed) that enables correct timing and loop control of node-level operations of the configured graph. Gate-level pipelines are usually hard wired and unchangeable, whereas metapipelines are configured at the CGR processor, CGR array level, and/or GCR unit level.

Pipeline Stages—a pipeline is divided into stages that are coupled with one another to form a pipe topology.

PMU—pattern memory unit—a memory unit that can locally store data according to a programmed pattern.

PNR—place and route—the assignment of logical CGR units and associated processing/operations to physical CGR units in an array, and the configuration of communication paths between the physical CGR units.

RAIL—reconfigurable dataflow unit (RDU) abstract intermediate language.

CGR Array—an array of CGR units, coupled with each other through an array-level network (ALN), and coupled with external elements via a top-level network (TLN). A CGR array can physically implement the nodes and edges of a dataflow graph.

SIMD—single-instruction multiple-data—an arithmetic logic unit (ALU) that simultaneously performs a single programmable operation on multiple data elements delivering multiple output results.

TLIR—template library intermediate representation.

TLN—top-level network.

Reference now is made in detail to the examples illustrated in the accompanying drawings and discussed below.

FIG. 1 illustrates an example system 100 including a CGR processor 110, a host 180, and a memory 190. CGR processor 110 has a coarse-grained reconfigurable architecture (CGRA) and includes an array of CGR units 120 such as a CGR array. CGR processor 110 further includes an IO interface 138, and a memory interface 139. Array of CGR units 120 is coupled with IO interface 138 and memory interface 139 via data bus 130 which may be part of a top-level network (TLN). Host 180 communicates with IO interface 138 via system data bus 185, and memory interface 139 communicates with memory 190 via memory bus 195. Array of CGR units 120 may further include compute units, memory units, and/or fused compute-memory units that are connected with an array-level network (ALN) to provide the circuitry for execution of a computation graph or a dataflow graph that may have been derived from a high-level program with user algorithms and functions. The high-level program may include a set of procedures, such as learning or inferencing in an AI or ML system. More specifically, the high-level program may include applications, graphs, application graphs, user applications, computation graphs, control flow graphs, dataflow graphs, models, deep learning applications, deep learning neural networks, programs, program images, jobs, tasks and/or any other procedures and functions that may need serial and/or parallel processing. In some implementations, execution of the graph(s) may involve using multiple units of CGR processor 110. In some implementations, CGR processor 110 may include one or more ICs. In other implementations, a single IC may span multiple coarsely reconfigurable data processors. In further implementations, CGR processor 110 may include one or more units of array of CGR units 120.

Host 180 may be, or may include, a computer such as further described with reference to FIG. 2. Host 180 runs runtime logic 189, as further referenced herein, and may also be used to run computer programs, such as the compiler 187 further described herein later in this disclosure. In some implementations, the compiler 187 may run on a computer 200 as described in FIG. 2, but separate from host 180 and unconnected to the CGR processor 110.

CGR processor 110 may accomplish computational tasks by executing a configuration file (for example, a PEF file). For the purposes of this description, a configuration file corresponds to a dataflow graph, or a translation of a dataflow graph, and may further include initialization data. A compiler compiles the high-level program to provide the configuration file. In some implementations described herein, a CGR array is configured by programming one or more configuration stores in the CGR units within the array 120 with all or parts of the configuration file. A single configuration store may be at the level of the CGR processor or the CGR array, or a CGR unit may include an individual configuration store. The configuration file may include configuration data for the CGR array and CGR units in the CGR array, and link the computation graph to the CGR array. Execution of the configuration file by CGR processor 110 causes the CGR array (s) to implement the user algorithms and functions in the dataflow graph.

CGR processor 110 can be implemented on a single integrated circuit die or on a multichip module (MCM). An IC can be packaged in a single chip module or a multichip module. An MCM is an electronic package that may comprise multiple IC dies and other devices, assembled into a single module as if it were a single device. The various dies of an MCM may be mounted on a substrate, and the bare dies of the substrate are electrically coupled to the surface or to each other using for some examples, wire bonding, tape bonding or flip-chip bonding.

So a computing system implementing aspects of the current disclosure may include the coarse-grained reconfigurable (CGR) processor 110 and a host processor 180 coupled to the CGR processor 110 and including runtime logic 189 configured to provide configuration data to the CGR processor 110 to load into the configuration store of a CGR unit in the CGR array 120.

Figure 2:
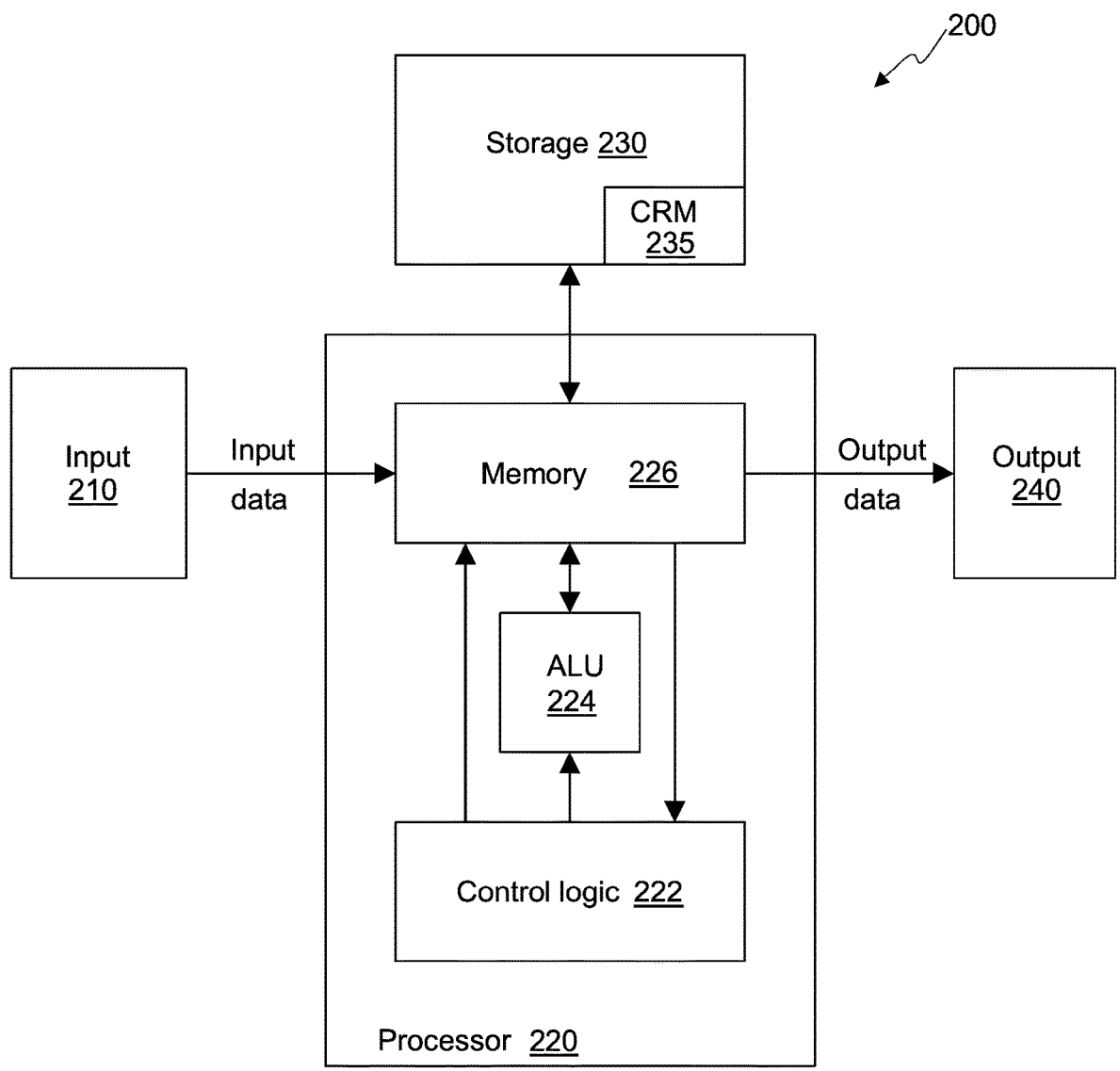
FIG. 2 illustrates an example of a computer, including an input device, a processor, a storage device, and an output device.

FIG. 2 illustrates an example of a computer 200, including an input device 210, a processor 220, a storage device 230, and an output device 240. Although the example computer 200 is drawn with a single processor, other implementations may have multiple processors. Input device 210 may comprise a mouse, a keyboard, a sensor, an input port (for example, a universal serial bus (USB) port), and any other input device known in the art. Output device 240 may comprise a monitor, printer, and any other output device known in the art. Furthermore, part or all of input device 210 and output device 240 may be combined in a network interface, such as a Peripheral Component Interconnect Express (PCIe) interface suitable for communicating with CGR processor 110. Input device 210 is coupled with processor 220 to provide input data, which an implementation may store in memory 226.

Processor 220 is coupled with output device 240 to provide output data from memory 226 to output device 240. Processor 220 further includes control logic 222, operable to control memory 226 and arithmetic and logic unit (ALU) 224, and to receive program and configuration data from memory 226. Control logic 222 further controls exchange of data between memory 226 and storage device 230.

Memory 226 typically comprises memory with fast access, such as static random-access memory (SRAM), whereas storage device 230 typically comprises memory with slow access, such as dynamic random-access memory (DRAM), flash memory, magnetic disks, optical disks, and any other memory type known in the art. At least a part of the memory in storage device 230 may include a non-transitory computer-readable medium (CRM 235), such as used for storing computer programs and/or configuration files. The memory 226 may also or alternatively include a non-transitory computer-readable medium for storing computer programs and/or configuration files. The computer programs and/or configuration files may configure the host computer and/or a CGR processor coupled to the host computer to perform methods and/or other aspects of the present disclosure.

Figure 3:
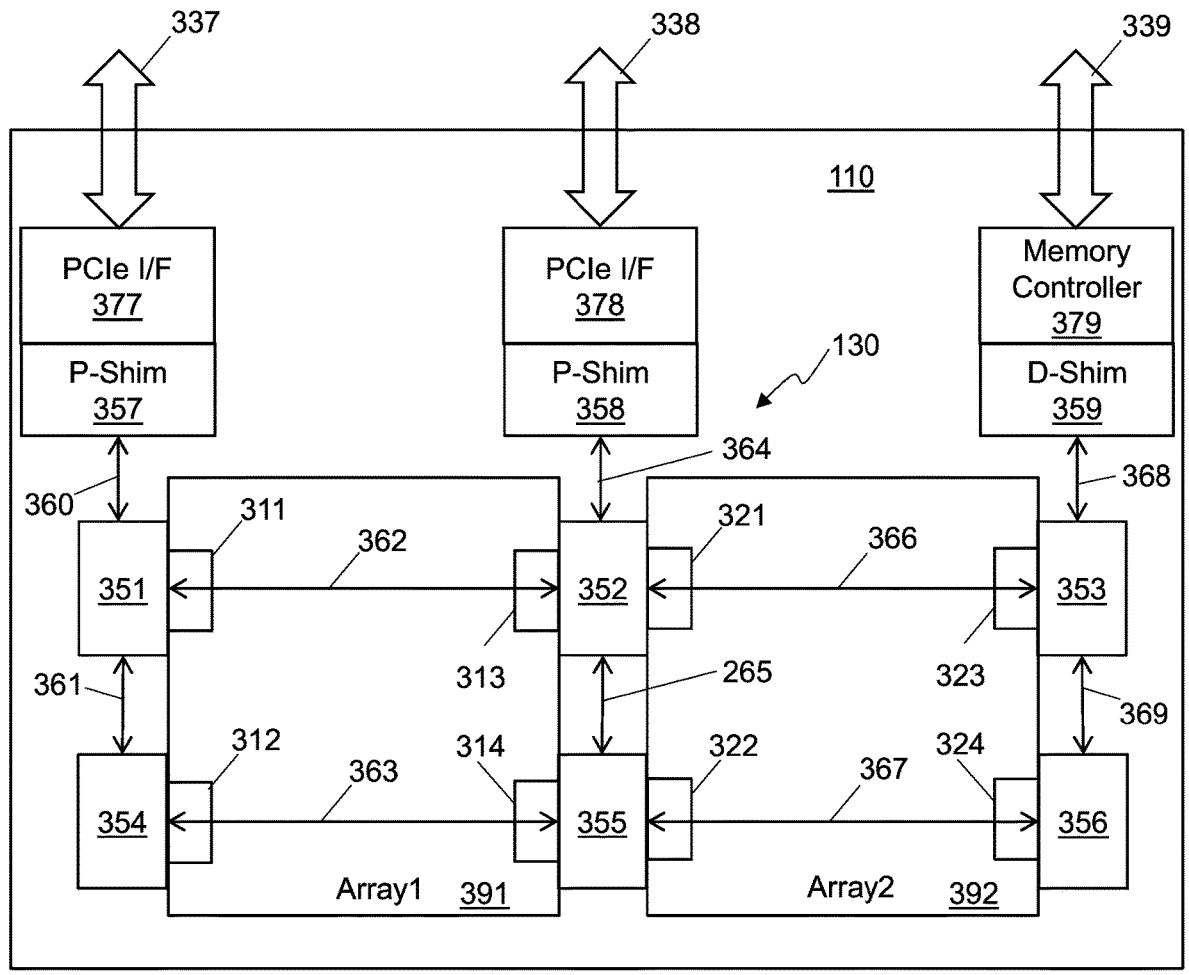
FIG. 3 illustrates example details of a coarse-grained reconfigurable (CGR) processor including a top-level network (TLN) and two CGR arrays.

FIG. 3 is a simplified block diagram of the example CGR processor 110 having a CGRA (Coarse Grain Reconfigurable Architecture). In this example, the CGR processor 110 has 2 CGR arrays (Array1 391, Array2 392), although other implementations can have any number of tiles, including a single tile. A CGR array 391, 392 (which is shown in more detail in FIG. 4) comprises an array of configurable units connected by an array-level network in this example. Each of the CGR arrays 391, 392 has one or more AGCUs (Address Generation and Coalescing Units) 311-314, 321-324. The AGCUs are nodes on both a top level network 130 and on array-level networks within their respective CGR array 391, 392 and include resources for routing data among nodes on the top level network 130 and nodes on the array-level network in each CGR array 391, 392.

The CGR arrays 391, 392 are coupled a top level network (TLN) 130 that includes switches 351-356 and links 360-369 that allow for communication between elements of Array1 391, elements of Array2 392, and shims to other functions of the CGR processor 110 including P-Shims 357, 358 and M-Shim 359. Other functions of the CGR processor 110 may connect to the TLN 130 in different implementations, such as additional shims to additional and or different input/output (I/O) interfaces and memory controllers, and other chip logic such as CSRs, configuration controllers, or other functions. Data travel in packets between the devices (including switches 351-356) on the links 360-369 of the TLN 130. For example, top level switches 351 and 352 are connected by a link 362, top level switches 351 and P-Shim 357 are connected by a link 360, top level switches 351 and 354 are connected by a link 361, and top level switch 353 and D-Shim 359 are connected by a link 368.

The TLN 130 is a packet-switched mesh network using an array of switches 351-356 for communication between agents. Any routing strategy can be used on the TLN 130, depending on the implementation, but some implementations may arrange the various components of the TLN 130 in a grid and use a row, column addressing scheme for the various components. Such implementations may then route a packet first vertically to the designated row, and then horizontally to the designated destination. Other implementations may use other network topologies and/or routing strategies for the TLN 130.

P-Shims 257, 258 provide an interface between the TLN 130 and PCIe Interfaces 377, 378 which connect to external communication links 337, 338 which may form part of communication links 185 as shown in FIG. 1. While two P-Shims 357, 358 with PCIe interfaces 377, 378 and associated PCIe links 337, 338 are shown, implementations can have any number of P-Shims and associated PCIe interfaces and links. A D-Shim 359 provides an interface to a memory controller 379 which has a DDR interface 339 and can connect to memory such as the memory 190 of FIG. 1. While only one D-Shim 359 is shown, implementations can have any number of D-Shims and associated memory controllers and memory interfaces. Different implementations may include memory controllers for other types of memory, such as a flash memory controller and/or a high-bandwidth memory (HBM) controller. The interfaces 357-359 include resources for routing data among nodes on the top level network (TLN) 130 and external devices, such as high-capacity memory, host processors, other CGRA processors, FPGA devices and so on, that are connected to the interfaces 357-359.

As explained earlier, in the system shown in FIG. 1 each CGR processor can include an array of CGR units disposed in a configurable interconnect (array level network), and the configuration file defines a data flow graph including functions in the configurable units and links between the functions in the configurable interconnect. In this manner the configurable units act as sources or sinks of data used by other configurable units providing functional nodes of the graph. Such systems can use external data processing resources not implemented using the configurable array and interconnect, including memory and a processor executing a runtime program, as sources or sinks of data used in the graph.

One of the AGCUs in each CGR array in this example is configured to be a master AGCU (MAGCU), which includes an array configuration load/unload controller for the CGR array. The MAGCU1 311 includes a configuration load/unload controller for CGR array 391, and MAGCU2 321 includes a configuration load/unload controller for CGR array 392. Some implementations may include more than one array configuration load/unload controller. In other implementations, an array configuration load/unload controller may be implemented by logic distributed among more than one AGCU. In yet other implementations, a configuration load/unload controller can be designed for loading and unloading configuration of more than one CGR array. In further implementations, more than one configuration controller can be designed for configuration of a single CGR array. Also, the configuration load/unload controller can be implemented in other portions of the system, including as a stand-alone circuit on the TLN and the ALN or ALNs.

Figure 4:
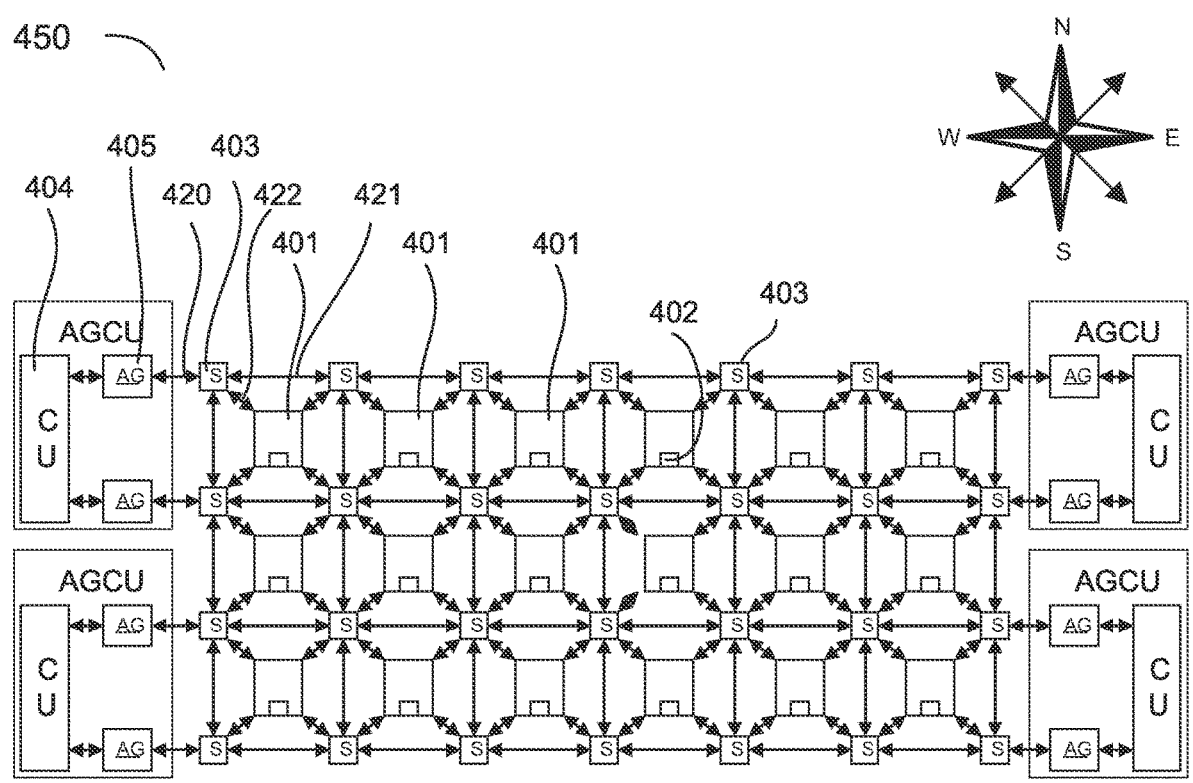
FIG. 4 illustrates an example CGR array, including an array of CGR units in an array-level network (ALN).

FIG. 4 illustrates an example CGR array 450, including an array of CGR units in an ALN. CGR array 450 may include several types of CGR unit 401, such as FCMUs, PMUs, PCUs, memory units, and/or compute units. For examples of the functions of these types of CGR units, see Prabhakar et al., "Plasticine: A Reconfigurable Architecture for Parallel Patterns", ISCA 2017, Jun. 24-28, 2017, Toronto, ON, Canada. Each of the CGR units may include a configuration store 402 comprising a set of registers or flip-flops storing configuration data that represents the setup and/or the sequence to run a program, and that can include the number of nested loops, the limits of each loop iterator, the instructions to be executed for each stage, the source of operands, and the network parameters for the input and output interfaces. In some implementations, each CGR unit 401 comprises an FCMU. In other implementations, the array comprises both PMUs and PCUs, or memory units and compute units, arranged in a checkerboard pattern. In yet other implementations, CGR units may be arranged in different patterns. The ALN includes switch units 403 (S), and AGCUs (each including two address generators 405 (AG) and a shared coalescing unit 404 (CU)). Switch units 403 are connected among themselves via interconnects 421 and to a CGR unit 401 with interconnects 422. Switch units 403 may be coupled with address generators 405 via interconnects 420. In some implementations, communication channels can be configured as end-to-end connections, and switch units 403 are CGR units. In other implementations, switches route data via the available links based on address information in packet headers, and communication channels establish as and when needed.

A configuration file may include configuration data representing an initial configuration, or starting state, of each of the CGR units that execute a high-level program with user algorithms and functions. Program load is the process of setting up the configuration stores in the CGR array based on the configuration data to allow the CGR units to execute the high-level program. Program load may also require loading memory units and/or PMUs.

The ALN includes one or more kinds of physical data buses, for example a chunk-level vector bus (e.g., 512 bits of data), a word-level scalar bus (e.g., 32 bits of data), and a control bus. For instance, interconnects 421 between two switches may include a vector bus interconnect with a bus width of 512 bits, and a scalar bus interconnect with a bus width of 32 bits. A control bus can comprise a configurable interconnect that carries multiple control bits on signal routes designated by configuration bits in the CGR array's configuration file. The control bus can comprise physical lines separate from the data buses in some implementations. In other implementations, the control bus can be implemented using the same physical lines with a separate protocol or in a time-sharing procedure.

Physical data buses may differ in the granularity of data being transferred. In one implementation, a vector bus can carry a chunk that includes 16 channels of 32-bit floating-point data or 32 channels of 16-bit floating-point data (i.e., 512 bits) of data as its payload. A scalar bus can have a 32-bit payload and carry scalar operands or control information. The control bus can carry control handshakes such as tokens and other signals. The vector and scalar buses can be packet-switched, including headers that indicate a destination of each packet and other information such as sequence numbers that can be used to reassemble a file when the packets are received out of order. Each packet header can contain a destination identifier that identifies the geographical coordinates of the destination switch unit (e.g., the row and column in the array), and an interface identifier that identifies the interface on the destination switch (e.g., North, South, East, West, etc.) used to reach the destination unit.

A CGR unit 401 may have four ports (as drawn) to interface with switch units 403, or any other number of ports suitable for an ALN. Each port may be suitable for receiving and transmitting data, or a port may be suitable for only receiving or only transmitting data.

A switch unit 403 may have eight interfaces. The North, South, East and West interfaces of a switch unit may be used for links between switch units using interconnects 421. The Northeast, Southeast, Northwest, and Southwest interfaces of a switch unit may each be used to make a link with an FCMU, PCU or PMU 401 instance using one of the interconnects 422. Two switch 403 units in each CGR array quadrant have links to an AGCU using interconnects 420. The AGCU coalescing unit arbitrates between the AGs and processes memory requests. Each of the eight interfaces of a switch unit can include a vector interface, a scalar interface, and a control interface to communicate with the vector network, the scalar network, and the control network. In other implementations, a switch unit may have any number of interfaces.

During execution of a graph or subgraph in a CGR array after configuration, data can be sent via one or more switch units and one or more links between the switch units to the CGR units using the vector bus and vector interface(s) of the one or more switch units on the ALN. A CGR array may comprise at least a part of CGR array 450, and any number of other CGR arrays coupled with CGR array 450.

A data processing operation implemented by CGR array configuration may comprise multiple graphs or subgraphs specifying data processing operations that are distributed among and executed by corresponding CGR units (e.g., FCMUs, PMUs, PCUs, AGs, and CUs).

Figure 5:
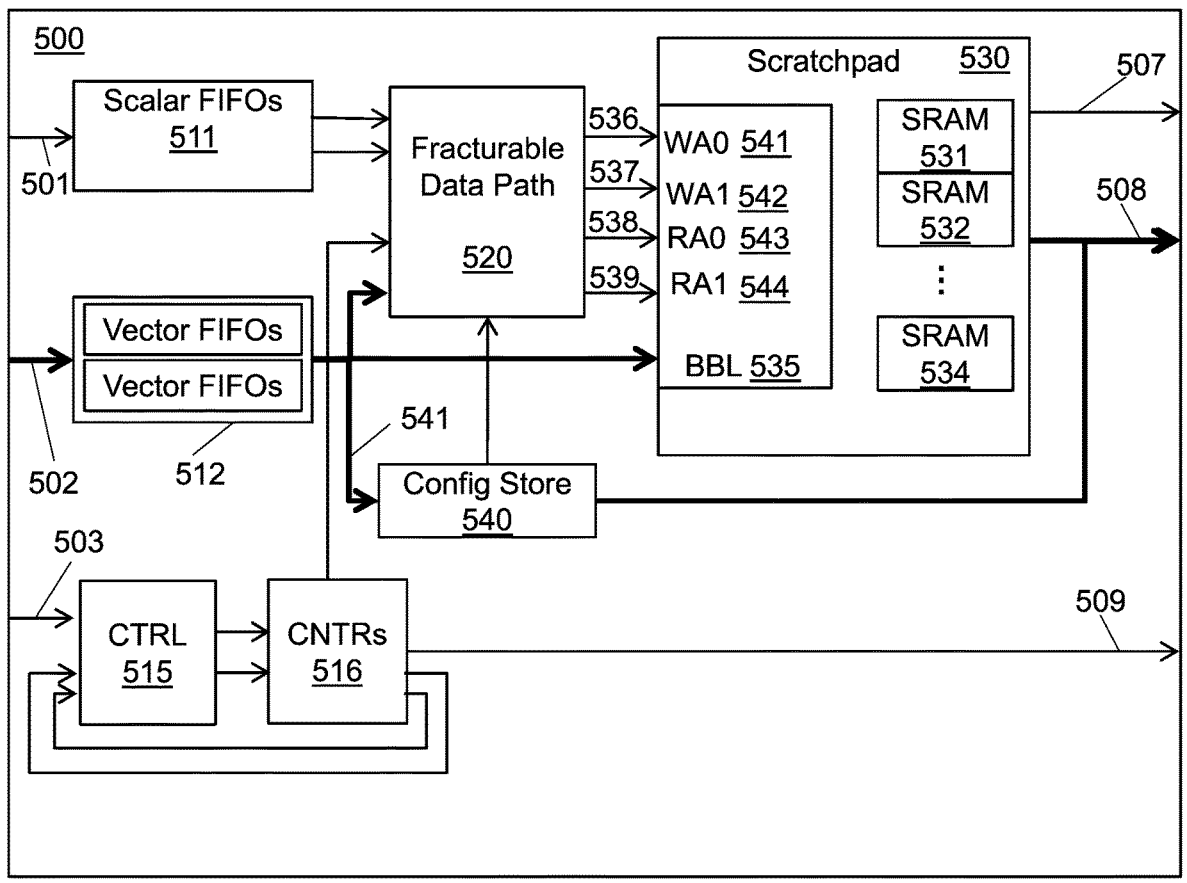
FIG. 5 is a block diagram illustrating an example of another configurable unit, such as a Pattern Memory Unit (PMU).

FIG. 5 is a block diagram illustrating an example configurable unit 500, such as a Pattern Memory Unit (PMU). A PMU 500 can contain scratchpad memory 530 coupled with a fracturable reconfigurable data path 520 intended for address calculation and control of the scratchpad memory 530, along with the bus interfaces, scalar input 501, scalar output 507, vector input 502, vector output 508, control input 503, and control output 509. The vector input 502 can be used to provide write data WD to the scratchpad 530. The data path 520 can be organized as a multi-stage reconfigurable pipeline, including stages having ALUs and associated pipeline registers PRs that register inputs and outputs of the functional units. A PMU 500 can be used to store distributed on-chip memory throughout the array of CGR units (120 in FIG. 1, 391, 392 in FIG. 3, or 450 in FIG. 4).

A scratchpad 530 may built with multiple SRAM banks (e.g., 531-534). Various embodiments may include any number of SRAM banks of any size, but in one embodiment the scratchpad may include 256 kilobytes (kB) of memory organized to allow at least one vector bus width of data (e.g., 128 bits or 16 bytes) at a time. Banking and buffering logic (BBL) 535 for the SRAM banks in the scratchpad 530 can be configured to operate in several banking modes to support various access patterns. The scratchpad 530 may be referred to as a multi-port memory as it can support multiple simultaneous accesses to the various banks 531-534.

The fracturable data path 520 can support concurrent generation of multiple addresses. Any number and combination of concurrently generated read addresses and write addresses can be supported, depending on the implementation. One implementation can support simultaneous generation of write address0 WA0 541, write address WA1 542, read address0 RA0 543, and read address1 RA1 544 via the links 536, 537, 538, and 539 respectively, to the banking buffering logic 535. Based on the state of the local FIFOs 511 and 512 and external control inputs, the control block 515 can be configured to trigger the write address computation, read address computation, or both, by enabling the appropriate counters 516. Any number of counters 516 may be included in the PMU 500, depending on the implementation, but some implementations may include 10, 14, 18, 22, 24 or a power of 2 separate counters. The control block 515 can trigger PMU execution through control output 509.

A PMU 500 in the array of configurable units include a configuration data store 540 to store unit files comprising a plurality of chunks (or sub-files of other sizes) of configuration data 541 particular to the PMU 500. The configuration data store 540 may be loaded similarly to the configuration data store 420 of FIG. 4 by unit configuration load logic connected to the configuration data store 540 to execute a unit configuration load process. The unit configuration load process includes receiving, via the bus system (e.g., the vector inputs), chunks of a unit file particular to the configurable unit and loading the received chunks into the configuration data store 540 of the configurable unit. The unit file loaded into the configuration data store 540 can include configuration data 541, such as, but not limited to, configuration and/or initialization data for the reconfigurable data path 520, the programmable counter chain 516, and the control block 515.

The fracturable data path 520 may utilize data from the scalar FIFOs 511, data from one or more lanes of the vector FIFOs 512, and immediate data from the configuration store 540 for calculation of the addresses 541-544. Implementations may have one set of scalar FIFOs 511 and vector FIFOs 512 for each port of the PMU connected to a switch of the ALN and/or other CGR unit. Some implementations may which lanes of the vector FIFOs 512 are made available to the fracturable data path 520, such as only providing lane 0 of each vector FIFO 512. Address calculation within memory 530 in the PMU 500 may performed in the PMU data path 520, while the core computation is performed within one or more PCUs in the CGR array.

Thus, a configurable unit of the CGR processor can include a multi-port memory 530 having a first address input (WA0) 541 associated with a first access port of the multi-port memory 530 and a second address input (WA1) 542 associated with a second access port of the multi-port memory 530. The first address input 541 coupled to the first output 536 of the fracturable data path 520 and the second address input 542 coupled to the second output 537 of the fracturable data path 520. In the example implementation shown in FIG. 5, the multi-port memory 530 also includes a third address input RA0 543 coupled to the third output 538 of the fracturable data path 520 which is associated with a third access port of the multi-port memory 530, and a fourth address input RA1 544 coupled to the fourth output 539 of the fracturable data path 520 which is associated with a fourth access port of the multi-port memory 530. In the example, the first access port associated with WA0 541 and the second access port associated with WA1 542 are write ports of the multi-port memory 530, and the third access port associated with RA0 543 and the fourth access port associated with RA1 544 of the multi-port memory 530 are read ports. But in other implementations, any number of ports for concurrent access may be supported by the multi-port memory 530 where an individual port may be dedicated to reads, dedicated to writes, or may be used for either a read or a write on the individual port.

Figure 6:
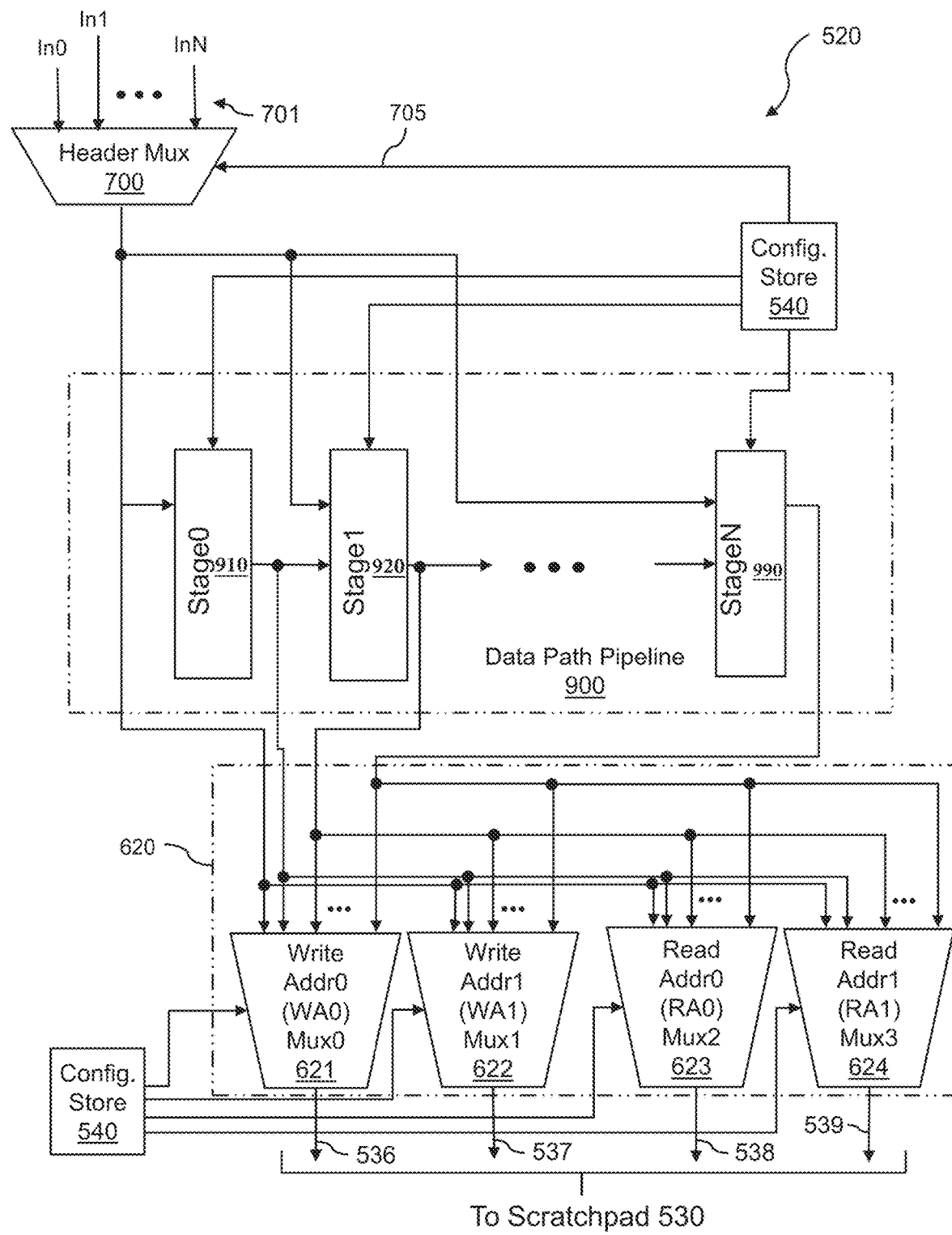
FIG. 6 illustrates an example hardware for a fracturable data path including a plurality of stages in a memory address computation pipeline, in an implementation of the present disclosure.

FIG. 6 illustrates an example implementation of a fracturable data path 520 including a data path pipeline 900, hereinafter "pipeline 900", further including a plurality of stages. Any number of stages, N, may be supported, depending on the implementation, including, but not limited to, any integer value between 4 and 32, such as 8, 12, or 16.

In one example, the pipeline 900 can be used for memory address computation. As shown the pipeline 900 includes multiple stages stage0 602, stage1 604, up to stageN 606 formed in such a way that the output of one stage is coupled the input of the next stage. Also shown in FIG. 6 are an input header multiplexer 700, the configuration store 540 (previous shown in FIG. 5), and four output multiplexers 620 including a write address0 (WA0) multiplexer mux0 621 providing the first output 536, a write address1 (WA1) multiplexer mux1 622 providing the second output 537, a read address0 (RA0) multiplexer mux2 623 providing the third output 538, and a read address1 (RA1) multiplexer mux3 624 providing the fourth output 539. The inputs of the output multiplexers 620 may be the same for each of the multiplexers 621-624 and include outputs of each of the stages of the data path pipeline 900, although in some cases the inputs of the different multiplexers 621-624 may be different, such as being limited only to header outputs related to an operation associated with that multiplexer's output. The inputs of the output multiplexers 620 may be coupled to outputs of each sub-path of each stage of the pipeline 900, or may be coupled to a subset of the outputs of the sub-paths of the stages of the pipeline 900, such as only coupling to outputs of a first sub-path of each stage of the pipeline 900. The inputs of the output multiplexers 620 may also include the outputs of the header mux 700 in some implementations. The outputs 536-539 are respectively connected to the write address0 WA0 541, write address1 WA1 542, the read address0 RD0 543, and the read address1 RD1 544 of the multi-port memory 530.

Figure 7:
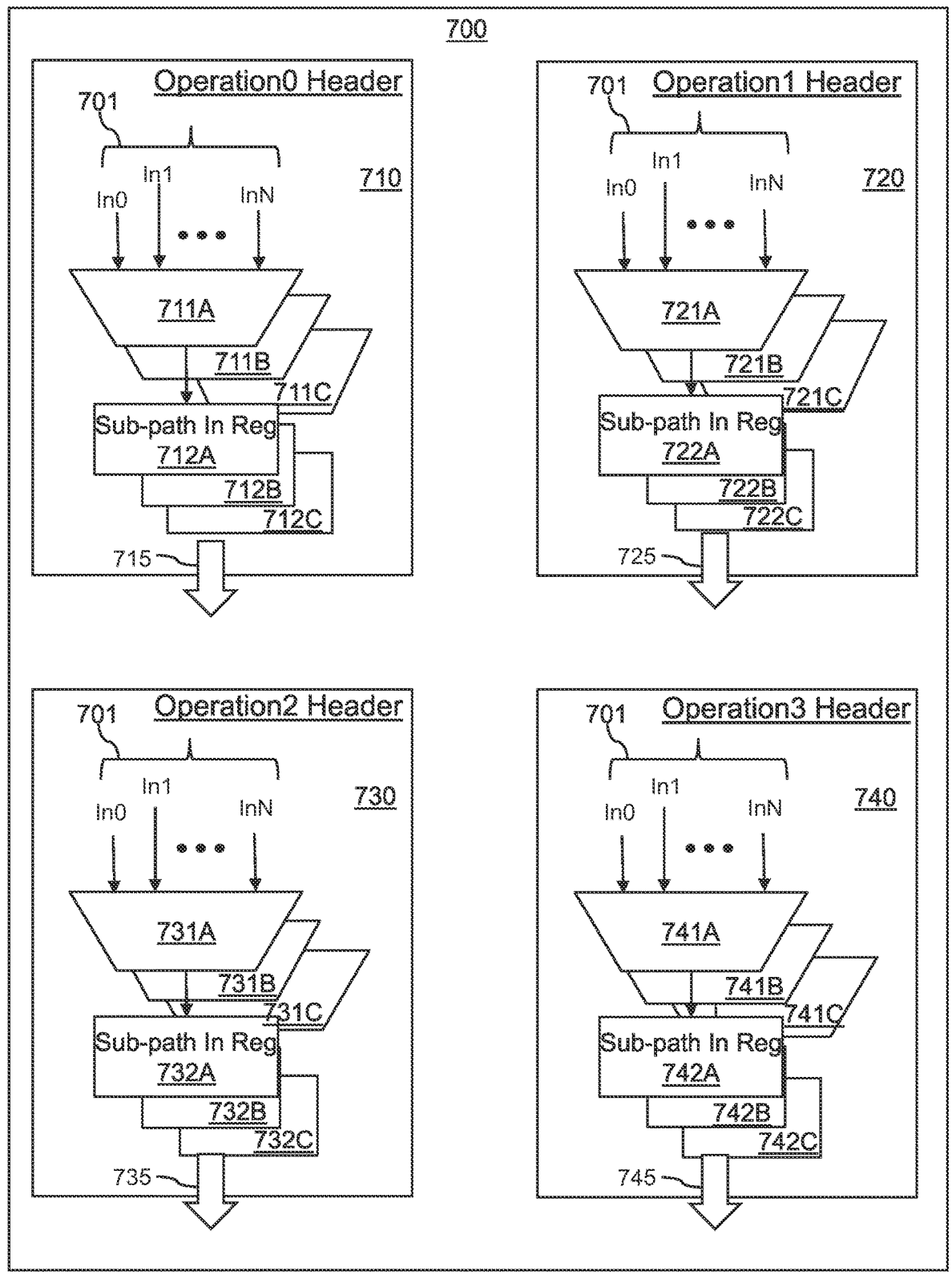
FIG. 7 illustrates an example implementation of the header mux 700 shown in FIG. 6, in an implementation of the present disclosure.

As shown, each stage 910-990 is configured to receive configuration data from configuration store 540. Each stage is further configured to receive inputs from the header mux 700 and configured to provide an output to the next stage and also to each of the output multiplexers 621, 622, 623, and 624 (collectively output multiplexers 620). The header mux 700, which may include multiple multiplexers and registers (as shown in FIG. 7), allows inputs to the fracturable datapath 520 to be selected for use by the pipeline 900 under control of configuration information 705 from the configuration store 540. Inputs In0-InN 701 to the header mux 700 can include outputs of one or more Scalar FIFOs 511 connected to different scalar bus input ports 501 to the configurable unit 500, outputs of one or more lanes of one or more vector FIFOs 512 connected to different vector bus input ports 502 to the configurable unit 500, and outputs of one or more counters 516 in the configurable unit 500. Other implementations may include other inputs and/or exclude one or more of the inputs to the header mux 700 listed above. The header mux 700 may also provide different inputs to the different sub-paths of the pipeline 900.

The pipeline 900 is configured to calculate addresses for accesses to the scratchpad memory 530 of the configurable unit 500. Each stage 910-990 includes an arithmetic logic unit that can perform arithmetic, Boolean, and/or logical operations on inputs to the stage, and an output pipeline register as is shown in more detail in FIG. 8. The address computation process may require many arithmetic and logic operations to be performed by the memory address computation pipeline 700. In implementations, each of these operations can be assigned to a separate and independent set of stages from the plurality of stages. So depending on the number of ALU operations required for a particular address calculation, a different number of stages can be assigned to the set of stages for that operation. A higher number of stages increases the latency in calculating the address, as each stage of the pipeline included in the set of stages for the operation adds one pipeline clock of delay.

The pipeline 900 may be divided into multiple sub-paths where a sub-path is a portion of the width of the data passed through the pipeline. The pipeline 900 can have any data width and can be divided into any number of sub-paths, although the width of each sub-path can impact the size of memory which can be addresses using data from a single sub-path. In one example, the pipeline 900 may be 192 bits wide and broken into 8 sub-paths that are each 24 bits wide allowing up to 16 megabytes (MB) of memory to be addressed. In another example, the 192 bit wide pipeline 900 may be divided into 6 sub-paths that are each 32 bits wide allowing for full 32 bit addressing. Another implementation may utilize a 256 bit wide pipeline with four 64 bit wide sub-paths. Some implementations may include non-homogenous sub-paths having different widths, such as a specialized sub-path to support certain operations in the BBL 535. An example of operations of the BBL 535 which may not require as many bits as is required for a memory address include a rotate function to rotate the data between lanes of a vector. Some implementations may even provide a set of specialized Boolean outputs for various operations in the BBL 535 so that a sub-path can be as small as a single bit.

So, an example coarse-grained reconfigurable (CGR) processor 110 includes an array of configurable units 120 including a first configurable unit, which may be a configurable memory unit 500. The first configurable unit 500 includes a fracturable data path 520 with a plurality of sub-paths. The fracturable data path 520 includes a plurality of stages 910-19, including an initial stage 910, one or more intermediate stages 920, and a final stage 990. Each stage of the plurality of stages 910-990 includes its own arithmetic logic unit (ALU), selection logic to select two or more inputs for the ALU, and sub-path pipeline registers. The fracturable data path 520 also has a first output 536 configurable to provide first data selected from any one of the sub-path pipeline registers and a second output 537 configurable to provide second data selected from any one of the sub-path pipeline registers different from that selected for the first output 536. The first configurable unit 500 also includes a configuration store 540 to store configuration data to provide a plurality of immediate data fields for each stage of the plurality of stages 910-990 and configuration information to the ALUs and selection logic in the plurality of stages 910-990. In some implementations, two immediate data fields are provided for each stage in in other, three immediate data fields are provided for each stage, although other implementations may provide different numbers of immediate data fields per stage including implementations that have varied numbers of immediate data fields per stage. The configuration data is also used to select the first data and the second data for the first output 536 and the second output 537, respectively. In some implementations, the fracturable data path includes a third output 538 configurable to provide third data selected from any one of the sub-path pipeline registers and a fourth output 539 configurable to provide fourth data selected from any one of the sub-path pipeline registers, and the configuration store 540 is adapted to provide configuration data to select the third data and the fourth data for the third output 538 and the fourth output 539, respectively.

FIG. 7 illustrates an example implementation of the header mux 700. Implementations may include one set of multiplexers and registers for each address calculation to be concurrently calculated. In one example, the header mux 700 can further include four operation headers, operation0 header 710, operation1 header 720, operation2 header 730, and operation4 header 740, to support four concurrent address calculations by the fracturable data path 520. Each of these headers 710, 720, 730, 740 can include a multiplexer and register for each sub-path of the pipeline 900, so that there is a set of input multiplexers and a set of sub-path input registers for each operation. As was discussed above, the pipeline 900 can have any number of sub-paths, but only 3 sub-paths are shown in the examples of FIGS. 7-10. Each multiplexer for each sub-path in each operation header may be provided with the same set of inputs in0-inN 701, but some implementations may provide different inputs to the different multiplexers.

In the example shown, the operation0 header 710 includes a first set of three input multiplexers 711A, 711B, 711C, each coupled to receive the plurality of inputs in1-inN 701 and having outputs respectively coupled to a first set of three sub-path input registers 712A, 712B, 712C. Similarly, the operation1 header 720 includes a second set of three multiplexers 721A, 721B, 721C, each coupled to receive the plurality of inputs in1-inN 701 and having outputs respectively coupled to a second set of three sub-path input registers 722A, 722B, and 722C. The operation2 header 730 includes a third set of three multiplexers 731A, 731B, 731C, each coupled to receive the plurality of inputs in1-inN 701 having outputs respectively coupled to a third set of three sub-path input registers 732A, 732B, 732C. The operation3 header 740 includes a fourth set of three multiplexers 741A, 741B, 741C, each coupled to receive the plurality of inputs in1-inN 701 having outputs respectively coupled to a fourth set of three sub-path input registers 742A, 742B, 742C. Each of the 12 multiplexers in the header 100 may be individually controlled by configuration information 705 from the configuration store 540. Some implementations may, however, have shared control of one or more of the multiplexers, depending on the implementation.

Thus, the CGR processor 110 can include input multiplexers 711A/B/C having outputs respectively coupled to inputs of the first set of sub-path input registers 712A/B/C. Each of the input multiplexers 711A/B/C selects, for its respective sub-path input register 712A/B/C, between a first input coupled to a scalar bus 501 of the array of configurable units 120, a second input coupled to a lane of a vector bus 502 of the array of configurable units 120, and a third input coupled to a counter 516 of the first configurable unit 500. The fracturable data path 520 of the first configurable unit 500 can also include a second set of sub-path input registers 722A/B/C associated with a second calculation, where the first set of sub-path input registers 712A/B/C are associated with a first calculation.

As those skilled in the art can appreciate, each multiplexer 711A/B/C in the operation0 header 710, can independently select one of the inputs in1-inN 713 to couple the selected input to its corresponding sub-path input register 712A/B/C, which further provides the registered selected inputs to the output 715 of the operation0 header 710. The other operation headers, operation1 header 720, operation2 header 730, and operation4 header 740 are all also configured as explained above. The output 715 can be collectively referred to as operation0 header output, the output 725 can be collectively referred to as operation1 header output, the output 725 can be collectively referred to as operation2 header output, and the output 735 can be collectively referred to as operation3 header output. The header outputs 715, 725, 735, 745 each provide data for each sub-path of the pipeline 900. More particularly, as will be explained in more detail with regard to FIG. 8, each of these header outputs 715, 725, 735, 745 allow any combination of the inputs in1-inN 701 to be provided to the different sub-paths of the pipeline 900 to be operated upon by the ALUs in a pipelined fashion. In addition, some implementations provide the header outputs 715, 725, 735, 745 to the output multiplexers 620. This allows an output 536-539 of the fracturable data path 520 to provide one of the inputs in1-inN 701 directly (with a 1 clock delay for the sub-path input register) as the output without using any of the stages of the data path pipeline 900. In some implementations, the outputs of only one operation's the sub-path input registers may be provided to a particular output multiplexer. So for example the operation0 header output 715 may be provided to the write address0 multiplexer 621 without being provided to the other output multiplexers 622-624. Similarly, the operation1 header output 725 may only be provided to the write address1 multiplexer 622, the operation2 header output 735 may only be provided to the read address0 multiplexer 623, and the operation3 header output 745 may only be provided to the read address1 multiplexer 624.

Figure 8:
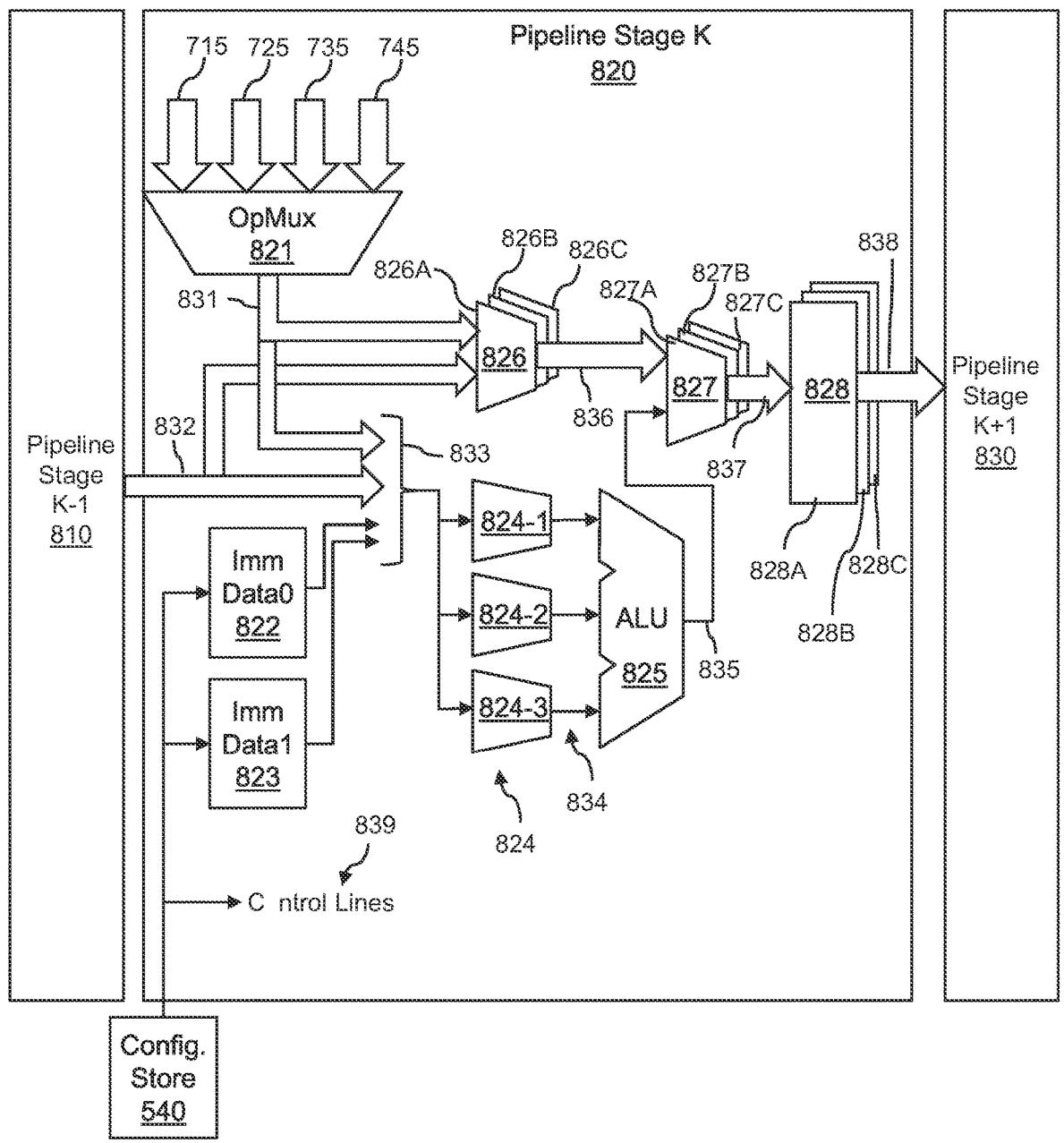
FIG. 8 illustrates details of an example of a stage in the memory address computation pipeline shown in FIG. 6, in an implementation of the present disclosure.

FIG. 8 illustrates details of an example arbitrary stageK 820 in the pipeline 900 shown in FIG. 6, according to an implementation of the present disclosure. Each stages of the pipeline 900 may be similar to the stageK 820.

As shown, the stageK 820 includes an operation multiplexer 821 coupled to receive the operation header outputs 715, 725, 735, 745. The operation multiplexer 821 can be controlled by control lines 839 from the configuration store 540 and can select the appropriate operation header output based on which operation has been assigned to stageK 820. So if stageK 820 is being used for a calculation of operation0, the operation0 header output 715 is selected by toc operation multiplexer 821 for use by stage K 820 as header data 831. Note that in the implementation shown, each sub-path of stageK 820 is provided with header data 831 from the same operation header, but other implementations may allow different sub-paths to receive data from different operation headers.

Stage K 820 also includes an ALU 825, a set 824 of ALU input multiplexers 824-1, 824-2, and 824-2, a set 826 of pipeline/header selection multiplexers 826A, 826B, 826C, and a set 827 of ALU bypass multiplexers 827A, 827B, and 827C, and a pipeline register 828 containing sup-path pipeline registers 828A, 828B, and 828C. The operations mux 821 and the set 824 of ALU input multiplexers may together be referred to as the selection logic. The set 824 of ALU input multiplexers, the set 826 of pipeline/header selection multiplexers, and the set 827 of ALU bypass multiplexers are controlled by control lines 839 from the configuration store 540.

In one example implementation, the ALU 825 is a three input ALU and each of the ALU inputs is coupled to receive data 834 selected from a set of possible ALU inputs 833 via the first set of multiplexers 824. The set of possible ALU inputs include the three sub-paths of the selected operation header data 831 from the operation multiplexer 821, the outputs of the three sub-path pipeline registers 832 of the immediately preceding pipeline stage K-1 810, and immediate data0 822 and immediate data1 from the control store 540. Implementations may not provide all of the inputs listed for each stage and/or may provide additional inputs such as additional immediate registers or other operation header data. For example, the initial stage, stage0 910, of the pipeline 900 does not have an immediately preceding stage so it cannot select sub-path registers from the immediately preceding stage. Thus, the selection logic in the one or more intermediate stages 920 and the final stage 990 may be adapted to select from at least outputs of the sub-path pipeline registers of an immediately preceding stage, outputs of the first set of sub-path input registers 712A/B/C, and the plurality of immediate data fields associated with that stage and provided by the configuration store 540, while the selection logic in the initial stage 910 may be adapted to select from the outputs of the first set of sub-path input registers 712A/B/C and the plurality of immediate data fields associated with the initial stage and provided by the configuration store 540. In addition, the selection logic may be adapted to allow selection between the first set 712A/B/C of sub-path input registers and the second set 722A/B/C of sub-path input registers based on whether the stage is associated with the first calculation or the second calculation. The selection logic may also be configurable to provide a first immediate data field 822 to the first input of the ALU 825 of the stage and a second immediate data field 823 to the second input of the ALU 825 of the stage.

The data 834 provided to the three inputs to the ALU 825 by the selection logic 824 are operands on which the ALU can perform arithmetic, Boolean, and/or logical operations. The ALU 825 may be able to perform a wide variety of operations that may have different numbers of operands, depending on the implementation. In one example, the ALU 825 may be able to perform one or more of the following operations on a number of operands provided in paratheses: unsigned integer addition (2 or 3), unsigned integer subtraction (2), signed integer multiplication (2), unsigned multiply and add (3), signed integer addition (2 or 3), signed integer subtraction (2), unsigned integer multiplication (2), signed multiply and add (3), bitwise AND (2 or 3), bitwise OR (2 or 3), bitwise XOR (2 or 3), bitwise NOT (1), logical AND (2 or 3), logical OR (2 or 3), logical XOR (2 or 3), clamp (3), select (3), compare (2), shift right (2), shift left (2), rotate right (2), and/or rotate left (2). Different implementations may include all or some of the previously listed operations and may or may not include other operations. The ALU operation of each stage is controlled by control lines 839 from the configuration store 540 and the result of the ALU operation is provided at the ALU output 835. In various implementations, the ALU may be capable of both signed and unsigned arithmetic, may have a first input, a second input and a third input, and/or may have a propagation delay of less than one clock cycle of the first configurable unit 500 to allow for pipelined operation of one clock per pipeline cycle.

Additionally, each multiplexer of the set 826 of pipeline/header selection multiplexers is coupled to output either a selected operation header data 831 or corresponding data 832 from the sub-path pipeline registers previous pipeline stage K-1 810. In some implementations each of the multiplexers 826A, 826B, 826C of the set 826 of the pipeline/header selection multiplexers may be controlled together, so that each multiplexer 826A, 826B, 826C selects the selected header data 832 or each multiplexer 826A, 826B, 826C selects the data 832 from the previous pipeline stage K-1 810. For example, in one example operation, the operation multiplexer 821 may select the output 715 of the operation0 header 710 and provide that data 831 as one input to each pipeline/header selection multiplexer 826A, 826B, 826C, with the data 832 from the sub-path pipeline registers of the previous pipeline stage K-1 810 as another input. As explained previously, 715 is the output of operation0 header 710 and can include any combination of the input data in1-inN 701. As such, the multiplexers 826 are coupled to output either a portion of the input data in1-inN 701 or data from the previous stage sub-path pipeline registers.

In this example, the outputs 836 of the three multiplexers 826 are further provided to each of the ALU bypass multiplexers 827A, 827B, 827C along with the ALU output 835. The output of the set 827 of ALU bypass multiplexers are used as inputs to the pipeline register 828. The ALU bypass multiplexers 827A, 827B, 827C may be individually controlled so that one of them selects the ALU output 835 and the others select the corresponding output 836 of the set 826 of pipeline/header selection multiplexers. As such, bypass logic (including the set 826 of pipeline/header selection multiplexers and the set 827 of ALU bypass multiplexers) is configurable to select a first sub-path pipeline register (e.g. sub-path pipeline register 828A) to receive an output of the ALU as its input, and to select a second sub-path pipeline register (e.g. sub-path pipeline register 828B) to receive an output 832 of a corresponding sub-path pipeline register of an immediately preceding stage 810 or an output 831 of a corresponding sub-path input register of the first set of sub-path input registers (e.g. sub-path input registers 712A/B/C).

As can be seen, the imm data0 822 and imm data1 823 are data received from the configuration store 540. Also received from the config store is a set of control lines 839 which can provide the necessary control for the various multiplexers and the ALU 825. Additionally, although the example shows two instances of immediate data 822 and 823, there can be many instances as can be required by the design needs, such as three separate immediate data fields for each stage. In other implementations, there may be a set of immediate data fields dedicated for each operation instead of or in addition to those dedicated to each stage. Some implementations may also include global immediate data fields useable by any stage for any operation. As such, it may be appreciated that the ALU in each stage can receive a plurality of operands selected from among any of the plurality of immediate data, any of the plurality of previous stage sub-path pipeline registers, and any of the plurality of the header data. Each stage can further provide any combination of the ALU data, the header data, and the previous stage pipeline data to the next stage.

The fracturable data path 520 may be divided into separate sets of contiguous stages to allow concurrent calculation of multiple addresses using separate address calculations. The configuration data in the configuration 540 provides the information needed to perform the operations. While the fracturable data path 520 may be configured in many different ways, the pipeline 900 may be broken into contiguous sets of stages, with one set of stages assigned to each concurrent operation. The operation mux 821 may be set to select the operation header output associated with the assigned operation for that stage.

For some operations, a single stage may be sufficient for the necessary calculation, so some sets of stages may include a single stage. Thus, in such cases, the starting stage and the ending stage are the same stage. For a single stage set, the necessary inputs are selected using the multiplexers of the appropriate operation header, with one sub-path input register used for each necessary input and the operation mux configured to pass the appropriate operation header output into the stage. The ALU input multiplexers 824 can then be used to select those inputs for the ALU operation which is then directed into one of the sub-path pipeline registers, such as sup-path pipeline register 828A where it can then be selected as an address for the memory using one of the output multiplexers 620. In some implementations, inputs of the output multiplexers are coupled only to a predetermined sub-path pipeline register of each stage for simplicity.

For other operations, the set of stages assigned to the operation includes a starting stage and an ending stage. If the set of stages includes more than 2 stages, there may be one or more transitional stages positioned between the starting stage and the ending stage. The necessary inputs are selected using the multiplexers of the appropriate operation header, with one sub-path input register used for each necessary input and the operation mux configured to pass the appropriate operation header output into at least the starting stage. In many implementations, the ending stage and any transitional stages won't utilize data from the operation mux 821 to avoid complicating the pipelining of data through the set of stages. The selection logic of the starting stage avoids selecting an output of the sub-path pipeline registers of an immediately preceding stage as any input of the two or more inputs to the ALU of the first starting stage as the stage immediately preceding the starting stage is not a part of the set of stages for the operation being performed. The operation may be broken into steps that can be performed by an ALU in one clock cycle and the proper inputs for that ALU selected from the selected operation header output or the immediate fields for that stage and the ALU performs the operation and the bypass logic directs that ALU output to one of the sub-path pipeline registers while directing the selected operation header sub-path data to the other sub-path pipeline registers in the starting stage, while directing the previous stage sub-path pipeline registers into the other sub-path pipeline registers in the ending stage and any transitional stages. This allows the selected header inputs from the same clock to be used throughout the calculation, simplifying the pipelining. In some implementations, the output multiplexers are configured to only select between a predetermined sub-path pipeline register of each stage for simplicity, so the ending stage would direct the ALU output to that predetermined sub-path pipeline register. The output multiplexers 620 can be configured to provide data from that sub-path pipeline register of the first ending stage for the output associated with the operation.

A second set of contiguous stages of the plurality of stages may be assigned to another operation. the second set of contiguous stages may be adjacent to and disjoint from the first set of contiguous stages, although other configurations are possible. The second set of contiguous stages includes a second starting stage immediately following the first ending stage, and a second ending stage. The selection logic of the second starting stage is configured to not select an output of the sub-path pipeline registers of the first ending stage as any input of the two or more inputs to the ALU of the second starting stage, and to configure the second output to provide data from the sub-path pipeline register of the second ending stage as the second data.

Note that the set of sub-path pipeline registers in a set of stages can be thought of as a register bank for the operation, where instead of using the same register location each time an instruction needs to use that register, the sub-path pipeline registers each represent the state of those registers at a specific point in time. Thus, the number of sub-paths becomes equivalent to the number of registers available for an operation. If an operation used three stages, and the first input is received at clock 1, the second input received at clock 2, the third input received at clock 3, and the result of the calculation for the first input available at clock 4, the sub-path pipeline registers each have data from a different one of the three calculations. The sub-path pipeline registers of the ending stage has the result of the calculation using the first input, the sub-path pipeline registers of the transitional stage has the partial results of the calculation using the second input, and the sub-path pipeline registers of the staring stage has partial results of the calculation using the third input.

Figures 9A, 10A:
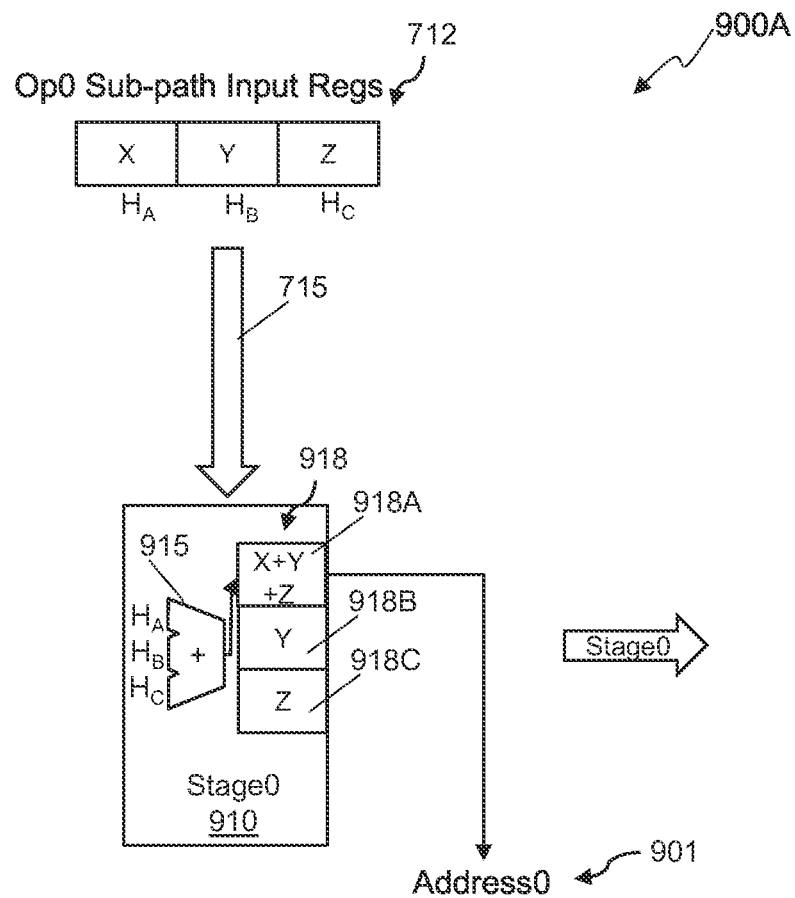
FIGS. 9A to 9D illustrate example operations performed fracturable data path 700, in an implementation of the present disclosure.
FIGS. 10A to 10D illustrate example state tables corresponding to the example operations shown in FIGS. 9A to 9D respectively, in an implementation of the present disclosure.
Figures 9B, 10B:
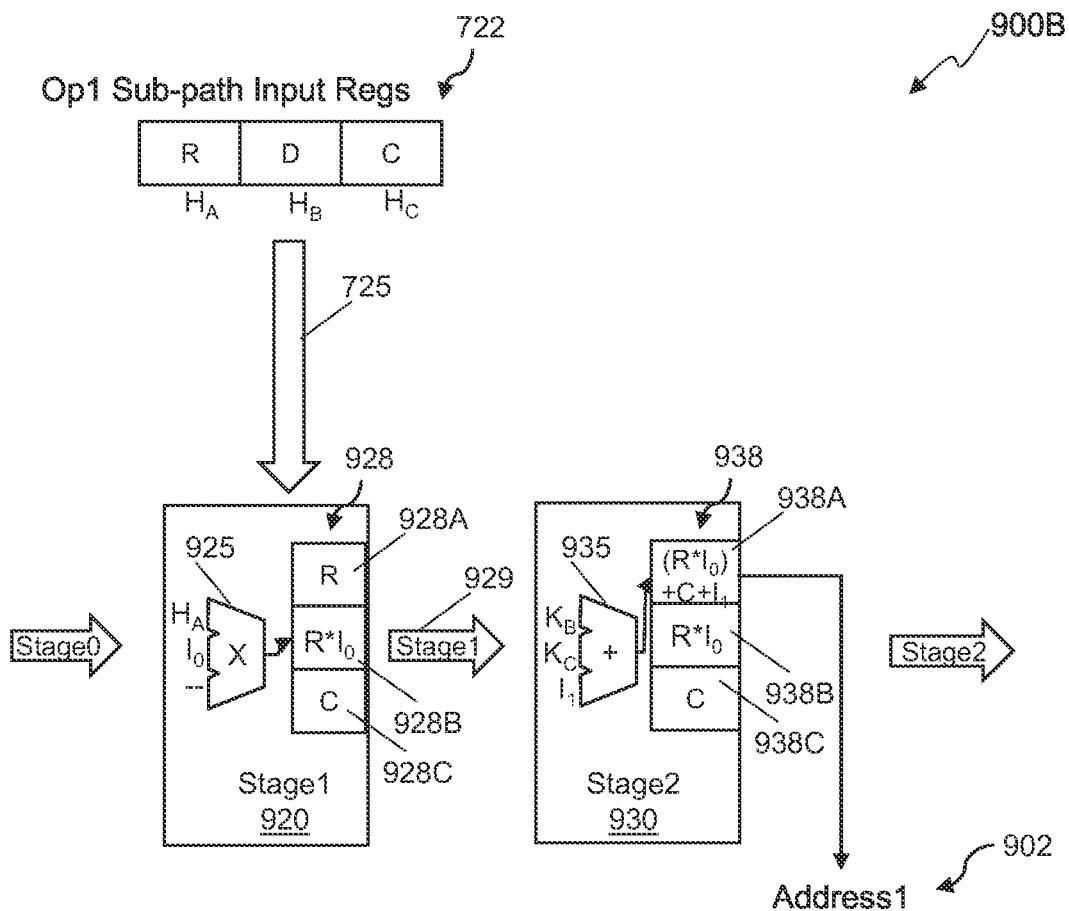
Figures 9C, 10C:
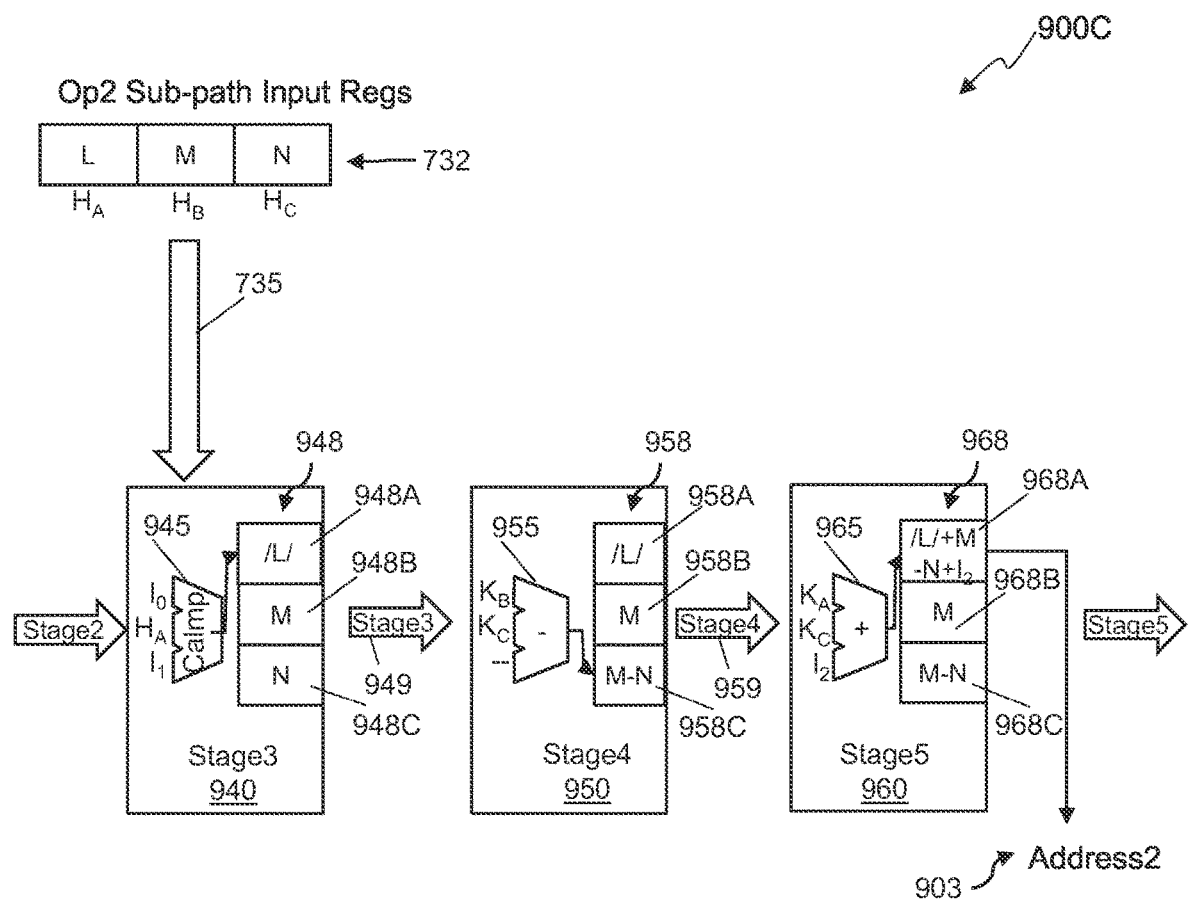
Figures 9D, 10D:
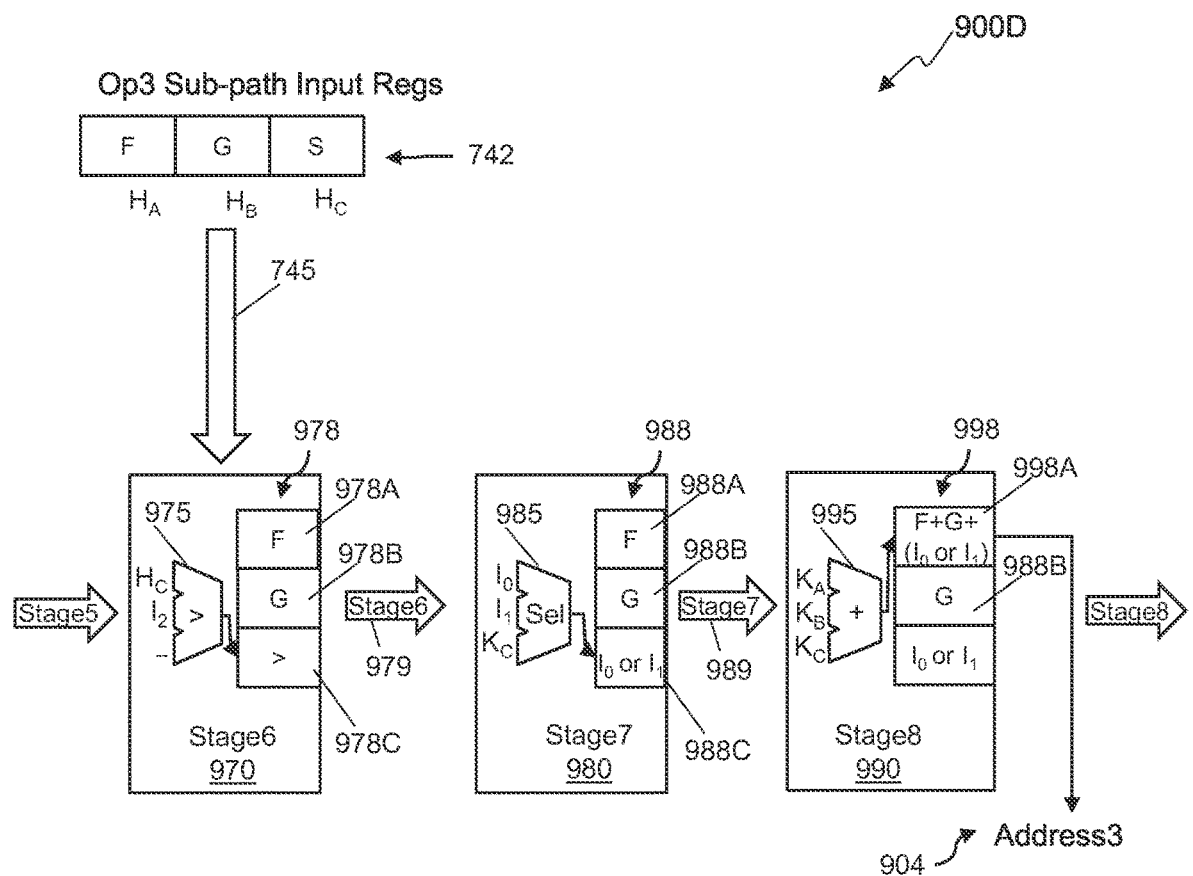

FIGS. 9A to 9D illustrate example operations performed by a fracturable data path similar to that shown in FIG. 5-8 broken into 4 sets of contiguous stages. FIGS. 10A-10D show pipeline tables for the associated set of contiguous stages executing an assigned operation. FIG. 9A shows the first set 900A of contiguous stages, which is a single stage. FIG. 9B shows the second set 900B of contiguous stages, FIG. 9C shows the third set 900C of contiguous stage, and FIG. 9D shows the fourth set 900D of contiguous stages. Note that the four sets 900A, 900B, 900C, 900D of contiguous stages may or may not be adjacent to each other. That is to say, there could be unused pipeline stages positioned between the sets 900A, 900B, 900C, 900D, depending on a number of stages provided in the implementation and how the individual stages are assigned in the configuration data.

It may be noted that for FIGS. 9A-9D, any data (operands) from the header sub-path input registers may be indicated by the letter "H", any data (operands) from a previous stage may be indicated by the letter "K", and any immediate data (operands) may be indicated by the letter "I". Please also note that FIGS. 9A-9D leave out the various multiplexers in the stages for clarity of the drawings, but each stage includes the multiplexers shown in stageK 820 of FIG. 8.

FIG. 9A shows the first set 900A of contiguous stages, a set of one stage (stage0 910), which is assigned to operation 0. The calculation for operation 0 in this example is X+Y+X where X is data received through a first port of the configurable unit's scalar bus, Y data received through a second port of the configurable unit's scalar bus, and X is a counter in the configurable unit. Stage0 910 could be any stage of the pipeline 900 shown in FIG. 6, including stage0 910. The ALU 915 can be one example of the ALU 825 as shown in FIG. 8.

The stage0 910 is configured to calculate an address0 901. As can be seen, the stage0 910 is coupled to receive data (operands) from the operation0 header output 715 which is driven from the operation0 sub-path input registers 712 of the operation header 710. The multiplexer 711A is set to select X from a first scalar FIFO, multiplexer 711B is set to select Y from a second scalar FIFO, and multiplexer 711C is set to select Z from the counter. Each clock cycle, a new copy of X, Y, and Z may be loaded in the operation 0 sub-path input registers 712.

The ALU 915 in this example is configured to perform an addition operation on the operands X, Y, and Z respectively. It may be understood that for the illustrated stage0 910, the pipeline register 918 are an example of the pipeline register 828 shown in FIG. 8. The ALU input multiplexers select the header data sub-paths carrying the desired operands X, Y, and Z as the inputs for the ALU. The ALU 915 can perform the 3-operand addition operation and provide the result of the operation (X+Y+Z) at its output.

The pipeline/header selection multiplexers are set to select the header data (although it is not important what is selected in this single stage case) and the ALU bypass multiplexers send the ALU output to the sub-path pipeline register 918A, and the operands Y and Z to the remaining two pipeline registers 918B and 918C respectively. The value (X+Y+Z) of the register 918A can be a memory address0 901 which is further provided to the output multiplexers 620 shown in FIG. 6. Furthermore, as can be understood, the memory address0 901 can be one of the addresses of the write address0 WA0 541. Furthermore, the memory address0 901 may also be provided to the next stage, although many implementations may not utilize this functionality to pass data between sets of stages.

A new copy of X, Y, and Z are latched into the operation 0 sub-path input registers each clock cycle and the result of the addition of that copy of X, Y, and Z is latched into the sub-path pipeline register on the next clock as a new copy of X, Y, and Z are received. Thus, the calculation of operation 0 can be pipelined with a 1 clock pipeline latency.

FIG. 10A illustrates an example of a pipeline table 1000A corresponding to the addition operation shown in FIG. 9A. Shown in the table 1000A are values of operands X, Y, Z latched into the operation sub-path input registers over a few clock cycles indicated in the column marked "CLK". The table 1000A further shows an address (indicated in the column marked as address0), latched into the sub-path pipeline register on each clock cycle. At clock 1, the values of X, Y, and Z (operands) are 1, 2, and 3 respectively. In the example implementation, the ALU itself has a propagation delay (or latency) of less than one clock, so the results of the ALU operation can be latched into the sub-path pipeline register by the clock immediately following new data being latched into the sub-path input registers, so address0 based on the first clock's X, Y, and Z values is latched into the sub-path pipeline register at clock cycle 2. So, at clock 2, an address0 value of 6 based on the addition operation of (1+2+3) is available. Additionally, at clock 2, new operands (3,3,6) are latched into the sub-path input registers and the result of their calculation (12) may be available at clock 3. Similarly, at clock 3, the new operands (4,1,0) can be received with their calculation result (5) being available at clock 4. Furthermore, at clock 4, new operands (1,1,1) can be received, with their calculation result (3) being available at clock 5. The operation in this example can be considered a one-stage operation. Some other operations which can require multiple ALUs or stages for calculation of memory addresses will be explained with reference to FIGS. 9B to 9D.

Illustrated in FIG. 9B is an example of a two-stage operation shown as operation 1 assigned to a second set of contiguous stages the consist of stage1 920 and stage2 930. The stages 920 and 930 can be examples of the stages shown in FIG. 6 and the ALUs 925 and 935 can be examples of the ALU 825 shown in FIG. 8. Also shown in stage1 920 are sub-path pipeline registers 928A, 928B, and 928C collectively referred to as pipeline register 928, and in stage2 930 are sub-path pipeline registers 938A, 938B, and 938C, collectively referred to as pipeline register 938. The pipeline registers 928, 938 can be examples of the pipeline register 828 shown in FIG. 8. The stage1 920 and stage2 930 together are configured to calculate an address1 902. It may be noted that in a multi-stage operation, an initial stage may receive the header data directly from the header sub-path input registers and any subsequent stages may receive the header data via the initial stage. The multiplexers of the operation 1 header 720 are configured to select a row value "R" from a first scalar FIFO coupled to a first input port of the scalar bus and a column value "C" from a second scalar FIFO coupled to a second input port of the scalar bus. Note that for some operations, not all sub-paths of the operation header output may be needed, and thus, it may not matter what is latched into those unused sub-paths in the sub-path input register. So D is selected by the multiplexer 721B which may be any data because it will not be used.

The address calculation for operation 1 is $(R*I_0)+C+I_1$, where immediate0 ($I_0$) may be used as a row increment value for a matrix stored in row-major order and immediate1

($I_1$) may be used as a base address for the matrix. Note that immediate values can be useful for constants used in an operation. Because a single ALU is unable to perform all of the calculations needed for the operation 1 address calculation, it is broken into two separate pipelined operations which are assigned to stage1 920 and stage2 930. The calculation assigned to stage1 920 is to multiply the R value by the $I_0$ value to generate ($R*I_0$). This is done by using the ALU input multiplexers to select the header data sub-paths carrying R ($H_A$) for one ALU input and $I_0$ as the second ALU input. The two-operand multiply operation may ignore the third ALU input so the multiplexers can select anything for the third ALU input. The output of the ALU will then provide the value for ($R*I_0$).

The pipeline/header selection multiplexers of stage1 920 are set to select the header data 725 and the ALU bypass multiplexers send the ALU output to the sub-path pipeline register 928B and send the operands R and C to the remaining two pipeline registers 928A and 928C respectively (from $H_A$ and $H_C$). The values 929 of R, $R*I_0$, and C from the pipeline registers 928A, 928B, and 928C respectively can then be provided to the stage2 930.

In the stage2 930, the ALU 935 is configured to perform an addition operation on three operands, $R*I_0$, C, and $I_1$ and to generate address1 902. $R*I_0$ and C are available from the input 929 from the immediately preceding stage, stage1 920. $K_B$ carries stage1's operation result ($R*I_0$) provided by the sub-path pipeline register 928B. The $K_C$ carries the value of the previous clock cycle's C from stage1's the sub-path pipeline register 928C. The third operand in this case $I_1$ so the ALU input multiplexers for stage2 920 select $K_B$, $K_C$, and $I_1$ as the three inputs to the ALU and the ALU performs a three operand add to generate (($R*I_0$)+C+$I_1$) as its output using the values of R and C from the previous clock cycle which is sent to the sub-path pipeline register 938A by the ALU bypass multiplexers of stage2 920.

A new copy of R and C (as well as D which is unused) are latched into the operation 1 sub-path input registers 722 each clock cycle and the result of (($R*I_0$)+C+$I_1$) is latched into the sub-path pipeline register of stage2 two clocks later. Thus the calculation of operation 0 can be pipelined with a 2 clock pipeline latency.

FIG. 10B illustrates an example of a pipeline table 1000B corresponding to the multiplication operation shown in FIG. 9B. Shown in the table 1000B are values of operands R and C (from operation 1 header sub-path outputs $H_A$ and $H_C$) received over a few clock cycles indicated in the column marked "CLK". The values of R and C can vary clock-to-clock but the immediate data, $I_0$ and $I_1$, may be constant over the time that operation is being performed. They have the values of $I_0$=4 and $I_1$=2 for this example. It may be assumed that each stage in this example requires one clock cycle to complete one ALU operation. Therefore, the address can be ready after two clock cycles.

As shown in the table 1000B, at clock 1, R and C are received with a value of 0 and 1, respectively so in clock 2, the first sub-path pipeline register 928A of stage1 920 receives 0 (the R value of the previous clock), the second sub-path pipeline register 928A of stage1 920 receives 0 (the R value of the previous clock multiplied by $I_0$), and the third sub-path pipeline register 928B of stage1 920 receives 1 (the C value of the previous clock). Also at clock 2 new values of 1 and 2 are received for R and C.

At clock 3, the first sub-path pipeline register 928A of stage1 920 receives 1 (the R value of the previous clock), the second sub-path pipeline register 928A of stage1 920 receives 4 (the R value of the previous clock multiplied by $I_0$), and the third sub-path pipeline register 928B of stage1 920 receives 2 (the C value of the previous clock) while new values of 2 and 3 are received for R and C. Stage2 930 is also active in clock 3, latching (($R*I_0$)+C+$I_1$) using values from two clocks earlier into the first sub-path pipeline register 938A. Note that the second sub-path pipeline register 938B of stage2 930 and the third sub-path pipeline register 938C of stage2 930 may receive the inputs 929 from the previous pipeline stage based on the pipeline/header selection multiplexers of stage2 930.

At clock 4, the sub-path pipeline registers 928 receive information based on values of R and C received in clock 3 and the sub-path pipeline register 938A provides a value of 8 for address 1 902 based on the values of R and C received in clock 2 (1,2). And at clock 5, the sub-path pipeline register 938A provides a value of 13 for address 1 902 based on the values of R and C received in clock 3 (2,3). A two-stage set of stages has a pipeline delay but a new value can be provided every clock as long as new values of R and C are made available. Thus, the process of receiving operands and calculating memory addressed based on those operands can continue over many clock cycles. As previously stated, these addresses may be further provided to the output multiplexers 620 (shown in FIG. 6) and also to the next stage.

FIG. 9C shows a third set of contiguous stages configured to perform a calculation for operation2. In this example, three stages (stage3 940, stage4 950, and stage5 960) are assigned to operation2. These stages can be examples of the stages shown in FIG. 6 and the ALUs 945, 955, and 965 can be examples of the ALU 825 shown in FIG. 8. Also shown in stage3 940 are sub-path pipeline registers 948A, 948B, and 948C collectively referred to as pipeline register 948; in stage4 950 are sub-path pipeline registers 958A, 958B, and 958C collectively referred to as pipeline register 958; and in stage5 960 are sub-path pipeline registers 968A, 968B, and 968C collectively referred to as pipeline register 968. The pipeline registers 948, 958, 968 can be one example of the pipeline register 828 shown in FIG. 8.

The stage3 940, stage4 945, and stage5 955 together are configured to calculate a memory address address2 903. The stage3 940 in this example is a starting stage and stages stage4 950 and stage5 960 are subsequent stages with stage3 950 being a transitional stage and stage4 960 being an ending stage. The starting stage stage3 940 configured to receive the header data from the operation2 sub-path input registers 732 as operation2 header output 735 with sub-paths of $H_A$, $H_B$, and $H_C$ through the operation multiplexer (an example of the operation multiplexer 821 in FIG. 8). The operation2 header multiplexers can be configured to deliver the values "L", "M", and "N" from the inputs in0-inN 701.

The ALU 945 in this example is configured to perform a clamp operation on the operands indicated as $I_0$ (immediate data0), $H_A$, and $I_1$ (immediate data1) where the ALU provides the value of its second input ($H_A$) as long as it is between the values of its first and third input ($I_0$, $I_1$). If the value of its second input falls outside of the range defined by its first and third input, the output will be clamped to that range. So if $H_A$<$I_0$ then the output is $I_0$, and if $H_A$>$I_1$, then the output is $I_1$. The ALU 945 can operate on the operands and provide the result of the operation (/L/) to the sub-path pipeline register 948A. The remaining two pipeline registers 948B and 948C can receive the values "M" and "N" received from $H_B$ and $H_C$, respectively. The values "/L/", "M", and "N" from the pipeline registers 948A, 948B, and 948C respectively can then be provided to the stage4 950 as the output 949 of stage3 940.

At stage4 950, the ALU 955 is configured to perform a subtraction operation on two operands indicated as $K_B$ and $K_C$ (with values M and N of the previous clock from 948B and 948C). The third input will be ignored by the ALU for an operand subtraction operation and can be set to any value. It should be noted that the value "/L/" from the register 948A is passed to the register 958A as it was received, but delayed by one clock. The ALU 955 can then perform a subtraction operation on the values of $K_B$ (M) and $K_C$ (N). In this case, result (M−N) can be stored in the pipeline register 958C. Furthermore, the values "/L/" and "M" are stored as received from the registers 948A and 948B respectively. The output of the pipeline registers 958 is provided to the next stage stage5 960 as stage4 output 959.

In the stage5 960, the ALU 965 is configured to perform an addition operation on three operands indicated as $K_A$ (/L/ from the register 958A), $K_C$ (value "M−N" from the register 958C), and $I_2$ (immediate data). The ALU 965 can perform the addition operation on the values of (/L/), (M−N), and $I_2$ and store its result (/L/+(M−N)+12) in register 968A. Furthermore, the values "M" and "(M−N)" are passed to the registers 968B and 968C as received from the registers 958B and 958C. The value (/L/+(M−N)+12) in register 968A can be the address2 903, which can be provided to the output multiplexers 620 shown in FIG. 6. The output of the pipeline registers 968 is provided to the next stage.

FIG. 10C illustrates an example of a pipeline table 1000C corresponding to the combined clamp, subtraction, and addition operations shown in FIG. 9C. Shown in the table 1000C are values of operands L, M and N, received from the operation2 header output $H_A$, $H_B$, and $H_C$ respectively, over a few clock cycles indicated in the column marked "CLK". The values of L, M, and N can vary but the immediate data having values of $I_0=3$, $I_1=8$, and $I_2=2$ are constant throughout the calculation of address2 903 for operation2. It may be assumed that each stage in this example requires one clock cycle to complete one ALU operation. Assuming a delay of one clock cycle per stage, the address2 903 may be ready after three clock cycles. For example, at clock 1, the values of L, M, and N are 5, 8, and 4 respectively and the calculated address (/L/+(M−N)+12=/5/+(8−4)+2=11) is available at clock 4. Additionally, at clock 2, new operands (1, 3, 6) are received and the result of their calculation (2, based on L being clamped to 3) may be available at clock 5. The calculation of address2 903 using values of L, M, and N (0,0,0) received at clock 3 would be available at clock 6 as a value of 5 (based on L being claimed to 3) and so on. The process of receiving operands received and calculating memory addressed based on those can continue over many clock cycles. As previously stated, these addresses are further provided to the output multiplexers 620 (shown in FIG. 6) and also to the next stage.

Illustrated in FIG. 9D is an example of a three-stage operation shown as operation3 assigned to a fourth set of contiguous stages the consist of stage6 970, stage7 980, and stage8 990. These stages can be examples of the stages shown in FIG. 6 and the ALUs 975, 985, and 995 can be examples of the ALU 825 shown in FIG. 8. Also shown in stage6 970 are sub-path pipeline registers 978A, 978B, and 978C collectively referred to as pipeline register 978; in stage7 980 are sub-path pipeline registers 988A, 988B, and 988C collectively referred to as pipeline register 988; and in stage8 990 are sub-path pipeline registers 998A, 998B, and 998C collectively referred to as pipeline register 998. The registers 978, 988, 998 can be example of the pipeline register 828 shown in FIG. 8.

Stage6 970, stage7 980, and stage8 990 together are configured to calculate a memory address address3 904. Stage6 970 in this example is a starting stage, stage7 980 is a transitional stage, and stage8 990 is an ending stage. The starting stage stage6 970 configured to receive the header data from the operation3 sub-path input registers 742 as operation3 header output 745 with sub-paths of $H_A$, $H_B$, and $H_C$ through the operation multiplexer (an example of the operation multiplexer 821 in FIG. 8). The operation3 header multiplexers can be configured to deliver the values "F", "G", and "S" from the inputs in0-inN 701.

At stage6 970, the ALU 975 is configured to perform a comparison operation on the operands indicated as $H_C$ (having value S) and $I_2$ (immediate data2). The third input will be ignored by the ALU 975. The ALU 955 can perform the comparison operation between the values $I_2$ and the value of $H_C$ (S) to check if "S" is greater than $I_2$. In this case, the result can be a Boolean value stored in the sup-path pipeline register 978C. For example, if "S" is greater than "$I_2$" then the Boolean value can be "true" or "1" and if "S" is less than or equal to "$I_2$" then the Boolean value can be "false" or "0". Furthermore, the values "F" and "G" are stored as received from the operation3 header output 745 and stored into sub-path pipeline registers 978A, 978B. The output of the pipeline registers 978 is provided to the next stage stage7 980 as output 979.

At stage7 980, the ALU 985 is configured to perform a selection (SEL) operation using the Boolean result from the previous stage, stage6 970. The three operands for stage7 980 include $I_0$ (immediate data0), $I_1$ (immediate data1), and $K_C$ (Boolean result from stage6 970). The ALU 985 can perform the selection operation to select between the values of $I_0$ and $I_1$ to be stored in the sub-path pipeline register 988C. For example, if the Boolean value from the previous stage stage6 970 is "False" or "0", then $I_0$ can be stored in the sub-path pipeline register 988C; whereas if the Boolean value from the previous stage stage6 970 is "True" or "1", then $I_1$ can be stored in the sub-path pipeline register 988A. In addition, the values "F" and "G" are stored as received from the previous stage output 979 are stored into sub-path pipeline registers 988A, 988B. The output of the pipeline registers 988 can be provided to the next stage stage8 990 as output 989.

In the stage8 990, the ALU 995 is configured to perform an addition operation using the three operands indicated as $K_A$ (F), $K_B$ (G), $K_C$ (either $I_0$ or $I_1$ depending on the selection operation result from the previous stage 980), which are the values received as the output 989 of stage7 980. The ALU 995 can perform the addition operation on the above values and store the result (F+G+($I_0$ or $I_1$)) and select one of those values can be stored in sub-path pipeline register 998A. The value of the result (F+G+($I_0$ or $I_1$)) can be the address3 904, which is further provided to the output multiplexers 620 shown in FIG. 6, and can also be provided to the next stage.

FIG. 10D illustrates an example of a pipeline table 1000D corresponding to the combined comparison, select, and addition operations shown in FIG. 9D. Shown in the table 1000C are values of operands F, G and S, received from the operation3 header output ($H_A$, $H_B$, and $H_C$) over several clock cycles. The values of F, G and S can vary but the immediate data having values of $I_0=2$, $I_1=6$, and $I_2=3$ are constant throughout the calculation of address3 904 for operation3. It may be assumed that each stage in this example requires one clock cycle to complete one ALU operation. Assuming a delay of one clock cycle per stage, the address3 904 may be ready after three clock cycles. For example, at clock 1, the values of 0, 0, and 5 are received for F, G, and S, respectively. At stage6, S (5) is compared with $I_2$ (3) and since S is greater than $I_2$, the result can be stored as a Boolean value True ("1") in the sub-path pipeline register 978C. The other values F and G are loaded into sub-path pipeline registers 978A and 978B respectively from $H_A$ and $H_B$ of the operation3 header output 745 and can then be provided to stage 7 980 at clock 2. New values of 3, 2, and 1, are received for F, G, and S, respectively, at clock 2 as well.

So, the Boolean value of True, along with the values of the previous clock's F and G are received by stage 7 980. The input $K_A$ may be provided to the ALU 985 as a control signal with the ALU configured as a MULTIPLEXER with the value received on the third input of the ALU used to select between values received on the other two inputs of the ALU. So the value of $K_A$ is used to select between $I_0$ and $I_1$. Because $K_A$ has a Boolean value of true ("1"), $I_1$, which is equal to 6, is presented at the output of the ALU 985 and loaded into the sub-path pipeline register 988C at clock 3. Sub-path pipeline registers 988A, 988B are loaded with F and G from the previous clock as received through the output 979 of stage8 970 at clock 3 as well.

During clock 3, stage6 970 is used to generate a Boolean value based on the comparison between the value of S received at clock 2 and $I_2$. Since in this case, S (1) is lower than $I_2$ (3), the Boolean value stored in the register 978C at clock 3 will be False ("0").

The output 989 provides the values 0, 0, and 6 to stage 8 990 during clock 4, which will be provided as $K_A$, $K_B$, and $K_C$ respectively to the ALU 995 for a three-operand addition operation. At stage8 990, the addition operation using the values received at clock 1 (F+G+$I_1$=0+0+6) is generated and the result may be stored in the register 998A, which is available at clock 4. The process of receiving operands received and calculating memory addressed based on those can continue over many clock cycles. As previously stated, these addresses are further provided to the output multiplexers 620 (shown in FIG. 6) and also to the next stage.

During stage 4, stage7 980 is used to select between $I_0$ and $I_1$ based on the value of S received at clock 2 and stage8 990 then calculates address3 904 during clock 5 using the values of F, G, and S received at clock 2 as (F+G+10=3+2+2=7). The process of receiving operands received and calculating memory addressed based on the received operands in a pipelined manner can continue over many clock cycles. As previously stated, these addresses are further provided to the output multiplexers 620 (shown in FIG. 6) and also to the next stage.

In some cases, an operation may not require any stages of the pipeline 900 to generate its associated address sequence. This may occur if one of the inputs in0-inN 701 can directly provide the address sequence. So, for example, if the address sequence for write operation0 is directly supplied by a counter that is provided as in0, no stages of the pipeline 900 are assigned to operation0. The operation0 header multiplexor 711A may be configured to select In0 and write address0 output multiplexor 621 configured to select the sub-path A of output 715 of the operation header 710 to provide as write address0 536.

Figure 11:
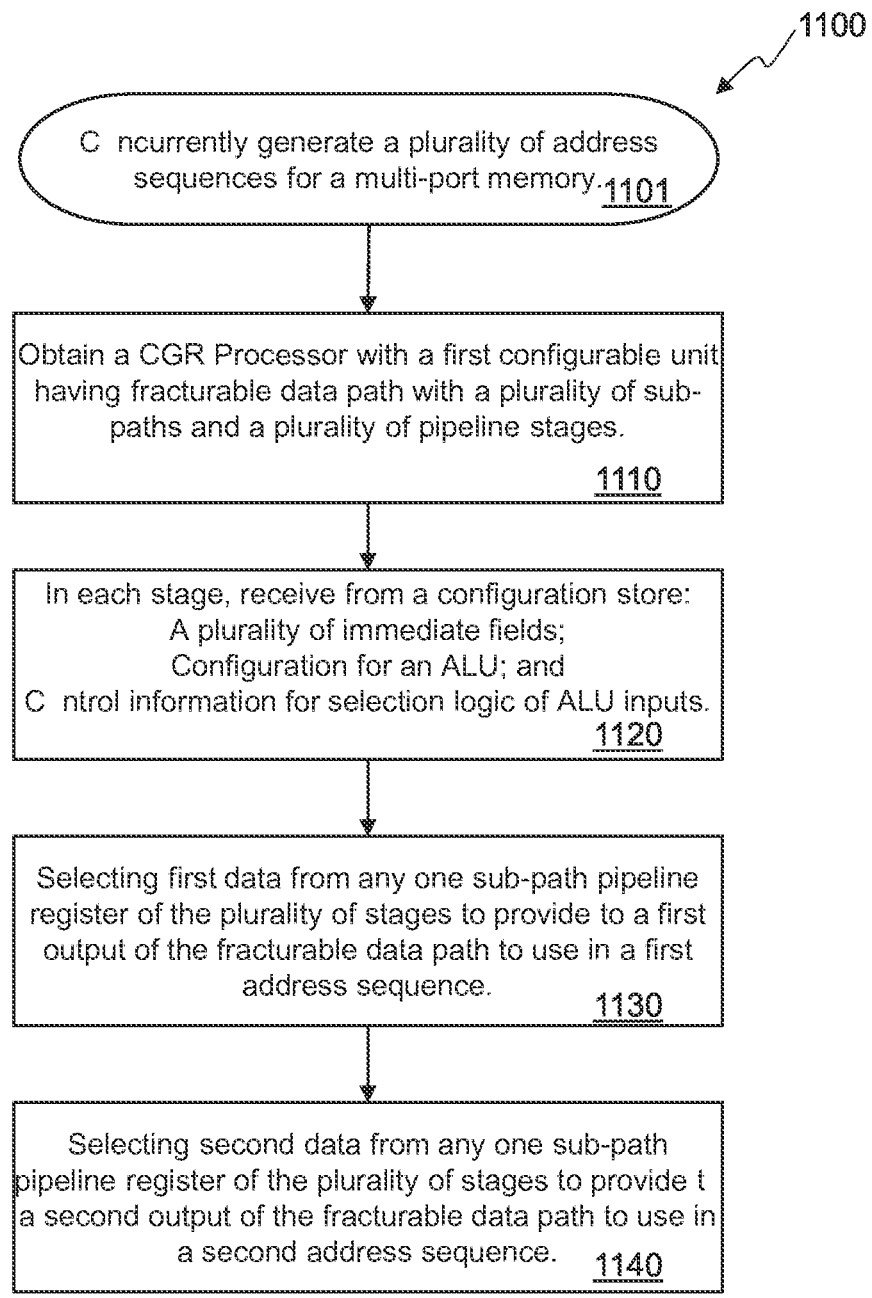
FIG. 11 is an example flow diagram of a method of concurrently generating multiple address streams in a CGR processor.

FIG. 11 is an example flow diagram 1100 of a method of concurrently generating multiple address streams in a CGR processor 1101. The method includes obtaining 1110 a CGR processor with an array of CGR units including a first configurable unit with a fracturable data path. The fracturable has a plurality of sub-paths within a plurality of stages. The plurality of stages includes an initial stage, one or more intermediate stages, and a final stage.

The method continues with receiving 1120 from a configuration store of the first configurable unit in the coarse-grained reconfigurable (CGR) processor, at each respective stage of a plurality of stages of a fracturable data path of a first configurable unit in an array of configurable units in a coarse-grained reconfigurable (CGR) processor, a plurality of immediate data fields, a configuration for an arithmetic logic unit (ALU) of the respective stage, and control information for selection logic of the respective stage to select two or more inputs for the ALU of the respective stage. Each respective stage of the plurality of stages includes the ALU for the respective stage, the selection logic for the respective stage, and sub-path pipeline registers for the respective stage.

The method also includes selecting 1130 first data from any one sub-path pipeline register of the plurality of stages to provide to a first output of the fracturable data path to use in a first address sequence, and selecting 1140 second data from any one sub-path pipeline register of the plurality of stages different from that selected for the first output to provide to a second output of the fracturable data path to use in a second address sequence.

In some implementations, the first configurable unit also includes a multi-port memory having a first address input associated with a first access port of the multi-port memory and a second address input associated with a second access port of the multi-port memory. The first address input can be coupled to the first output of the fracturable data path and the second address input can be coupled to the second output of the fracturable data path. In such implementations, the method may also include accessing the multi-port memory at a first address location determined by the first data and concurrently accessing the multi-port memory at a second address location determined by the second data.

In some implementations, the method may include selecting, with the selection logic in the one or more intermediate stages and the final stage, the two or more inputs for the ALU of the respective stage from at least outputs of the sub-path pipeline registers of an immediately preceding stage, outputs of a first set of sub-path input registers of the fracturable data path, and the plurality of immediate data fields associated with that stage and provided by the configuration store. The selection logic in the initial stage may select from the two or more inputs for the ALU of the initial stage from the outputs of the first set of sub-path input registers, and the plurality of immediate data fields associated with the initial stage and provided by the configuration store while avoiding selection of outputs of the sub-path pipeline registers of an immediately preceding stage.

In an example implementation, an input for a respective sub-path input register may be selected from a first input coupled to a scalar bus of the array of configurable units, a second input coupled to a lane of a vector bus of the array of configurable units, and a third input coupled to a counter of the first configurable unit. Implementations may include multiple inputs of each type in some implementations and may include other inputs in some cases as the first configurable unit may have multiple input ports from the scalar bus, multiple input ports with multiple lanes from the vector bus, and/or multiple counters. A FIFO may be used to couple to input from a scalar of vector bus. The fracturable data path of the first configurable unit may also include a second set of sub-path input registers associated with a second calculation, with the first set of sub-path input registers associated with a first calculation. In such systems, the method may also include selecting, by the selection logic of a stage of the plurality of stages, between outputs of the first set of sub-path input registers and outputs of the second set of sub-path input registers based on whether the stage is associated with the first calculation or the second calculation.

As was already disclosed, each stage includes a pipeline register broken into multiple sub-path pipeline registers. The method may in some cases include selecting a first sub-path pipeline register to receive an output of the ALU as its input, and selecting a second sub-path pipeline register to receive an output of a corresponding sub-path pipeline register of an immediately preceding stage or a corresponding sub-path input register of the first set of sub-path input registers. This allows the ALU output to be sent to a particular sub-path while keeping the other data in the sub-path flowing through the pipeline. The ALU may be capable to perform both signed and unsigned arithmetic and/or may have a propagation delay of less than one clock cycle of the first configurable unit. In some implementations the ALUs each have a first input, a second input, and a third input. So the method may include providing a first immediate data field to the first input of the ALU of the stage and a second immediate data field to the second input of the ALU of the stage, the plurality of immediate data fields associated with the stage include the first immediate data field and the second immediate data field.

In some implementations, the plurality of stages may include a first set of contiguous stages and a second set of contiguous stages. The first set of contiguous stages may be configured to generate the first address stream and the second set of contiguous stages may be configured to generate the second address stream. Both the first set of contiguous stages and the second set of contiguous stages include respective starting stages and ending stages. The method may include selecting something other than an output of the sub-path pipeline registers of an immediately preceding stage as any input of the two or more inputs to the ALU of a first starting stage of the first set of contiguous stages of the plurality of stages, and providing data from the sub-path pipeline register of a first ending stage of the first set of stages as the first data. The method may also include selecting something other than an output of the sub-path pipeline register of the first ending stage, which immediately precedes a second starting stage of a second set of contiguous stages of the plurality of stages, as any input of the two or more inputs to the ALU of the second starting stage, and to configure the second output to provide data from the sub-path pipeline register of a second ending stage of the second set of stages as the second data, wherein the second set of contiguous stages is adjacent to and disjoint from the first set of contiguous stages. In some cases, the first set of contiguous stages may have only one stage so the first starting stage and the first ending stage are the same stage of the plurality of stages.

Figure 12:
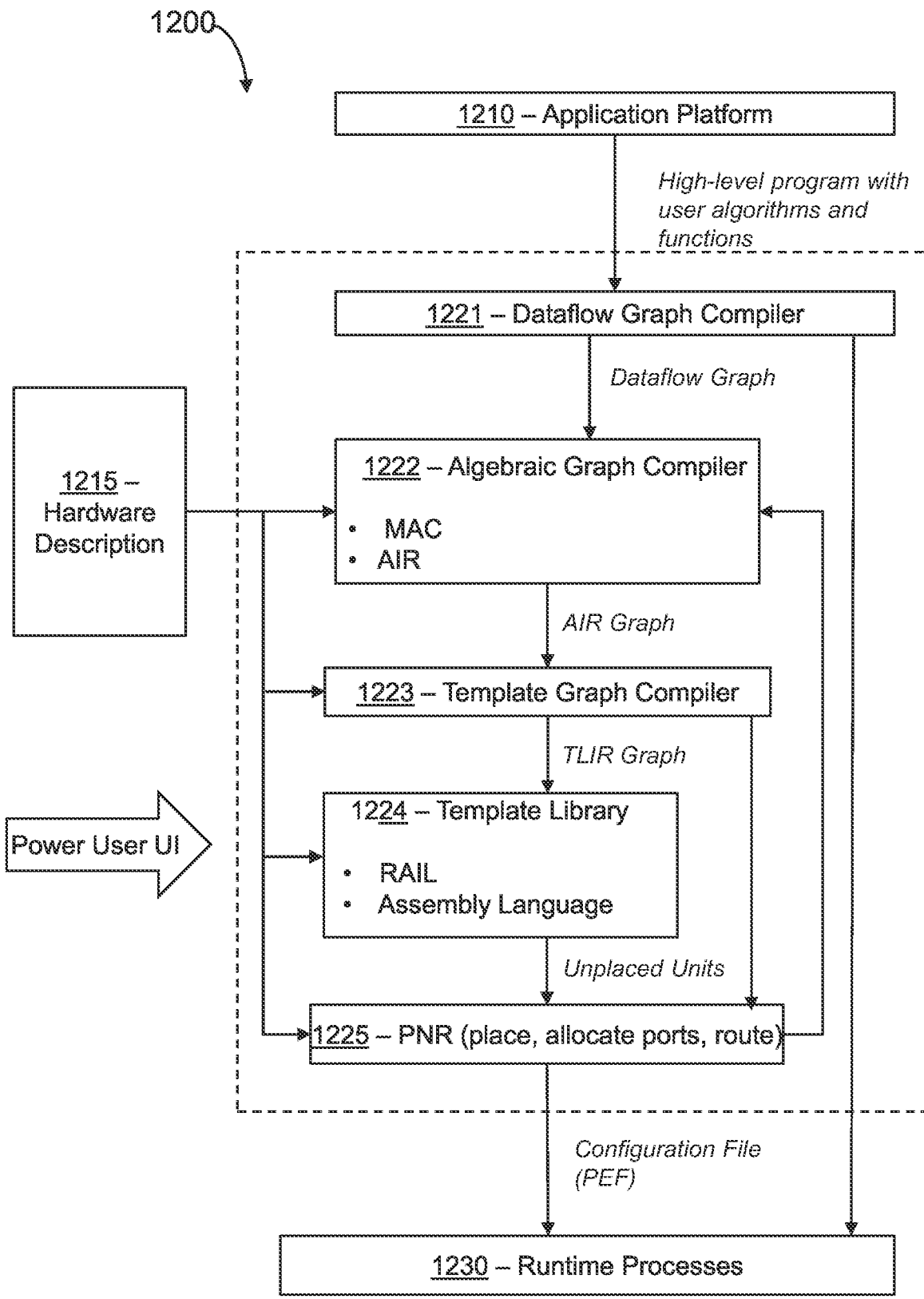
FIG. 12 is a block diagram of a compiler stack implementation suitable for generating a configuration file for a CGR processor.

FIG. 12 is a block diagram of a compiler stack 1200 implementation suitable for generating a configuration file for a CGR processor. FIG. 13 illustrates various representations of an example user program 1300 corresponding to various stages of a compiler stack such as compiler stack 1200.

In an implementation, the compiler 1200 may be configured to compile and execute a dataflow graph on the CGR processor 110 shown in FIG. 1. During this process many computation nodes can be formed in the PCUs and memory nodes can be formed in the PMUs. The PCUs while performing the computations may read data from or write data to scratchpad SRAM in one or more PMUs. An example of a PMU 500 including a scratchpad SRAM 530 is shown in FIG. 5. In order for a PCU to efficiently access the scratchpad memory in the PMUs, the memory addresses for read and write operations need to be calculated in a concurrent manner for the PCU operations. As explained with reference to FIGS. 6 to 10D, the memory addresses can be generated in a concurrent manner using the data path pipeline 900 including various stages from stage0 910 to stageN 990. The compiler 1200 is configured to generate concurrent addresses using the fracturable data path 520. In one embodiment, the compiler 1200 generates data for the config store 540 including immediate data and other control signals, and more. The compiler may also generate other configuration data for other CGR units in the CGR array to cause other CGR units to interact with the PMU 500 and send data through the scalar bus and/or vector bus to the FIFOs in the PMU 500 which then may be used as inputs in1-inN 701 for header mux 700 (shown in FIGS. 6 and 7) to be used in the concurrent calculation of a plurality of addresses used by corresponding operations. In the following paragraphs other details about various stages in the compiler 1200 will be explained.

As depicted, compiler stack 1200 includes several stages to convert a high-level program (e.g., user program 1300) with statements 1310 that define user algorithms and functions, e.g., algebraic expressions and functions, to configuration data for the CGR units.

Compiler stack 1200 may take its input from application platform 1210, or any other source of high-level program statements suitable for parallel processing, which provides a user interface for general users. It may further receive hardware description 1215, for example defining the physical units in a reconfigurable data processor or CGRA processor. Application platform 1210 may include libraries such as PyTorch, TensorFlow, ONNX, Caffe, and Keras to provide user-selected and configured algorithms. The example user program 1300 depicted in FIG. 13 comprises statements 1310 that invoke various PyTorch functions.

FIG. 13 shows an example implementation of an example user program 1300 in a first stage of a compiler stack. The example user program 1300 generates a random tensor X1 with a normal distribution in the RandN node. It provides the tensor to a neural network cell that performs a weighing function (in the Linear node) followed by a rectified linear unit (ReLU) activation function, which is followed by a Softmax activation function, for example to normalize the output to a probability distribution over a predicted output class. FIG. 13 does not show the weights and bias used for the weighing function. User program 1300 corresponds with computation graph 1350.

Application platform 1210 outputs a high-level program to compiler 1220, which in turn outputs a configuration file to the reconfigurable data processor or CGRA processor where it is executed in runtime processes 1230. Compiler 1220 may include dataflow graph compiler 1221, which may handle a dataflow graph, algebraic graph compiler 1222, template graph compiler 1223, template library 1224, and placer and router PNR 1225. In some implementations, template library 1224 includes RDU abstract intermediate language (RAIL) and/or assembly language interfaces for power users.

Dataflow graph compiler 1221 converts the high-level program with user algorithms and functions from application platform 1210 to one or more dataflow graphs. The high-level program may be suitable for parallel processing, and therefore parts of the nodes of the dataflow graphs may be intrinsically parallel unless an edge in the graph indicates a dependency. Dataflow graph compiler 1221 may provide code optimization steps like false data dependency elimination, dead-code elimination, and constant folding. The dataflow graphs encode the data and control dependencies of the high-level program. Dataflow graph compiler 1221 may support programming a reconfigurable data processor at higher or lower-level programming languages, for example from an application platform 1210 to C++ and assembly language. In some implementations, dataflow graph compiler 1221 allows programmers to provide code that runs directly on the reconfigurable data processor. In other implementations, dataflow graph compiler 1221 provides one or more libraries that include predefined functions like linear algebra operations, element-wise tensor operations, non-linearities, and reductions required for creating, executing, and profiling the dataflow graphs on the reconfigurable processors. Dataflow graph compiler 1221 may provide an application programming interface (API) to enhance functionality available via the application platform 1210.

Algebraic graph compiler 1222 may include a model analyzer and compiler (MAC) level that makes high-level mapping decisions for (sub-graphs of the) dataflow graph based on hardware constraints. It may support various application frontends such as Samba, JAX, and TensorFlow/HLO. Algebraic graph compiler 1222 may also transform the graphs via autodiff and GradNorm, perform stitching between sub-graphs, interface with template generators for performance and latency estimation, convert dataflow graph operations to AIR operation, perform tiling, sharding (database partitioning) and other operations, and model or estimate the parallelism that can be achieved on the dataflow graphs.

Algebraic graph compiler 1222 may further include an arithmetic or algebraic intermediate representation (AIR) level that translates high-level graph and mapping decisions provided by the MAC level into explicit AIR/Tensor statements 1400 (see FIG. 14) and one or more corresponding algebraic graphs 1450. Key responsibilities of the AIR level include legalizing the graph and mapping decisions of the MAC, expanding data parallel, tiling, metapipe, region instructions provided by the MAC, inserting stage buffers and skip buffers, eliminating redundant operations, buffers and sections, and optimizing for resource use, latency, and throughput.

FIG. 14 shows the user program 1300 in an example second stage of the compiler stack. At this stage, the algebraic graph compiler replaces the Softmax macro by its constituents. The Softmax function is given as $$\frac{e^{(z_i)}}{\sum_{j=1}^{K} e^{(z_j)}}.$$

This function includes an exponential component, a summation, and a division. Thus, algebraic graph compiler 1222 replaces the user program statements 1310, also shown as computation graph 1350, by AIR/Tensor statements 1400, also shown as Air/Tensor computation graph 1450.

Template graph compiler 1223 may translate AIR statements and/or graphs into TLIR statements 1500 (sec FIG. 15) and/or graphs (graph 1550 is shown), optimizing for the target hardware architecture into unplaced variable-sized units (referred to as logical CGR units) suitable for PNR 1225. Template graph compiler 1223 may allocate metapipelines, such as metapipeline 1510 and metapipeline 1520, for sections of the template dataflow statements 1500 and corresponding sections of unstitched template computation graph 1550. Template graph compiler 1223 may add further information (name, inputs, input names and dataflow description) for PNR 1225 and make the graph physically realizable through each performed step. Template graph compiler 1223 may for example provide translation of AIR graphs to specific model operation templates such as for general matrix multiplication (GeMM). An implementation may convert part or all intermediate representation operations to templates, stitch templates into the dataflow and control flow, insert necessary buffers and layout transforms, generate test data and optimize for hardware use, latency, and throughput.

Implementations may use templates for common operations. Templates may be implemented using assembly language, RAIL, or similar. RAIL is comparable to assembly language in that memory units and compute units are separately programmed, but it can provide a higher level of abstraction and compiler intelligence via a concise performance-oriented domain-specific language for CGR array templates. RAIL enables template writers and external power users to control interactions between logical compute units and memory units with high-level expressions without the need to manually program capacity splitting, register allocation, etc. The logical compute units and memory units also enable stage/register allocation, context splitting, transpose slotting, resource virtualization and mapping to multiple physical compute units and memory units (e.g., PCUs and PMUs).

The template graph compiler 1223 may analyze memory accesses to data stored in memory, such as tensors or portions of tensors, and determine that some accesses may be performed concurrently. The address sequences used by those memory accesses can be analyzed and mapped to disjoint sets of contiguous stages in a fracturable data path of the configurable memory unit, such as PMU 500 to allow the address sequences to be concurrently generated. This process is discussed in more detail with regard to FIG. 18.

Template library 1224 may include an assembler that provides an architecture-independent low-level programming interface as well as optimization and code generation for the target hardware. Responsibilities of the assembler may include address expression compilation, intra-unit resource allocation and management, making a template graph physically realizable with target-specific rules, low-level architecture-specific transformations and optimizations, and architecture-specific code generation.

Templates may include address expressions in the architecture-independent low-level programming language for concurrent memory accesses of memory in a configurable memory unit such as the PMU 500. These expressions can be analyzed by the assembler to map to the fracturable data path to allow for concurrent generation of multiple address sequences. For the purposes of this disclosure, the term compiler can include the assembler used in the template library 1224. This process is discussed in more detail with regard to FIG. 18.

Figure 16:
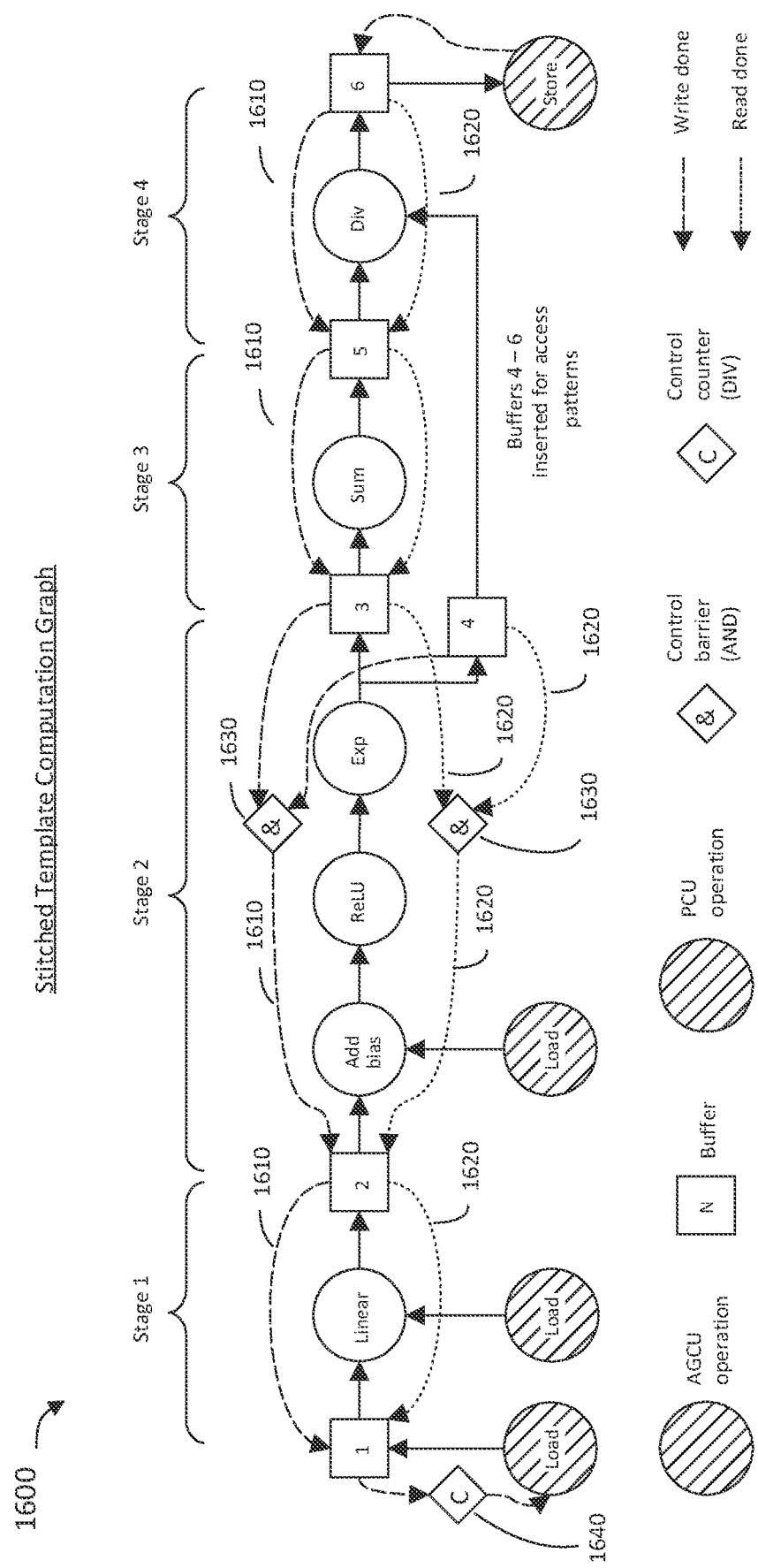
FIG. 16 shows the user program in an example fourth stage of the compiler stack.

FIG. 16 shows the user program 1300 in an example fourth stage of the compiler stack. The template graph compiler 1223 may also determine the control signals 1610 and 1620, as well as control gates 1630 and 1640 required to enable the CGR units (whether logical or physical) to coordinate dataflow between the CGR units in the CGR array of a CGR processor. This process, sometimes referred to as stitching, produces a stitched template compute graph 1600 with control signals 1610-1620 and control gates 1630-1640. In the example depicted in FIG. 16, the control signals include write done signals 1610 and read done signals 1620, and the control gates include 'AND' gates 1630 and a counting or 'DIV' gate 1640. The control signals and control gates enable coordinated dataflow between the configurable units of CGR processors such as compute units, memory units, and AGCUs.

PNR 1225 translates and maps logical (i.e., unplaced physically realizable) CGR units (e.g., the nodes of the logical computation graph 1700 shown in FIG. 17) to a physical layout (e.g., the physical layout 1750 shown in FIG. 17) on the physical level, e.g., a physical array of CGR units in a semiconductor chip. PNR1225 also determines physical data channels to enable communication among the CGR units and between the CGR units and circuits coupled via the TLN; allocates ports on the CGR units and switches; provides configuration data and initialization data for the target hardware; and produces configuration files, e.g., processor-executable format (PEF) files. It may further provide bandwidth calculations, allocate network interfaces such as AGCUs and virtual address generators (VAGs—included in the AGCUs), provide configuration data that allows AGCUs and/or VAGs to perform address translation, and control ALN switches and data routing. PNR 1225 may provide its functionality in multiple steps and may include multiple modules (not shown in FIG. 12) to provide the multiple steps, e.g., a placer, a router, a port allocator, and a PEF file generator. PNR 1225 may receive its input data in various ways. For example, it may receive parts of its input data from any of the earlier modules (dataflow graph compiler 1221, algebraic graph compiler 1222, template graph compiler 1223, and/or template library 1224). In some implementations, an earlier module, such as template graph compiler 1223, may have the task of preparing all information for PNR 1225 and no other units provide PNR input data directly.

Further implementations of compiler 1220 provide for an iterative process, for example by feeding information from PNR 1225 back to an earlier module, so that the earlier module can execute a new compilation step in which it uses physically realized results rather than estimates of or placeholders for physically realizable circuits. For example, PNR 1225 may feed information regarding the physically realized circuits back to algebraic graph compiler 1222.

Memory allocations represent the creation of logical memory spaces in on-chip and/or off-chip memories for data required to implement the dataflow graph, and these memory allocations are specified in the configuration file. Memory allocations define the type and the number of hardware circuits (functional units, storage, or connectivity components). Main memory (e.g., DRAM) may be off-chip memory, and scratchpad memory (e.g., SRAM) is on-chip memory inside a CGR array. Other memory types for which the memory allocations can be made for various access patterns and layouts include cache, read-only look-up tables (LUTs), serial memories (e.g., FIFOs), and register files.

Compiler 1220 binds memory allocations to unplaced memory units and binds operations specified by operation nodes in the dataflow graph to unplaced compute units, and these bindings may be specified in the configuration data. In some implementations, compiler 1220 partitions parts of a dataflow graph into memory subgraphs and compute subgraphs, and specifies these subgraphs in the PEF file. A memory subgraph may comprise address calculations leading up to a memory access, including concurrent generation of address streams in a fracturable data path. A compute subgraph may comprise all other operations in the parent graph. In one implementation, a parent graph is broken up into multiple memory subgraphs and exactly one compute subgraph. A single parent graph can produce one or more memory subgraphs, depending on how many memory accesses exist in the original loop body. In cases where the same memory addressing logic is shared across multiple memory accesses, address calculation may be duplicated to create multiple memory subgraphs from the same parent graph.

Compiler 1220 generates the configuration files with configuration data (e.g., a bit stream) for the placed positions and the routed data and control networks. In one implementation, this includes assigning coordinates and communication resources of the physical CGR units by placing and routing unplaced units onto the array of CGR units while maximizing bandwidth and minimizing latency.

FIG. 17 shows the logical computation graph 1700 and an example physical layout 1750 of the user program.

A first example of accelerated deep learning is using a deep learning accelerator implemented in a CGRA to train a neural network. A second example of accelerated deep learning is using the deep learning accelerator to operate a trained neural network to perform inferences. A third example of accelerated deep learning is using the deep learning accelerator to train a neural network and subsequently perform inference with any one or more of the trained neural network, information from the trained neural network, and a variant of the same.

Figure 18:
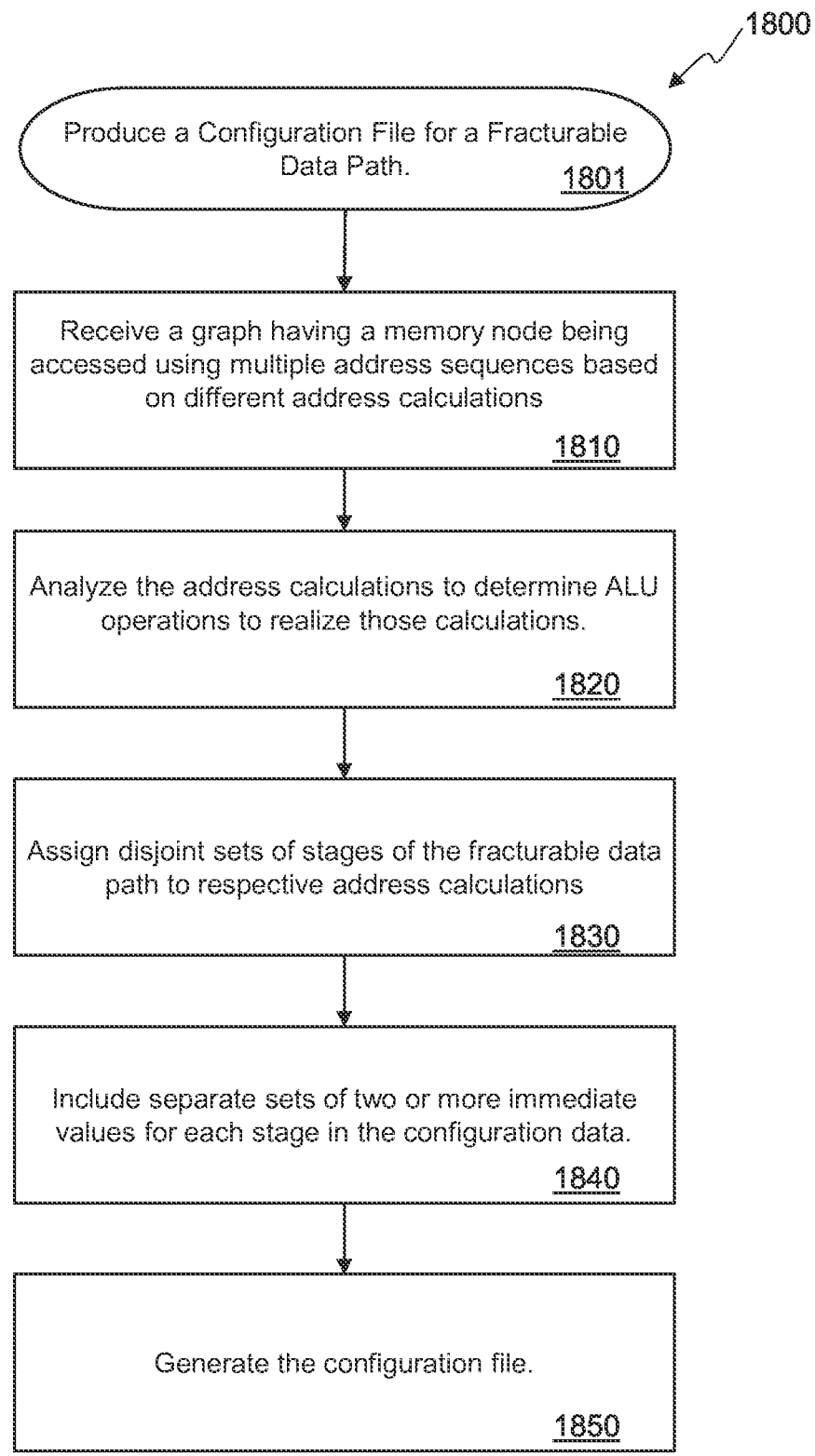
FIG. 18 is an example flow diagram for the compiler shown in FIG. 12 to produce a configuration file for a fracturable data path of a CGR unit, in an implementation of the present disclosure.

FIG. 18 is an example flow diagram 1800 for the compiler shown in FIG. 12 to produce 1801 a configuration file for a fracturable data path of a CGR unit, according to an embodiment of the present disclosure. As is described above, a computer program (which may be a compute graph) may be received 1810 by the compiler 1200. The computer program may be represented in any form or language, including a high-level computer language, a graph having nodes and edges, or assembly language, as a non-limiting list of examples. The program may include a memory node that is accessed using multiple address sequences where different address sequences uses different address calculations.

The compiler 1200 may obtain a hardware description 1215 describing a target machine for the program. The hardware description 1215 may describe a CGR processor 110 as described herein that includes an array 120 of configurable units. The array 120 of configurable units includes a configurable unit having a fracturable data path 520 includes a plurality of computation stages 900 that respectively include a pipeline register, an ALU, and selection logic to select two or more operands for the respective ALU. The fracturable data path may also include an input which may have multiple sources (i.e. portions), including, but not limited to, a first portion coupled to a scalar bus of the array of configurable units, a second portion coupled to a lane of a vector bus of the array of configurable units, and/or a third portion coupled to a counter of the configurable unit. In various implementations, the ALUs of the plurality of computation stages each are capable to perform both signed and unsigned arithmetic and/or may have a propagation delay (or latency) of less than one clock cycle of the configurable unit. The ALUs of some implementations have a first input, a second input, and a third input. The selection logic of a stage of the plurality of computation stages may be configurable in some implementations to provide a first immediate data value to the first input of the ALU of the stage and a second immediate data value to the second input of the ALU of the stage.

The hardware description 1215 may also specify that the fracturable data path has a first output and second output, and in some cases, a third output and a fourth output. Any number of outputs may be provided, depending on the implementation. The outputs may be coupled to a memory, such as a multi-port memory. to allow the outputs to provide addresses for operations with the memory. The configurable unit may include the multi-port memory. The multi-port memory has a first address input associated with a first access port of the multi-port memory and a second address input associated with a second access port of the multi-port memory. The first address input may be coupled to the first output of the fracturable data path and the second address input may be coupled to the second output of the fracturable data path. In some implementations, the multi-port memory includes a third address input, coupled to the third output of the fracturable data path, associated with a third access port of the multi-port memory, and a fourth address input, coupled to the fourth output of the fracturable data path, associated with a fourth access port of the multi-port memory.

The hardware description 1215 for some implementations of the fracturable data path describes the fracturable data path as including two or more sub-paths with the pipeline registers of the plurality of computation stages are broken into sub-path pipeline registers. The outputs of the fracturable data path, including the first output, the second output, and in some implementations the third output and the fourth outputs, are respectively configurable to selectively provide data from one sub-path pipeline register of the plurality of computation stages of the fracturable data path. The different sub-paths can be treated similarly to different registers by the compiler 1200 where the register state over time is spread over the different pipeline stages The complier 1200 may then proceed to compile the computer program to execute on the CGR processor 110 described in the hardware description 1215 as described above. The computer program may generate (or include) a graph that includes a memory node being accessed using multiple address sequences based on different address calculations. So, the address sequences include a first address sequence generated using a first address calculation and a second address sequence generated using a second address calculation although a memory node may be accessed using any number of address sequences. The first address calculation is associated with a first operation and the second address calculation is associated with a second operation. The first and second operations may be reads or writes of a memory, as a non-limiting example.

The compiler 1200 continues by analyzing 1820 the address calculations, including the first address calculation and the second address calculation to determine what operations are needed for the address calculation. The analyzing 1820 may also include evaluating a third address calculation for a third address sequence associated with a third operation and a fourth address calculation for a fourth address sequence associated with a fourth operation. Referring back to the examples given in FIGS. 9A-9D, there were four different address calculations described as listed below:

Address0 Calculation for Operation 0: X+Y+Z
Address1 Calculation for Operation 0: $(R*I_0)+C+I_1$
Address2 Calculation for Operation 0: (L clamped between $I_0$ and $I_1$)+M-N+$I_2$
Address3 Calculation for Operation 0: F+G+($I_0$ or $I_1$ selected by S>$I_2$)

Any type of calculation can be used for the address calculations and the calculations above are for example only. Note that the immediate values may be unique for each stage. Immediate values represent a constant for a particular calculation that is known at compile time.

The compiler 1200 can break down each address calculation into constituent ALU operations to determine how many stages of the fracturable data path 900 may be needed to perform the address calculation. For example, the address calculation for operation 0 requires 2 adds. If the ALU only supported a two-operand add, it would take two ALUs to perform this calculation; but since the ALU supports a three-operand add, a single ALU can perform this address calculation. This means that a single stage of the fracturable data path pipeline may be able generate the first address stream.

The second address calculation requires a multiply and two adds having a total of 4 inputs. This means that a single three-input ALU will not be adequate to perform the second address calculation. There may be multiple ways to map the second address calculation to two ALUs, depending on the capabilities of the ALU. One mapping may be to use a three-operand multiply and add operation to generate $(R*I_0)+C$ in a first ALU and then add $I_1$ to that intermediate result to generate the address. Alternatively, as is shown in FIG. 9A, the multiply alone, $(R*I_0)$, may be mapped to a first ALU and then that result added with both C and $I_1$ using a three-operand add to generate the address. The way that the compiler 1200 maps a calculation to a specific set of ALUs may be implementation dependent with some implementations simply taking the first mapping that fits a minimum theoretical number of ALUs for the calculation, while other implementations may use other parameters, such as speed, power consumption, usage of other resources (such as a number of sub-path pipeline registers or immediate filed), into account in choosing a mapping.

The mapping of a calculation to a pipelined sequence of ALU operations is highly dependent on the exact functionality of the ALUs as well as the details of the calculation. The second address calculation clamps an input, L, between two constant values (represented as /L/). The example ALU has a single three-input operation that can perform that task using two immediate values of the stage for two of the inputs as can be seen in FIG. 9C. Once that has been calculated a four input add is required, which will require 2 ALUs, so the minimum number of pipeline stages needed for the third address calculation is 3. Even so, there are multiple mappings to pipeline stages, including at least:

Clamping L between the two immediate values in a starting stage, calculating M-N in a transitional stage that also stores and forwards /L/, and a final stage that adds the results from the first two stages with $I_2$ using a three-operand add to generate the address. (this is shown in FIG. 9C)

Calculating M-N in a starting stage, clamping L between the two immediate values in a transitional stage that also stores and forwards the result of M-N, and a final stage that adds the results from the first two stages with $I_2$ using a three-operand add to generate the address.

Adding M to $I_2$ in a starting stage, in a first transitional stage clamping L while storing and forwarding the results from the starting stage, subtracting N from the results of the starting stage in a second transitional stage, and then adding the results from the two transitional stages together in a final stage to generate the address.

The compiler 1200 may be able to eliminate the third option as it takes more stages (4) than the first two options (which take 3 stages). Selection of the first option of the second option may be done using any appropriate criteria, including discovering that mapping first.

The fourth address calculation adds two inputs F, and G with a constant that is selected based on whether or not a third input, S, is greater than another constant. Note that this calculation uses 6 values (F, G, S, and three constants) which means that a minimum of 3 ALUs will be needed because each ALU can handle at most three operands which means that even if you could use the 6 values as inputs to two ALUs, a third ALU would be required to operate on the two intermediate results. The complier 1200 may be able to find multiple ways to map this to a set of 3 or more ALUs, but one mapping is shown in FIG. 9D where the starting stage passes F and G to the transitional stage and compares S to the third constant ($I_2$) to generate a Boolean value. The transitional stage uses the Boolean value to select between the two constants ($I_0$ and $I_1$) and continues to pass F and G to the next stage. In the final stage, F, G, and the selected constant are added to generate the fourth address.

Once the mapping of the address calculations to a series of ALU operations has been completed, each address calculation may be assigned 1830 a set of stages of the fracturable data path to perform the respective address calculation. The sets of stages may be contiguous and/or disjoint. If only one ALU is needed for an address calculation, the set of stages may consist of a single stage of the plurality of computation stages. The assigning 1830 may include assigning a first set of stages of the plurality of computation stages to the first operation to generate the first address sequence using the first set of stages and assigning a second set of stages of the plurality of computation stages to the second operation to generate the second address sequence using the second set of stages, based on the analysis of the address calculations. The assigning 1830 may also include assigning a third set of stages of the plurality of computation stages to the third operation to generate the third address sequence using the third set of stages and assigning a fourth set of stages of the plurality of computation stages to the fourth operation, based on the evaluation of the third and fourth address calculations.

In implementations, multiple immediate fields from the configuration store 540 of the configurable unit 500 may be provided for each stage of the fracturable data path 900. Thus, each stage can have its own set of constants for its own use. The separate sets of immediate field information for each stage is included 1840 in the configuration data for the configurable unit.

The complier then generates 1850 the configuration file for the configurable unit that assigns the first set of stages to the first operation and the second set of stages to the second operation and includes two or more immediate values for each computation stage of the first set of stages and second set of stages. The configuration file may include many other types of configuration data for the configurable unit. In some implementations, the configuration file includes information to configure the multi-port memory to execute the first operation using the first access port and the second operation using the second access port. It may also include information to configure the multi-port memory to execute the third operation using the third access port and the fourth operation using the fourth access port.

The sets of stages assigned to address calculations requiring more than one ALU include a starting stage and an ending stage and may include one or more transitional stages between the starting stage and the ending stage. The complier 1200 also includes information in the configuration file to configure the selection logic of each stage. The selection logic of a transitional or ending stage may be configured to select operands for its ALU from outputs of the pipeline register of an immediately preceding stage, the input, or the two or more immediate values associated with that stage, while the selection logic of a starting stage may be configured to select operands for its ALU from the input, or the two or more immediate values associated with that stage, but not from the output of the pipeline register of the immediately preceding stage.

The compiler 1200 also manages the use of the sub-paths within a set of stages assigned to an address calculation. As was mentioned earlier, the sub-paths in the fracturable data path of the configurable unit in the CGR processor can be managed similarly to a set of registers in a traditional processor. So, the compiler 1200 may use techniques that are similar to those used by compilers for managing register usage in managing the usage of the sub-paths. In at least one aspect of managing the sub-paths, the compiler 1200 may determine a first ALU operation of the first address calculation for the first starting stage of the set of stages assigned to the first address calculation and select a first sub-path to use for a value by the ALU of the first starting stage. It may also determine a second ALU operation of the first address calculation for the first ending stage of the set of stages assigned to the first address calculation and select a second sub-path to use for a value by the ALU of the first ending stage. The information configure the ALU of the starting stage to perform the first ALU operation and direct a result of the first ALU operation to a sub-path pipeline register of the starting stage associated with the first sub-path, and configure the ALU of the first ending stage to perform the second ALU operation and direct a result of the second ALU operation to a sub-path pipeline register of the first ending stage associated with the second sub-path is then included in the configuration file. The configuration file may also include information to configure the first output to select data from a sub-path pipeline register of an ending stage of the first set of stages and configure the second output to select data from a sub-path pipeline register of an ending stage of the second set of stages.

In some cases, the number of stages that may be used by the sets of stages for the various address calculations (e.g., the calculation of address0, address1, address2, and address3 as described above) may exceed the number of stages actually provided by the pipeline 900 in the fracturable data path 520. If this occurs, the compiler can either separate the address calculations in space or in time.

Referring back to the example above, the calculation of address0 was assigned 1 stage, the calculation of address1 was assigned 2 stages, the calculation of address2 was assigned 3 stages, and the calculation of address3 was assigned 3 stages, for a total of 9 stages. If an example implementation has fewer than 9 stages in its fracturable data, it would not be possible to concurrently calculate all 4 addresses in that single configurable unit. So, in an implementation having only 6 stages in the fracturable data path of the CGR memory units in an array of CGR unit of a CGR processor, the compiler generating a configuration file for that CGR processor to perform the 4 example address calculations will determine how to separate the those address calculations in either time and/or space.

Separating the address calculations in space means that the compiler assigns multiple CGR memory units to the task and puts the data being accessed by an address calculation into the appropriate CGR memory unit. Note that in some cases this means that data may be duplicated in multiple CGR memory units. Depending on the operations being performed this may or may not be possible. For example, if one operation is writing data into a buffer and another operation is concurrently reading the data from that buffer, it may not be possible to separate those operations in space by putting them into separate CGR memory units.

Separating the address calculations in time means that the compiler time multiplexes the tasks on a single CGR memory unit. In the example where a first operation is writing data into a buffer and a second operation in concurrently reading data from that buffer, those two operations may be executed one at a time, where the CGR memory unit is configured to execute the first operation to writes the data into the buffer, and then once the data (or at least a portion thereof) has been written into the buffer, the CGR memory unit is switched to execute the second operation to read the data from the buffer. The switching of the functionality of the CGR memory unit can be accomplished in any fashion, depending on the implementation of the CGR memory unit, but can loading a different configuration file or switching contexts within a single configuration file to change the operation of the CGR memory unit which may be more efficient.

The determination of whether to separate the address calculations in space or time may be done in any fashion by the compiler and may depend on many factors, including a number of CGR memory units available in the array of CGR units, a size of the data set, a size of the memory in the CGR memory units, performance requirements for the operations, and the access sequences themselves (e.g. are accesses localized within a time window or randomly spread throughout the memory space), among others. In some cases, the compiler may generate a warning to the user to indicate that the address calculations are being separated and providing information on the implications of the separation, such as changes to performance or changes in the amount of resources required for the program being compiled.

In some cases, the program being compiled by the compiler may be a neural network. Examples of neural networks include fully connected neural networks (FCNNs), recurrent neural networks (RNNs), graph neural networks (GNNs), convolutional neural networks (CNNs), graph convolutional networks (GCNs), long short-term memory (LSTM) networks, autoencoders, deep belief networks, and generative adversarial networks (GANs).

An example of training a neural network is determining one or more weights associated with the neural network, such as by back-propagation in a deep learning accelerator. An example of making an inference is using a trained neural network to compute results by processing input data using the weights associated with the trained neural network. As used herein, the term 'weight' is an example of a 'parameter' as used in various forms of neural network processing. For example, some neural network learning is directed to determining parameters (e.g., through back-propagation) that are usable for performing neural network inferences.

A neural network processes data according to a dataflow graph comprising layers of neurons. Example layers of neurons include input layers, hidden layers, and output layers. Stimuli (e.g., input data) are received by an input layer of neurons and the computed results of the dataflow graph (e.g., output data) are provided by an output layer of neurons. Example hidden layers include rectified linear unit (ReLU) layers, fully connected layers, recurrent layers, graphical network layers, long short-term memory layers, convolutional layers, kernel layers, dropout layers, and pooling layers. A neural network may be conditionally and/or selectively trained. After being trained, a neural network may be conditionally and/or selectively used for inference.

Examples of ICs, or parts of ICs, that may be used as deep learning accelerators, are processors such as central processing unit (CPUs), CGR processor ICs, graphics processing units (GPUs), FPGAs, ASICs, application-specific instruction-set processor (ASIP), and digital signal processors (DSPs). The disclosed technology implements efficient distributed computing by allowing an array of accelerators (e.g., reconfigurable processors) attached to separate hosts to directly communicate with each other via buffers.

A first example of accelerated deep learning is using a deep learning accelerator implemented in a CGRA to train a neural network. A second example of accelerated deep learning is using the deep learning accelerator to operate a trained neural network to perform inferences. A third example of accelerated deep learning is using the deep learning accelerator to train a neural network and subsequently perform inference with any one or more of the trained neural networks, information from the trained neural network, and a variant of the same.

Examples of neural networks include fully connected neural networks (FCNNs), recurrent neural networks (RNNs), graph neural networks (GNNs), convolutional neural networks (CNNs), graph convolutional networks (GCNs), long short-term memory (LSTM) networks, autoencoders, deep belief networks, and generative adversarial networks (GANs).

An example of training a neural network is determining one or more weights associated with the neural network, such as by back-propagation in a deep learning accelerator. An example of making an inference is using a trained neural network to compute results by processing input data using the weights associated with the trained neural network. As used herein, the term 'weight' is an example of a 'parameter' as used in various forms of neural network processing. For example, some neural network learning is directed to determining parameters (e.g., through back-propagation) that are usable for performing neural network inferences.

A neural network processes data according to a dataflow graph comprising layers of neurons. Example layers of neurons include input layers, hidden layers, and output layers. Stimuli (e.g., input data) are received by an input layer of neurons and the computed results of the dataflow graph (e.g., output data) are provided by an output layer of neurons. Example hidden layers include rectified linear unit (ReLU) layers, fully connected layers, recurrent layers, graphical network layers, long short-term memory layers, convolutional layers, kernel layers, dropout layers, and pooling layers. A neural network may be conditionally and/or selectively trained. After being trained, a neural network may be conditionally and/or selectively used for inference.

Examples of ICs, or parts of ICs, that may be used as deep learning accelerators, are processors such as central processing unit (CPUs), CGR processor ICs, graphics processing units (GPUs), FPGAs, ASICs, application-specific instruction-set processor (ASIP), and digital signal processors (DSPs). The disclosed technology implements efficient distributed computing by allowing an array of accelerators (e.g., reconfigurable processors) attached to separate hosts to directly communicate with each other via buffers.

Examples of various implementations are described in the following paragraphs:

Example 1. A non-transitory machine-readable medium comprising computer instructions that, in response to being executed by a processor, cause the processor to: produce a configuration file to configure a fracturable data path of a configurable unit in an array of configurable units of a coarse-grained reconfigurable processor to generate a plurality of address sequences including a first address sequence generated using a first address calculation and a second address sequence generated using a second address calculation, the first address calculation associated with a first operation of a plurality of independent operations of the configurable unit and the second address calculation associated with a second operation of the plurality of independent operations of the configurable unit, the fracturable data path of the configurable unit comprising a plurality of computation stages respectively including a pipeline register, the configuration file produced by: analyzing the first address calculation and the second address calculation; assigning a first set of stages of the plurality of computation stages to the first operation to generate the first address sequence using the first set of stages based on said analysis; assigning a second set of stages of the plurality of computation stages to the second operation to generate the second address sequence using the second set of stages based on said analysis; and including two or more immediate values for each computation stage of the first set of stages and second set of stages in the configuration file.

Example 2. The non-transitory machine-readable medium of example 1, the fracturable data path of the configurable unit including an input, and the plurality of computation stages of the fracturable data path further including respective arithmetic logic units (ALUs) and selection logic to select two or more operands for the respective ALU; the first set of stages including a first starting stage and a first ending stage and the second set of stages including a second starting stage and a second ending stage; the instructions further causing the processor to produce the configuration file to configure the selection logic of the first ending stage and second ending stage respectively to select operands for the respective ALU from outputs of the pipeline register of an immediately preceding stage, the input, or the two or more immediate values associated with that stage; and to configure the selection logic in the first starting stage and the second starting stage respectively to select operands for the respective ALU from the input, or the two or more immediate values associated with that stage, but not from the outputs of the pipeline register of the immediately preceding stage.

Example 3. The non-transitory machine-readable medium of example 2, the input comprising: a first portion coupled to a scalar bus of the array of configurable units; a second portion coupled to a lane of a vector bus of the array of configurable units; and a third portion coupled to a counter of the configurable unit.

Example 4. The non-transitory machine-readable medium of example 3, the fracturable data path of the configurable unit including a first output, a second output, and a third output, and the instructions further causing the processor to produce the configuration file by: determining that one of the first portion, the second portion, or the third portion of the input directly provides a third address sequence; and producing the configuration file to: select data from an output of an ending stage of the first set of stages to provide on the first output; select data from an output of an ending stage of the second set of stages to provide on the second output; and select an output of a header input register coupled to the determined one of the first portion, the second portion, or the third portion of the input to provide on the third output.

Example 5. The non-transitory machine-readable medium of example 2, wherein the ALUs of the plurality of computation stages each are capable to perform both signed and unsigned arithmetic.

Example 6. The non-transitory machine-readable medium of example 2, wherein the ALUs of the plurality of computation stages each have a propagation delay of less than one clock cycle of the configurable unit.

Example 7. The non-transitory machine-readable medium of example 2, wherein the ALUs of the plurality of computation stages each have a first input, a second input, and a third input.

Example 8. The non-transitory machine-readable medium of example 7, the selection logic of a stage of the plurality of computation stages configurable to provide a first immediate data value to the first input of the ALU of the stage and a second immediate data value to the second input of the ALU of the stage, wherein the two or more immediate data values associated with the stage include the first immediate data value and the second immediate data value.

Example 9. The non-transitory machine-readable medium of example 2, wherein the first set of stages and the second set of stages are disjoint.

Example 10. The non-transitory machine-readable medium of example 2, wherein at least one of the first set of stages and the second set of stages consists of a single stage of the plurality of computation stages.

Example 11. The non-transitory machine-readable medium of example 2, wherein the first set of stages and the second set of stages are each contiguous stages of the plurality of computation stages.

Example 12. The non-transitory machine-readable medium of example 1, the fracturable data path including two or more sub-paths and the pipeline registers of the plurality of computation stages broken into sub-path pipeline registers; and the compiler further configured to: determine a first ALU operation of the first address calculation for the first starting stage; select a first sub-path to use for a value by the ALU of the first starting stage; determine a second ALU operation of the first address calculation for the first ending stage; select a second sub-path to use for a value by the ALU of the first ending stage; and the compiler further configured to produce the configuration file to: configure the ALU of the starting stage to perform the first ALU operation and direct a result of the first ALU operation to a sub-path pipeline register of the first starting stage associated with the first sub-path; and configure the ALU of the first ending stage to perform the second ALU operation and direct a result of the second ALU operation to a sub-path pipeline register of the first ending stage associated with the second sub-path.

Example 13. The non-transitory machine-readable medium of example 1, the fracturable data path of the configurable unit having two or more sub-paths with the pipeline registers of the plurality of computation stages broken into sub-path pipeline registers, and including a first output and a second output respectively configurable to selectively provide data from one sub-path pipeline register of the plurality of computation stages; and the instructions further causing the processor to produce the configuration file to configure the first output to select data from a sub-path pipeline register of an ending stage of the first set of stages, and to configure the second output to select data from a sub-path pipeline register of an ending stage of the second set of stages.

Example 14. The non-transitory machine-readable medium of example 13, the configurable unit further comprising a multi-port memory having a first address input associated with a first access port of the multi-port memory and a second address input associated with a second access port of the multi-port memory, the first address input coupled to the first output of the fracturable data path and the second address input coupled to the second output of the fracturable data path; and the instructions further causing the processor to produce the configuration file to configure the multi-port memory to execute the first operation using the first access port and the second operation using the second access port.

Example 15. The non-transitory machine-readable medium of example 14, the fracturable data path further comprising a third output and a fourth output; the multi-port memory further comprising a third address input, coupled to the third output of the fracturable data path, associated with a third access port of the multi-port memory, and a fourth address input, coupled to the fourth output of the fracturable data path, associated with a fourth access port of the multi-port memory; and the instructions further causing the processor to produce the configuration file by: evaluating a third address calculation for a third address sequence associated with a third operation of the plurality of independent operations, and a fourth address calculation for a fourth address sequence associated with a fourth operation of the plurality of independent operations; assigning a third set of stages of the plurality of computation stages to the third operation to generate the third address sequence using the third set of stages based on said evaluation; assigning a fourth set of stages of the plurality of computation stages to the fourth operation based on said evaluation; including configuration information to configure the multi-port memory to execute the third operation using the third access port and the fourth operation using the fourth access port.

Example 16. The non-transitory machine-readable medium of example 1, wherein the first address sequence includes meta data for memory accesses.

Example 17. A method for producing a configuration file to configure a fracturable data path of a configurable unit in an array of configurable units of a coarse-grained reconfigurable processor to generate a plurality of address sequences including a first address sequence generated using a first address calculation and a second address sequence generated using a second address calculation, the first address calculation associated with a first operation of a plurality of independent operations of the configurable unit and the second address calculation associated with a second operation of the plurality of independent operations of the configurable unit, the fracturable data path of the configurable unit comprising a plurality of computation stages respectively including a pipeline register, the method comprising: analyzing the first address calculation and the second address calculation; assigning a first set of stages of the plurality of computation stages to the first operation to generate the first address sequence using the first set of stages based on said analysis; assigning a second set of stages of the plurality of computation stages to the second operation to generate the second address sequence using the second set of stages based on said analysis; and generating a configuration file for the configurable unit that assigns the first set of stages to the first operation and the second set of stages to the second operation and includes two or more immediate values for each computation stage of the first set of stages and second set of stages.

Example 18. The method of example 17, wherein the first address sequence includes
meta data for memory accesses.

Example 19. The method of example 17, the fracturable data path of the configurable unit including an input, and the plurality of computation stages of the fracturable data path further including respective arithmetic logic units (ALUs) and selection logic to select two or more operands for the respective ALU; the first set of stages including a first starting stage and a first ending stage and the second set of stages including a second starting stage and a second ending stage; and the method further comprising including information in the configuration file to: configure the selection logic of the first ending stage and second ending stage respectively to select operands for the respective ALU from outputs of the pipeline register of an immediately preceding stage, the input, or the two or more immediate values associated with that stage, and configure the selection logic in the first starting stage and the second starting stage respectively to select operands for the respective ALU from the input, or the two or more immediate values associated with that stage, but not from the output of the pipeline register of the immediately preceding stage.

Example 20. The method of example 19, the input comprising: a first portion coupled to a scalar bus of the array of configurable units; a second portion coupled to a lane of a vector bus of the array of configurable units; and a third portion coupled to a counter of the configurable unit.

Example 21. The method of example 20, the fracturable data path of the configurable unit including a first output, a second output, and a third output, and the method further comprising: determining that one of the first portion, the second portion, or the third portion of the input directly provides a third address sequence; and including information in the configuration file to: configure the fracturable data path to select data from an output of an ending stage of the first set of stages to provide on the first output; configure the fracturable data path to select data from an output of an ending stage of the second set of stages to provide on the second output; and configure the fracturable data path to select an output of a header input register coupled to the determined one of the first portion, the second portion, or the third portion of the input to provide on the third output.

Example 22. The method of example 19, wherein the ALUs of the plurality of computation stages each are capable to perform both signed and unsigned arithmetic.

Example 23. The method of example 19, wherein the ALUs of the plurality of computation stages each have a latency of less than one clock cycle of the configurable unit.

Example 24. The method of example 19, wherein the ALUs of the plurality of computation stages each have a first input, a second input, and a third input.

Example 25. The method of example 24, the selection logic of a stage of the plurality of computation stages configurable to provide a first immediate data value to the first input of the ALU of the stage and a second immediate data value to the second input of the ALU of the stage, wherein the two or more immediate data values associated with the stage include the first immediate data value and the second immediate data value.

Example 26. The method of example 19, wherein the first set of stages and the second set of stages are disjoint.

Example 27. The method of example 19, wherein at least one of the first set of stages and the second set of stages consists of a single stage of the plurality of computation stages.

Example 28. The method of example 19, wherein the first set of stages and the second set of stages are each contiguous stages of the plurality of computation stages.

Example 29. The method of example 19, wherein the fracturable data path includes two or more sub-paths and the pipeline registers of the plurality of computation stages are broken into sub-path pipeline registers; and the method further comprising: determining a first ALU operation of the first address calculation for the first starting stage; selecting a first sub-path to use for a value by the ALU of the first starting stage; determining a second ALU operation of the first address calculation for the first ending stage; selecting a second sub-path to use for a value by the ALU of the first ending stage; and including information in the configuration file to configure the ALU of the starting stage to perform the first ALU operation and direct a result of the first ALU operation to a sub-path pipeline register of the starting stage associated with the first sub-path, and configure the ALU of the first ending stage to perform the second ALU operation and direct a result of the second ALU operation to a sub-path pipeline register of the first ending stage associated with the second sub-path.

Example 30. The method of example 17, the fracturable data path of the configurable unit having two or more sub-paths with the pipeline registers of the plurality of computation stages broken into sub-path pipeline registers, and including a first output and a second output respectively configurable to selectively provide data from one sub-path pipeline register of the plurality of computation stages; and the method further comprising including information in the configuration file to: configure the first output to select data from a sub-path pipeline register of an ending stage of the first set of stages, and configure the second output to select data from a sub-path pipeline register of an ending stage of the second set of stages.

Example 31. The method of example 30, the configurable unit further comprising a multi-port memory having a first address input associated with a first access port of the multi-port memory and a second address input associated with a second access port of the multi-port memory, the first address input coupled to the first output of the fracturable data path and the second address input coupled to the second output of the fracturable data path; the method further comprising including information in the configuration file to configure the multi-port memory to execute the first operation using the first access port and the second operation using the second access port.

Example 32. The method of example 31, the fracturable data path further comprising a third output and a fourth output; the multi-port memory further comprising a third address input, coupled to the third output of the fracturable data path, associated with a third access port of the multi-port memory, and a fourth address input, coupled to the fourth output of the fracturable data path, associated with a fourth access port of the multi-port memory; and the method further comprising: evaluating a third address calculation for a third address sequence associated with a third operation of the plurality of independent operations, and a fourth address calculation for a fourth address sequence associated with a fourth operation of the plurality of independent operations; assigning a third set of stages of the plurality of computation stages to the third operation to generate the third address sequence using the third set of stages based on said evaluation; assigning a fourth set of stages of the plurality of computation stages to the fourth operation based on said evaluation; and including configuration information in the configuration file to configure the multi-port memory to execute the third operation using the third access port and the fourth operation using the fourth access port.

Example 33. A data processing system comprising: a compiler configured to produce a configuration file to configure a fracturable data path of a configurable unit in an array of configurable units of a coarse-grained reconfigurable processor to generate a plurality of address sequences including a first address sequence generated using a first address calculation and a second address sequence generated using a second address calculation, the first address calculation associated with a first operation of a plurality of independent operations of the configurable unit and the second address calculation associated with a second operation of the plurality of independent operations of the configurable unit, the fracturable data path of the configurable unit comprising a plurality of computation stages respectively including a pipeline register, the compiler further configured to: analyze the first address calculation and the second address calculation; assign a first set of stages of the plurality of computation stages to the first operation in the configuration file to generate the first address sequence using the first set of stages based on said analysis; assign a second set of stages of the plurality of computation stages to the second operation in the configuration file to generate the second address sequence using the second set of stages based on said analysis; and include separate sets of two or more immediate values for each computation stage of the first set of stages and the second set of stages in the configuration file.

Example 34. The data processing system of example 33, wherein the first address sequence includes meta data for memory accesses.

Example 35. The data processing system of example 33, the fracturable data path of the configurable unit including an input, and the plurality of computation stages of the fracturable data path further including respective arithmetic logic units (ALUs) and selection logic to select two or more operands for the respective ALU; the first set of stages including a first starting stage and a first ending stage and the second set of stages including a second starting stage and a second ending stage; the compiler further configured to produce the configuration file to configure the selection logic of the first ending stage and second ending stage respectively to select operands for the respective ALU from outputs of the pipeline register of an immediately preceding stage, the input, or the two or more immediate values associated with that stage; and to configure the selection logic in the first starting stage and the second starting stage respectively to select operands for the respective ALU from the input, or the two or more immediate values associated with that stage, but not from the outputs of the pipeline register of the immediately preceding stage.

Example 36. The data processing system of example 35, the input comprising: a first portion coupled to a scalar bus of the array of configurable units; a second portion coupled to a lane of a vector bus of the array of configurable units; and a third portion coupled to a counter of the configurable unit.

Example 37. The data processing system of example 36, the fracturable data path of the configurable unit including a first output, a second output, and a third output, and the compiler further configured to produce the configuration file to: determine that one of the first portion, the second portion, or the third portion of the input directly provides a third address sequence; and produce the configuration file to: select data from an output of an ending stage of the first set of stages to provide on the first output; select data from an output of an ending stage of the second set of stages to provide on the second output; and select an output of a header input register coupled to the determined one of the first portion, the second portion, or the third portion of the input to provide on the third output.

Example 38. The data processing system of example 35, wherein the ALUs of the plurality of computation stages each are capable to perform both signed and unsigned arithmetic.

Example 39. The data processing system of example 35, wherein the ALUs of the plurality of computation stages each have a latency of less than one clock cycle of the configurable unit.

Example 40. The data processing system of example 35, wherein the ALUs of the plurality of computation stages each have a first input, a second input, and a third input.

Example 41. The data processing system of example 40, the selection logic of a stage of the plurality of computation stages configurable to provide a first immediate data value to the first input of the ALU of the stage and a second immediate data value to the second input of the ALU of the stage, wherein the two or more immediate data values associated with the stage include the first immediate data value and the second immediate data value.

Example 42. The data processing system of example 35, wherein the first set of stages and the second set of stages are disjoint.

Example 43. The data processing system of example 35, wherein at least one of the first set of stages and the second set of stages consists of a single stage of the plurality of computation stages.

Example 44. The data processing system of example 35, wherein the first set of stages and the second set of stages are each contiguous stages of the plurality of computation stages.

Example 45. The data processing system of example 35, the fracturable data path including two or more sub-paths and the pipeline registers of the plurality of computation stages broken into sub-path pipeline registers; and the compiler further configured to: determine a first ALU operation of the first address calculation for the first starting stage; select a first sub-path to use for a value by the ALU of the first starting stage; determine a second ALU operation of the first address calculation for the first ending stage; select a second sub-path to use for a value by the ALU of the first ending stage; and the compiler further configured to produce the configuration file to: configure the ALU of the starting stage to perform the first ALU operation and direct a result of the first ALU operation to a sub-path pipeline register of the first starting stage associated with the first sub-path; and configure the ALU of the first ending stage to perform the second ALU operation and direct a result of the second ALU operation to a sub-path pipeline register of the first ending stage associated with the second sub-path.

Example 46. The data processing system of example 33, the fracturable data path of the configurable unit having two or more sub-paths with the pipeline registers of the plurality of computation stages broken into sub-path pipeline registers, and including a first output and a second output respectively configurable to selectively provide data from one sub-path pipeline register of the plurality of computation stages; and the compiler further configured to produce the configuration file to configure the first output to select data from a sub-path pipeline register of an ending stage of the first set of stages, and to configure the second output to select data from a sub-path pipeline register of an ending stage of the second set of stages.

Example 47. The data processing system of example 46, the configurable unit further comprising a multi-port memory having a first address input associated with a first access port of the multi-port memory and a second address input associated with a second access port of the multi-port memory, the first address input coupled to the first output of the fracturable data path and the second address input coupled to the second output of the fracturable data path; and the compiler further configured to produce the configuration file to configure the multi-port memory to execute the first operation using the first access port and the second operation using the second access port.

Example 48. The data processing system of example 47, the fracturable data path further comprising a third output and a fourth output respectively configurable to selectively provide data from one pipeline register of the plurality of computation stages; the multi-port memory further comprising a third address input, coupled to the third output of the fracturable data path, associated with a third access port of the multi-port memory, and a fourth address input, coupled to the fourth output of the fracturable data path, associated with a fourth access port of the multi-port memory; and the compiler further configured to: evaluate a third address calculation for a third address sequence associated with a third operation of the plurality of independent operations, and a fourth address calculation for a fourth address sequence associated with a fourth operation of the plurality of independent operations; assign a third set of stages of the plurality of computation stages to the third operation based on said evaluation; assign a fourth set of stages of the plurality of computation stages to the fourth operation based on said evaluation; produce the configuration file to configure the fracturable data path to generate the third address sequence using the third set of stages and the fourth address sequence using the fourth set of stages, and to configure the multi-port memory to execute the third operation using the third access port and the fourth operation using the fourth access port.

Example 49. A coarse-grained reconfigurable (CGR) processor comprising: an array of configurable units including a first configurable unit comprising a fracturable data path with a plurality of sub-paths, the fracturable data path comprising: a plurality of stages, including an initial stage, one or more intermediate stages, and a final stage, each stage of the plurality of stages respectively including an arithmetic logic unit (ALU), selection logic to select two or more inputs for the ALU, and sub-path pipeline registers; a first output configurable to provide first data selected from any one of the sub-path pipeline registers; and a second output configurable to provide second data selected from any one of the sub-path pipeline registers different from that selected for the first output; the first configurable unit further comprising a configuration store to store configuration data to provide a plurality of immediate data fields for each stage of the plurality of stages and configuration information to the ALUs and selection logic in the plurality of stages and to select the first data and the second data for the first output and the second output, respectively.

Example 50. The CGR processor of example 49, the fracturable data path of the first configurable unit including a first set of sub-path input registers; the selection logic in the one or more intermediate stages and the final stage adapted to select from at least outputs of the sub-path pipeline registers of an immediately preceding stage, outputs of the first set of sub-path input registers, and the plurality of immediate data fields associated with that stage and provided by the configuration store; and the selection logic in the initial stage adapted to select from the outputs of the first set of sub-path input registers, and the plurality of immediate data fields associated with the initial stage and provided by the configuration store.

Example 51. The CGR processor of example 50, further comprising input multiplexers having outputs respectively coupled to inputs of the first set of sub-path input registers, each of the input multiplexers selecting, for its respective sub-path input register, between: a first input coupled to a scalar bus of the array of configurable units; a second input coupled to a lane of a vector bus of the array of configurable units; and a third input coupled to a counter of the first configurable unit.

Example 52. The CGR processor of example 51, wherein the first output is also configurable to provide the first data selected from the outputs of the first set of sub-path input registers.

Example 53. The CGR processor of example 50, the fracturable data path of the first configurable unit including a second set of sub-path input registers associated with a second calculation, the first set of sub-path input registers associated with a first calculation; the selection logic of a stage of the plurality of stages adapted to allow selection between the first set of sub-path input registers and the second set of sub-path input registers based on whether the stage is associated with the first calculation or the second calculation.

Example 54. The CGR processor of example 50, each stage of the plurality of stages respectively further including: bypass logic configurable to select a first sub-path pipeline register to receive an output of the ALU as its input, and to select a second sub-path pipeline register to receive an output of a corresponding sub-path pipeline register of an immediately preceding stage or a corresponding sub-path input register of the first set of sub-path input registers.

Example 55. The CGR processor of example 49, wherein the ALUs of the plurality of stages each are capable to perform both signed and unsigned arithmetic.

Example 56. The CGR processor of example 49, wherein the ALUs of the plurality of stages each have a propagation delay of less than one clock cycle of the first configurable unit.

Example 57. The CGR processor of example 49, wherein the ALUs of the plurality of stages each have a first input, a second input, and a third input.

Example 58. The CGR processor of example 57, the selection logic of a stage of the plurality of stages configurable to provide a first immediate data field to the first input of the ALU of the stage and a second immediate data field to the second input of the ALU of the stage, wherein the plurality of immediate data fields associated with the stage include the first immediate data field and the second immediate data field.

Example 59. The CGR processor of example 49, the one or more intermediate stages of the fracturable data path consisting of 10 intermediate stages so that the fracturable data path has 12 stages.

Example 60. The CGR processor of example 49, the first configurable unit further comprising a multi-port memory having a first address input associated with a first access port of the multi-port memory and a second address input associated with a second access port of the multi-port memory, the first address input coupled to the first output of the fracturable data path and the second address input coupled to the second output of the fracturable data path.

Example 61. The CGR processor of example 60, the fracturable data path further comprising: a third output configurable to provide third data selected from any one of the sub-path pipeline registers; a fourth output configurable to provide fourth data selected from any one of the sub-path pipeline registers; and the multi-port memory further comprising: a third address input, coupled to the third output of the fracturable data path, associated with a third access port of the multi-port memory; and a fourth address input, coupled to the fourth output of the fracturable data path, associated with a fourth access port of the multi-port memory; wherein the first access port and the second access port of the multi-port memory are write ports and the third access port and the fourth access port of the multi-port memory are read ports; and the configuration store is adapted to provide configuration data to select the third data and the fourth data for the third output and the fourth output, respectively.

Example 62. The CGR processor of example 49, the configuration store adapted to provide the configuration data to a first set of contiguous stages of the plurality of stages, the first set of contiguous stages including a first starting stage and a first ending stage; wherein configuration data configures the selection logic of the first starting stage to avoid selecting an output of the sub-path pipeline registers of an immediately preceding stage as any input of the two or more inputs to the ALU of the first starting stage, and to configure the first output to provide data from the sub-path pipeline register of the first ending stage as the first data.

Example 63. The CGR processor of example 62, the configuration store adapted to provide the configuration data to a second set of contiguous stages of the plurality of stages, the second set of contiguous stages adjacent to and disjoint from the first set of contiguous stages, the second set of contiguous stages including a second starting stage immediately following the first ending stage and a second ending stage; wherein configuration data configures the selection logic of the second starting stage to not select an output of the sub-path pipeline registers of the first ending stage as any input of the two or more inputs to the ALU of the second starting stage, and to configure the second output to provide data from the sub-path pipeline register of the second ending stage as the second data.

Example 64. The CGR processor of example 62, wherein the first starting stage and the first ending stage are the same stage of the plurality of stages.

Example 65. A computing system comprising: the coarse-grained reconfigurable (CGR) processor of any preceding example; and a host processor coupled to the CGR processor and including runtime logic configured to provide the configuration data to the CGR processor to load into the configuration store of the first configurable unit.

Example 66. A non-transitory machine-readable medium comprising configuration information that, in response to being loaded into a configuration store of a first configurable unit in an array of configurable units in a coarse-grained reconfigurable (CGR) processor, causes the first configurable unit to: receive from the configuration store, at each respective stage of a plurality of stages of a fracturable data path in the first configurable unit, a plurality of immediate data fields, a configuration for an arithmetic logic unit (ALU) of the respective stage, and control information for selection logic of the respective stage to select two or more inputs for the ALU of the respective stage, each respective stage of the plurality of stages including the ALU for the respective stage, the selection logic for the respective stage, and sub-path pipeline registers for the respective stage, wherein the fracturable data path has a plurality of sub-paths and the plurality of stages includes an initial stage, one or more intermediate stages, and a final stage; select first data from any one sub-path pipeline register of the plurality of stages to provide to a first output of the fracturable data path; and select second data from any one sub-path pipeline register of the plurality of stages different from that selected for the first output to provide to a second output of the fracturable data path.

Example 67. The non-transitory machine-readable medium of example 66, wherein the fracturable data path of the first configurable unit includes first set of sub-path input registers; and the configuration information causes the selection logic in the one or more intermediate stages and the final stage adapted to select from at least outputs of the sub-path pipeline registers of an immediately preceding stage, outputs of the first set of sub-path input registers, and the plurality of immediate data fields associated with that stage and provided by the configuration store; and the selection logic in the initial stage adapted to select from the outputs of the first set of sub-path input registers, and the plurality of immediate data fields associated with the initial stage and provided by the configuration store.

Example 68. The non-transitory machine-readable medium of example 67, wherein the CGR further comprises input multiplexers having outputs respectively coupled to inputs of the first set of sub-path input registers, and the configuration information causes each of the input multiplexers to select, for its respective sub-path input register, between: a first input coupled to a scalar bus of the array of configurable units; a second input coupled to a lane of a vector bus of the array of configurable units; and a third input coupled to a counter of the first configurable unit.

Example 69. The non-transitory machine-readable medium of example 67, wherein the fracturable data path of the first configurable unit includes third set of sub-path input registers and a third output; and the configuration information causes the first configurable unit to select third data from outputs of the third set of sub-path input registers to provide to the third output of the fracturable data path.

Example 70. The non-transitory machine-readable medium of example 68, the fracturable data path of the first configurable unit including a second set of sub-path input registers associated with a second calculation, the first set of sub-path input registers associated with a first calculation; and the configuration information causes the selection logic of a stage of the plurality of stages to select between outputs of the first set of sub-path input registers and outputs of the second set of sub-path input registers based on whether the stage is associated with the first calculation or the second calculation.

Example 71. The non-transitory machine-readable medium of example 68, each stage of the plurality of stages respectively further including bypass logic; and the configuration information causes the bypass logic to select a first sub-path pipeline register to receive an output of the ALU as its input, and to select a second sub-path pipeline register to receive an output of a corresponding sub-path pipeline register of an immediately preceding stage or a corresponding sub-path input register of the first set of sub-path input registers.

Example 72. The non-transitory machine-readable medium of example 66, wherein the ALUs of the plurality of stages each are capable to perform both signed and unsigned arithmetic.

Example 73. The non-transitory machine-readable medium of example 66, wherein the ALUs of the plurality of stages each have a propagation delay of less than one clock cycle of the first configurable unit.

Example 74. The non-transitory machine-readable medium of example 66, wherein the ALUs of the plurality of stages each have a first input, a second input, and a third input.

Example 75. The non-transitory machine-readable medium of example 74, wherein the configuration information causes the selection logic of a stage of the plurality of stages to provide a first immediate data field to the first input of the ALU of the stage and a second immediate data field to the second input of the ALU of the stage, the plurality of immediate data fields associated with the stage include the first immediate data field and the second immediate data field.

Example 76. The non-transitory machine-readable medium of example 66, wherein the first configurable unit further comprises a multi-port memory having a first address input associated with a first access port of the multi-port memory and a second address input associated with a second access port of the multi-port memory, the first address input coupled to the first output of the fracturable data path and the second address input coupled to the second output of the fracturable data path; and the configuration information causes a first access of the multi-port memory at a first address location determined by the first data and a second access of the multi-port memory at a second address location determined by the second data; wherein the first access and the second access are performed concurrently.

Example 77. The non-transitory machine-readable medium of example 76, wherein the fracturable data path further comprises a third output configurable to provide third data selected from any one of the sub-path pipeline registers, and a fourth output configurable to provide fourth data selected from any one of the sub-path pipeline registers; the multi-port memory further comprises a third address input, coupled to the third output of the fracturable data path, associated with a third access port of the multi-port memory; and a fourth address input, coupled to the fourth output of the fracturable data path, associated with a fourth access port of the multi-port memory; the first access port and the second access port of the multi-port memory are write ports and the third access port and the fourth access port of the multi-port memory are read ports; and the configuration information causes the first configurable unit to: select third data from any one sub-path pipeline register of the plurality of stages to provide to a third output of the fracturable data path; select fourth data from any one sub-path pipeline register of the plurality of stages to provide to a fourth output of the fracturable data path; perform a first read of the multi-port memory at the first address location; perform a second read of the multi-port memory at the second address location; perform a first write of the multi-port memory at a third address location determined by the third data; and perform a second write of the multi-port memory at a fourth address location determined by the fourth data.

Example 78. The non-transitory machine-readable medium of example 66, wherein the configuration information causes the first configurable unit to: avoid selecting an output of the sub-path pipeline registers of an immediately preceding stage as any input of the two or more inputs to the ALU of a first starting stage of a first set of contiguous stages of the plurality of stages, and to configure the first output to provide data from the sub-path pipeline register of a first ending stage of the first set of stages as the first data.

Example 79. The non-transitory machine-readable medium of example 78, wherein the configuration information causes the first configurable unit to: avoid selecting an output of the sub-path pipeline register of the first ending stage, which immediately precedes a second starting stage of a second set of contiguous stages of the plurality of stages, as any input of the two or more inputs to the ALU of the second starting stage, and to configure the second output to provide data from the sub-path pipeline register of a second ending stage of the second set of stages as the second data; wherein the second set of contiguous stages is adjacent to and disjoint from the first set of contiguous stages.

Example 80. The non-transitory machine-readable medium of example 78, wherein the first starting stage and the first ending stage are the same stage of the plurality of stages.

Example 81. A method to concurrently generate a plurality of addresses for a multi-port memory comprising: receiving from a configuration store of a first configurable unit in a coarse-grained reconfigurable (CGR) processor, at each respective stage of a plurality of stages of a fracturable data path of the first configurable unit in an array of configurable units in the coarse-grained reconfigurable (CGR) processor, a plurality of immediate data fields, a configuration for an arithmetic logic unit (ALU) of the respective stage, and control information for selection logic of the respective stage to select two or more inputs for the ALU of the respective stage, each respective stage of the plurality of stages including the ALU for the respective stage, the selection logic for the respective stage, and sub-path pipeline registers for the respective stage, wherein the fracturable data path has a plurality of sub-paths within the plurality of stages and includes an initial stage, one or more intermediate stages, and a final stage; selecting first data from any one sub-path pipeline register of the plurality of stages to provide to a first output of the fracturable data path to use in a first address sequence; and selecting second data from any one sub-path pipeline register of the plurality of stages different from that selected for the first output to provide to a second output of the fracturable data path to use in a second address sequence.

Example 82. The method of example 81, further comprising: selecting, with the selection logic in the one or more intermediate stages and the final stage, the two or more inputs for the ALU of the respective stage from at least outputs of the sub-path pipeline registers of an immediately preceding stage, outputs of a first set of sub-path input registers of the fracturable data path, and the plurality of immediate data fields associated with that stage and provided by the configuration store; and selecting, with the selection logic in the initial stage, the two or more inputs for the ALU of the initial stage from the outputs of the first set of sub-path input registers, and the plurality of immediate data fields associated with the initial stage and provided by the configuration store.

Example 83. The method of example 82, further comprising selecting, as an input for a respective sub-path input register, between: a first input coupled to a scalar bus of the array of configurable units; a second input coupled to a lane of a vector bus of the array of configurable units; and a third input coupled to a counter of the first configurable unit.

Example 84. The method of example 82, further comprising selecting, as an input for a third set of sub-path input registers, between a first input coupled to a scalar bus of the array of configurable units, a second input coupled to a lane of a vector bus of the array of configurable units, and a third input coupled to a counter of the first configurable unit; and selecting third data from outputs of the third set of sub-path input registers to provide to a third output of the fracturable data path.

Example 85. The method of example 83, wherein the fracturable data path of the first configurable unit includes a second set of sub-path input registers associated with a second calculation, the first set of sub-path input registers associated with a first calculation, the method further comprising: selecting, by the selection logic of a stage of the plurality of stages, between outputs of the first set of sub-path input registers and outputs of the second set of sub-path input registers based on whether the stage is associated with the first calculation or the second calculation.

Example 86. The method of example 83, further comprising: selecting a first sub-path pipeline register to receive an output of the ALU as its input; and selecting a second sub-path pipeline register to receive an output of a corresponding sub-path pipeline register of an immediately preceding stage or a corresponding sub-path input register of the first set of sub-path input registers.

Example 87. The method of example 81, wherein the ALUs of the plurality of stages each are capable to perform both signed and unsigned arithmetic.

Example 88. The method of example 81, wherein the ALUs of the plurality of stages each have a propagation delay of less than one clock cycle of the first configurable unit.

Example 89. The method of example 81, wherein the ALUs of the plurality of stages each have a first input, a second input, and a third input.

Example 90. The method of example 89, further comprising providing a first immediate data field to the first input of the ALU of the stage and a second immediate data field to the second input of the ALU of the stage, the plurality of immediate data fields associated with the stage include the first immediate data field and the second immediate data field.

Example 91. The method of example 81, wherein the first configurable unit further comprises a multi-port memory having a first address input associated with a first access port of the multi-port memory and a second address input associated with a second access port of the multi-port memory, the first address input coupled to the first output of the fracturable data path and the second address input coupled to the second output of the fracturable data path, the method further comprising: accessing the multi-port memory at a first address location determined by the first data; and concurrently accessing the multi-port memory at a second address location determined by the second data.

Example 92. The method of example 81, further comprising: selecting something other than an output of the sub-path pipeline registers of an immediately preceding stage as any input of the two or more inputs to the ALU of a first starting stage of a first set of contiguous stages of the plurality of stages; and providing data from the sub-path pipeline register of a first ending stage of the first set of stages as the first data.

Example 93. The method of example 92, further comprising: selecting something other than an output of the sub-path pipeline register of the first ending stage, which immediately precedes a second starting stage of a second set of contiguous stages of the plurality of stages, as any input of the two or more inputs to the ALU of the second starting stage, and to configure the second output to provide data from the sub-path pipeline register of a second ending stage of the second set of stages as the second data; wherein the second set of contiguous stages is adjacent to and disjoint from the first set of contiguous stages.

Example 94. The method of example 92, wherein the first starting stage and the first ending stage are the same stage of the plurality of stages.

The technology disclosed can be practiced as a system, method, or article of manufacture. One or more features of an implementation can be combined with the base implementation. Implementations that are not mutually exclusive are taught to be combinable. One or more features of an implementation can be combined with other implementations. This disclosure periodically reminds the user of these options. Omission from some implementations of recitations that repeat these options should not be taken as limiting the combinations taught in the preceding sections—these recitations are hereby incorporated forward by reference into each of the implementations described herein.

Although the description has been described with respect to particular implementations thereof, these particular implementations are merely illustrative, and not restrictive. The description may reference specific structural implementations and methods, and does not intend to limit the technology to the specifically disclosed implementations and methods. The technology may be practiced using other features, elements, methods, and implementations. Implementations are described to illustrate the present technology, not to limit its scope, which is defined by the claims. Those of ordinary skill in the art recognize a variety of equivalent variations on the description above.

All features disclosed in the specification, including the claims, abstract, and drawings, and all the steps in any method or process disclosed, may be combined in any combination, except combinations where at least some of such features and/or steps are mutually exclusive. Each feature disclosed in the specification, including the claims, abstract, and drawings, can be replaced by alternative features serving the same, equivalent, or similar purpose, unless expressly stated otherwise.

Although the description has been described with respect to particular implementations thereof, these particular implementations are merely illustrative, and not restrictive. For instance, many of the operations can be implemented in a CGRA system, a System-on-Chip (SoC), application-specific integrated circuit (ASIC), programmable processor, in a programmable logic device such as a field-programmable gate array (FPGA) or a graphics processing unit (GPU), obviating a need for at least part of the dedicated hardware. Implementations may be as a single chip, or as a multi-chip module (MCM) packaging multiple semiconductor dies in a single package. All such variations and modifications are to be considered within the ambit of the present disclosed technology the nature of which is to be determined from the foregoing description.

One or more implementations of the technology or elements thereof can be implemented in the form of a computer product, including a non-transitory computer-readable storage medium with computer usable program code for performing any indicated method steps and/or any configuration file for one or more CGR processors to execute a high-level program. Furthermore, one or more implementations of the technology or elements thereof can be implemented in the form of an apparatus including a memory and at least one processor that is coupled to the memory and operative to perform exemplary method steps, and/or a CGR processor that is operative to execute a high-level program based on a configuration file. Yet further, in another aspect, one or more implementations of the technology or elements thereof can be implemented in the form of means for carrying out one or more of the method steps described herein and/or executing a high-level program described herein. Such means can include (i) hardware module(s); (ii) software module(s) executing on one or more hardware processors; (iii) bit files for configuration of a CGR array; or (iv) a combination of aforementioned items.

Thus, while particular implementations have been described herein, latitudes of modification, various changes, and substitutions are intended in the foregoing disclosures, and it will be appreciated that in some instances some features of particular implementations will be employed without a corresponding use of other features without departing from the scope and spirit as set forth. Therefore, many modifications may be made to adapt a particular situation or material to the essential scope of the technology disclosed.

The invention claimed is:

1. A non-transitory machine-readable medium comprising computer instructions that, in
    response to being executed by a processor, cause the processor to produce a configuration file to configure a fracturable data path of a configurable unit in an array of configurable units of a coarse-grained reconfigurable processor to generate a plurality of independent address sequences including a first address sequence generated using a first address calculation and a second address sequence generated using a second address calculation, the fracturable data path comprising a plurality of pipelined computation stages, the configuration file produced by:
        analyzing the first address calculation and the second address calculation to determine to use N pipeline stages for the first address calculation and M pipeline stages for the second address calculation, wherein N and M are positive integers;
        generating first configuration data for a first set of stages to produce the first address sequence and second configuration data for a second set of stages to generate the second address sequence, the first set of stages consisting of N computational stages of the plurality of pipelined computation stages and the second set of stages consisting of M computational stages of the plurality of pipelined computation stages; and
        including the first configuration data and the second configuration data in the configuration file.

2. The non-transitory machine-readable medium of claim 1, wherein the configuration file includes two or more immediate values for use in at least one computation stage of the first set of stages and second set of stages in the configuration file.

3. The non-transitory machine-readable medium of claim 1, wherein the first set of stages and the second set of stages are disjoint sets of contiguous stages of the plurality of pipelined computation stages.

4. The non-transitory machine-readable medium of claim 1, the fracturable data path of the configurable unit including an input, and each of the plurality of pipelined computation stages of the fracturable data path further including a respective pipeline register, arithmetic logic unit (ALU) and selection logic to select two or more operands for the its ALU;
    the first set of stages including a first starting stage and a first ending stage and the second set of stages including a second starting stage and a second ending stage;
    the computer instructions further causing the processor to produce the configuration file to configure the selection logic of the first ending stage and second ending stage respectively to select operands for their respective ALU from outputs of the pipeline register of an immediately preceding stage, the input, or two or more immediate values associated with that stage from the configuration file; and to configure the selection logic in the first starting stage and the second starting stage respectively to select operands for the respective ALU from the input, or the two or more immediate values associated with that stage, but not from the outputs of the pipeline register of the immediately preceding stage.

5. The non-transitory machine-readable medium of claim 4, wherein the respective ALU of each of the plurality of pipelined computation stages each are capable to perform both signed and unsigned arithmetic.

6. The non-transitory machine-readable medium of claim 4, the input comprising a first portion coupled to a scalar bus of the array of configurable units, a second portion coupled to a lane of a vector bus of the array of configurable units, and a third portion coupled to a counter of the configurable unit;

the fracturable data path of the configurable unit including a first output, a second output, and a third output;

the computer instructions further causing the processor to produce the configuration file by determining that one of the first portion, the second portion, or the third portion of the input directly provides a third address sequence and producing the configuration file to:

select data from an output of an ending stage of the first set of stages to provide on the first output;

select data from an output of an ending stage of the second set of stages to provide on the second output; and select an output of a header input register coupled to the determined one of the first portion, the second portion, or the third portion of the input to provide on the third output.

7. The non-transitory machine-readable medium of claim 4, wherein the respective ALU of each of the plurality of pipelined computation stages have a first input, a second input, and a third input.

8. The non-transitory machine-readable medium of claim 1, the fracturable data path of the configurable unit having two or more sub-paths with pipeline registers in each of the plurality of pipelined computation stages broken into sub-path pipeline registers, and including a first output and a second output respectively configurable to selectively provide data from one sub-path pipeline register of the plurality of pipelined computation stages;

the computer instructions further causing the processor to produce the configuration file to configure the first output to select data from a sub-path pipeline register of an ending stage of the first set of stages, and to configure the second output to select data from a sub-path pipeline register of an ending stage of the second set of stages.

9. The non-transitory machine-readable medium of claim 8, the configurable unit further comprising a multi-port memory having a first address input associated with a first access port of the multi-port memory and a second address input associated with a second access port of the multi-port memory, the first address input coupled to the first output of the fracturable data path and the second address input coupled to the second output of the fracturable data path;

the computer instructions further causing the processor to produce the configuration file to configure the multi-port memory to execute a first operation using the first access port and a second operation using the second access port.

10. The non-transitory machine-readable medium of claim 1, wherein the first address sequence includes meta data for memory accesses.

11. A method for producing a configuration file to configure a fracturable data path of a configurable unit in an array of configurable units of a coarse-grained reconfigurable processor to generate a plurality of independent address sequences including a first address sequence generated using a first address calculation and a second address sequence generated using a second address calculation, the fracturable data path comprising a plurality of pipelined computation stages, the method comprising:

analyzing the first address calculation and the second address calculation to determine to use N pipeline stages for the first address calculation and M pipeline stages for the second address calculation, wherein N and M are positive integers;

generating first configuration data for a first set of stages to produce the first address sequence and second configuration data for a second set of stages to generate the second address sequence, the first set of stages consisting of N computational stages of the plurality of pipelined computation stages and the second set of stages consisting of M computational stages of the plurality of pipelined computation stages; and including the first configuration data and the second configuration data in the configuration file.

12. The method of claim 11, wherein the configuration file includes two or more immediate values for use in at least one computation stage of the first set of stages and second set of stages in the configuration file.

13. The method of claim 11, wherein the first set of stages and the second set of stages are disjoint sets of contiguous stages of the plurality of pipelined computation stages.

14. The method of claim 11, the fracturable data path of the configurable unit including an input, and each of the plurality of pipelined computation stages of the fracturable data path further including a respective pipeline register, arithmetic logic unit (ALU) and selection logic to select two or more operands for its respective ALU; and the first set of stages including a first starting stage and a first ending stage and the second set of stages including a second starting stage and a second ending stage;

the method further comprising including information in the configuration file to:

configure the selection logic of the first ending stage and second ending stage respectively to select operands for their respective ALU from outputs of the pipeline register of an immediately preceding stage, the input, or two or more immediate values associated with that stage, and configure the selection logic in the first starting stage and the second starting stage respectively to select operands for the respective ALU from the input, or the two or more immediate values associated with that stage, but not from the output of the pipeline register of the immediately preceding stage.

15. The method of claim 14, the input comprising a first portion coupled to a scalar bus of the array of configurable units, a second portion coupled to a lane of a vector bus of the array of configurable units, and a third portion coupled to a counter of the configurable unit; and the fracturable data path includes two or more sub-paths and the pipeline registers of the plurality of computation stages are broken into sub-path pipeline registers;

the method further comprising:

determining a first ALU operation of the first address calculation for the first starting stage;

selecting a first sub-path to use for a value by the ALU of the first starting stage;

determining a second ALU operation of the first address calculation for the first ending stage;

selecting a second sub-path to use for a value by the ALU of the first ending stage; and including information in the configuration file to configure the ALU of the first starting stage to perform the first ALU operation and direct a result of the first ALU operation to a sub-path pipeline register of the first starting stage associated with the first sub-path, and configure the ALU of the first ending stage to perform the second ALU operation and direct a result of the second ALU operation to a sub-path pipeline register of the first ending stage associated with the second sub-path.

16. The method of claim 11, the fracturable data path of the configurable unit having two or more sub-paths with pipeline registers in each of the plurality of pipelined computation stages broken into sub-path pipeline registers, and including a first output and a second output respectively configurable to selectively provide data from one sub-path pipeline register of the plurality of pipelined computation stages; and the method further comprising including information in the configuration file to:

configure the first output to select data from a sub-path pipeline register of an ending stage of the first set of stages, and configure the second output to select data from a sub-path pipeline register of an ending stage of the second set of stages.

17. The method of claim 16, the configurable unit further comprising a multi-port memory having a first address input associated with a first access port of the multi-port memory and a second address input associated with a second access port of the multi-port memory, the first address input coupled to the first output of the fracturable data path and the second address input coupled to the second output of the fracturable data path;

the method further comprising including information in the configuration file to configure the multi-port memory to execute a first operation using the first access port and a second operation using the second access port.

18. The method of claim 17, wherein the first address sequence includes meta data for memory accesses.

19. A data processing system comprising:

a compiler designed to produce a configuration file to configure a fracturable data path of a configurable unit in an array of configurable units of a coarse-grained reconfigurable processor to generate a plurality of independent address sequences including a first address sequence generated using a first address calculation and a second address sequence generated using a second address calculation, the fracturable data path comprising a plurality of pipelined computation stages, the compiler further configured to:

analyze the first address calculation and the second address calculation to determine to use N pipeline stages for the first address calculation and M pipeline stages for the second address calculation, wherein N and M are positive integers;

generate first configuration data for a first set of stages to produce the first address sequence and second configuration data for a second set of stages to generate the second address sequence, the first set of stages consisting of N computational stages of the plurality of pipelined computation stages and the second set of stages consisting of M computational stages of the plurality of pipelined computation stages; and include the first configuration data and the second configuration data in the configuration file.

20. The data processing system of claim 19, wherein the configuration file includes two or more immediate values for use in at least one computation stage of the first set of stages and second set of stages in the configuration file.

* * * * *